US011130506B2

(12) United States Patent
Yu et al.

(10) Patent No.: US 11,130,506 B2
(45) Date of Patent: Sep. 28, 2021

(54) RAIL VEHICLE

(71) Applicant: CRRC QINGDAO SIFANG CO., LTD., Qingdao (CN)

(72) Inventors: Haiyang Yu, Qingdao (CN); Senhua Lai, Qingdao (CN); Xiaojie Wang, Qingdao (CN); Yang Li, Qingdao (CN); Haizhi Yu, Qingdao (CN)

(73) Assignee: CRRC QINGDAO SIFANG CO., LTD., Qingdao (CN)

( * ) Notice: Subject to any disclaimer, the term of this patent is extended or adjusted under 35 U.S.C. 154(b) by 375 days.

(21) Appl. No.: 16/200,793

(22) Filed: Nov. 27, 2018

(65) Prior Publication Data
US 2019/0168782 A1  Jun. 6, 2019

(30) Foreign Application Priority Data

Sep. 6, 2018 (CN) .......................... 201811039720.3

(51) Int. Cl.
*B61F 1/10* (2006.01)
*B61D 1/00* (2006.01)
(Continued)

(52) U.S. Cl.
CPC .................. *B61F 1/10* (2013.01); *B61D 1/00* (2013.01); *B61D 15/06* (2013.01); *B61D 17/04* (2013.01); *B61D 17/06* (2013.01); *B61F 1/08* (2013.01)

(58) Field of Classification Search
CPC ........ B61D 17/04; B61D 17/06; B61D 17/08; B61D 17/10; B61D 17/12; B61D 17/18;
(Continued)

(56) References Cited

U.S. PATENT DOCUMENTS 3,770,139 A     11/1973  Glenn
3,859,928 A *   1/1975  Adler ........................ B61F 5/18
                                                           105/199.4
(Continued)

FOREIGN PATENT DOCUMENTS

CN        103707944 A    4/2014
CN        103909948 A    7/2014
(Continued)

*Primary Examiner* — S. Joseph Morano
*Assistant Examiner* — Cheng Lin
(74) *Attorney, Agent, or Firm* — Cantor Colburn LLP

(57) ABSTRACT

The present invention provides a rail vehicle. The rail vehicle includes: an underframe assembly, a side wall assembly, a vehicle roof assembly, and a vehicle end assembly. The underframe assembly includes a primary energy absorption structure and an underframe edge beam which are connected. The primary energy absorption structure has at least two energy absorbing cavities that are set at interval. The lower end of the side wall assembly is connected with the underframe assembly. The upper end of the side wall assembly is connected with the vehicle roof assembly. The vehicle end assembly includes an end energy absorption structure whose lower end is connected with the primary energy absorption structure, and upper end is connected with the vehicle roof assembly. By using the technical solution of the present invention, that is, the primary energy absorption structure of the underframe assembly, the vehicle roof assembly, and the end energy absorption structure which is installed between the vehicle roof assembly and the primary energy absorption structure form the overall energy absorbing structure at the end of the vehicle body structure, there is no need to add an independent energy absorbing component. The present invention improves impact energy absorbing performance of the vehicle without increasing the overall dimension of the vehicle body structure.

18 Claims, 41 Drawing Sheets

(51) Int. Cl.
*B61D 17/04* (2006.01)
*B61F 1/08* (2006.01)
*B61D 17/06* (2006.01)
*B61D 15/06* (2006.01)

(58) Field of Classification Search
CPC . B61D 45/001; B61F 1/00; B61F 1/08; B61F 1/10; B61F 1/02; B61F 1/12
USPC .................................... 105/25.01, 417, 419
See application file for complete search history.

(56) References Cited

U.S. PATENT DOCUMENTS

| | | | | |
|---|---|---|---|---|
| 4,062,273 | A | * | 12/1977 | O'Connor .............. B60H 1/262 454/105 |
| 4,782,762 | A | * | 11/1988 | Johnstone ................ B61F 1/10 105/355 |
| 6,196,135 | B1 | * | 3/2001 | Kashima ................ B61D 15/06 105/392.5 |
| 6,263,805 | B1 | * | 7/2001 | Taguchi ................ B61D 15/06 105/396 |
| 6,324,995 | B1 | * | 12/2001 | Kaufhold .................. B61F 5/16 105/199.4 |
| 6,688,237 | B2 | * | 2/2004 | Back ...................... B61D 15/06 105/392.5 |
| 6,799,794 | B2 | * | 10/2004 | Mochidome ......... B62D 21/152 293/143 |
| 6,886,474 | B2 | * | 5/2005 | Yamamoto ............ B61D 15/06 105/397 |
| 8,141,498 | B2 | * | 3/2012 | Barr ....................... B61D 17/12 105/396 |
| 8,424,462 | B2 | * | 4/2013 | Umebayashi ......... B29C 70/088 105/396 |
| 8,707,872 | B2 | * | 4/2014 | Kuroda .................. B61D 15/06 105/396 |
| 8,931,418 | B2 | * | 1/2015 | Matsuoka .............. B61D 17/08 105/410 |
| 9,718,481 | B2 | * | 8/2017 | Sano ...................... B61D 17/04 |
| 10,730,145 | B2 | * | 8/2020 | Han ...................... B23K 31/125 |
| 2007/0214998 | A1 | * | 9/2007 | Komaki ................ B23K 26/037 105/396 |
| 2015/0367863 | A1 | * | 12/2015 | Hirashima ............. B61D 17/08 105/422 |

FOREIGN PATENT DOCUMENTS

| | | | | |
|---|---|---|---|---|
| CN | 203902565 | U | | 10/2014 |
| CN | 204279449 | U * | 4/2015 | ............ B61D 15/06 |
| CN | 106080629 | A | | 11/2016 |
| CN | 106184263 | A | | 12/2016 |
| CN | 106627616 | A * | 5/2017 | ............ B61D 15/06 |
| CN | 106627616 | A | | 5/2017 |
| CN | 107415965 | A * | 12/2017 | |
| CN | 107415965 | A | | 12/2017 |
| CN | 107628050 | A | | 1/2018 |
| CN | 107628050 | A * | 1/2018 | |
| CN | 107878483 | A * | 4/2018 | |
| CN | 107901932 | A | | 4/2018 |
| JP | 2200563 | A | | 8/1990 |
| JP | 1159415 | A | | 3/1999 |
| JP | 201787800 | A | | 5/2017 |
| JP | 2017109730 | A * | 6/2017 | ............ B61D 15/06 |

* cited by examiner

RAIL VEHICLE

CROSS REFERENCE TO RELATED APPLICATION

This application is related to and claims the benefit of Chinese Patent Application Number 201811039720.3 filed on Sep. 6, 2018, the contents of which are herein incorporated by reference in their entirety.

TECHNICAL FIELD

The present invention relates to the technical field of rail vehicles, and in particular to a rail vehicle.

BACKGROUND

With the high-speed development of the fields of rail transits, the running safety issues have been valued by people increasingly while making travel convenient. Rail transit vehicles such as a subway are usually large in passenger capacity and high in running speed, and once a collision accident happens, serious personnel casualties and property losses will be caused. Recent train rear-ended accidents fully show that train collision accidents cannot be completely avoided even through a series of measures are taken in terms of signal control, scheduling management and programming management. In this case, the performance of a passive safety protection device serving as an ultimate guardian for passenger life and property safety is particularly important.

Statistics show that rail transit vehicles need to absorb a large energy in the collision process, and therefore the collision performance of an energy absorption member of a rail vehicle is an important indicator for quality measurement. With the continuous acceleration of rail transit vehicles, the collision performance of the energy absorption member is highly required. The collision performance of the energy absorption member of the rail vehicle cannot meet current demands in the related art.

In addition, under some special working conditions, vehicle end couplings are required to have a small gap and allow a small curve negotiation. Under these requirements, once the collision energy absorption requirement for the vehicle is improved, a collision energy absorption structure design for the vehicle needs to be added, the size of the energy absorption structure needs to be increased to increase the size of a vehicle end, and therefore it is difficult to meet the demand of a small curve negotiation. A technical solution for solving the complex road conditions has not been found yet for this case.

SUMMARY

The present invention provides a rail vehicle, intended to solve the problem in the conventional art in which a collision energy absorption structure of an energy absorption member of a rail vehicle cannot meet requirements of complex road conditions.

In order to solve the above problem, according to the present invention, a rail vehicle, comprising: an underframe assembly, which comprises a primary energy absorption structure and an underframe edge beam; the primary energy absorption structure is connected with the underframe edge beam of the rail vehicle; the primary energy absorption structure has at least two energy absorbing cavities that are set at interval; a side wall assembly, whose lower end is connected with the underframe assembly; a vehicle roof assembly; the upper end of the side wall assembly is connected with the vehicle roof assembly; and a vehicle roof assembly, which comprises an end energy absorption structure; the lower end of the end energy absorption structure is connected with the primary energy absorption structure, and the upper end of the end energy absorption structure is connected with the vehicle roof assembly.

Further, a primary energy absorption structure comprises an end beam, two ends of the end beam are connected to a edge beam of underframe of the vehicle respectively, the end beam has an end beam bottom plate and an end beam vertical plate connected to the end beam bottom plate, and the end beam vertical plate is vertically disposed and defines the energy absorption cavity on the end beam bottom plate.

Further, the end energy absorption structure comprises a first energy absorption column, the middle of the end beam bottom plate is provided with a first column mounting hole, and the first energy absorption column penetrates into the first column mounting hole and is welded to the end beam bottom plate.

Further, the end energy absorption structure further comprises a second energy absorption column, having a first end welded to the vehicle roof assembly and a second end welded to the primary energy absorption structure, wherein there are two second energy absorption columns, the two second energy absorption columns being spaced; and there are two first energy absorption columns, the two first energy absorption columns being spaced, and the two first energy absorption columns being located between the two second energy absorption columns.

Further, the rail vehicle further comprising: a secondary energy absorption structure, the secondary energy absorption structure being connected to the primary energy absorption structure, the secondary energy absorption structure comprising at least two spaced energy absorption tubes, and the primary energy absorption structure being connected to a first end of the energy absorption tube, wherein the energy absorption tube is a hollow structure, the energy absorption tube is provided with a first induction portion, the first induction portion comprises an induction hole, and the induction hole is a through hole.

Further, the cross section of the energy absorption tube is rectangular, the first induction portion comprises at least one group of induction holes, and the induction holes of each group is spaced in the circumferential direction of the energy absorption tube along a plane vertical to the axis of the energy absorption tube, wherein the energy absorption tube comprises at least two adjacent side walls, the two adjacent side walls are connected to form a bending portion, and the first induction portion is disposed on at least one bending portion of the energy absorption tube.

Further, the underframe assembly comprises two spaced lower boundary beams and a sleeper beam disposed between the two lower boundary beams, the sleeper beam comprising: a web structure; a center pin, connected to a bogie of a rail vehicle; and a mounting frame, connected to the web structure, the center pin being disposed on the mounting frame, the mounting frame comprising a plurality of vertical plates, and the plurality of vertical plates being spaced along an outer wall surface of the center pin.

Further, the sleeper beam comprises a plurality of rib plates and two web structures, the mounting frame being located between the two web structures, the web structure comprises two spaced webs, the plurality of rib plates is spaced between the two webs.

Further, the sleeper beam further comprises: an upper cover plate, covering the web, the upper cover plate being provided with a plurality of through holes, the rib plate being provided with a protrusion, and the protrusion matching the corresponding through hole; and a lower cover plate, disposed at the lower part of the web, the lower cover plate being fixedly connected to each rib plate.

Further, the underframe assembly further comprising: a plurality of cross beam components disposed between the two lower boundary beams, the plurality of cross beam components being spaced along a length direction of the lower boundary beam, at least one of the lower boundary beams being provided with a connecting base, and at least one end of the cross beam component being connected to the lower boundary beam through the connecting base.

Further, the lower boundary beam comprises a first flat plate, a vertical plate and a second flat plate connected in sequence, the width size L1 of the first flat plate is greater than the width size L2 of the second flat plate, and the connecting base comprises: a first connecting plate, connected to the vertical plate; a second connecting plate, forming an included angle with the first connecting plate, the second connecting plate being connected to the cross beam component; and a third connecting plate, forming an included angle with the first connecting plate and the second connecting plate respectively, the third connecting plate being connected to the first flat plate or the second flat plate.

Further, at least one cross beam component of the plurality of cross beam components comprises: a first cross beam, two opposite ends of the first cross beam being correspondingly connected to the two lower boundary beams, respectively; and a second cross beam, the second cross beam and the first cross beam being correspondingly disposed in a height direction of the lower boundary beam, wherein the first cross beam and the second cross beam form a mounting cavity, and a portion of a floor of the rail vehicle penetrates in the mounting cavity.

Further, the underframe assembly further comprising: a middle beam, disposed between the two lower boundary beams, the middle beam extending along the length direction of the lower boundary beam, and the cross section of the middle beam being Z-shaped in a width direction of the rail vehicle.

Further, the underframe assembly further comprising: a pipe passage structure, a side, facing a vehicle body of the rail vehicle, of at least one lower boundary beam being provided with the pipe passage structure, wherein the pipe passage structure is a pipe passage channel disposed on the lower boundary beam.

Further, the side wall assembly further comprising: a side wall body; and a plurality of side wall uprights, connected to the side wall body respectively, the plurality of side wall uprights being spaced along a length direction of the side wall body; wherein an auxiliary air duct of the rail vehicle is formed between at least two side wall uprights and the side wall body in the length direction of the side wall body.

Further, the side wall assembly further comprising: a side wall corner post, disposed inside the side wall body; and a connecting structure, the first end of the connecting structure being connected to an end wall corner post of the rail vehicle, and the second end of the connecting structure being connected to the side wall corner post.

Further, the side wall assembly further comprising a reinforcing structure, wherein the reinforcing structure comprises a reinforcing body and a turned edge connected to the reinforcing body, the reinforcing body is fixedly connected to the side wall body, and the turned edge and the side wall body are spaced.

Further, the side wall assembly further comprising: a handrail mounting seat, disposed on the side wall body, the handrail mounting seat being provided with a handrail mounting groove, the handrail mounting groove being used for mounting a handrail bar, and the handrail mounting groove being depressed toward the internal direction of the vehicle.

Further, the vehicle roof assembly comprises: two upper edge beams which are set at interval; a bending cross beam component, which is provided between the two upper edge beams; and a transition structure, which is set on the bending cross beam component, and is connected with at least one of the upper edge beams.

Further, the rail vehicle further comprising: a water baffle, which is set on the top of the vehicle roof assembly, at the end of the vehicle roof assembly, and at the upper side of an end door of the rail vehicle, so as to stop at least part of liquid on the top of the vehicle roof assembly from flowing down from the end door; wherein, the water baffle is stripe-shaped, and its extension direction is vertical to the extension direction of the vehicle roof assembly.

By using the technical solution of the present invention, that is, the primary energy absorption structure of the underframe assembly, the vehicle roof assembly, and the end energy absorption structure which is installed between the vehicle roof assembly and the primary energy absorption structure form the overall energy absorbing structure at the end of the vehicle body structure, there is no need to add the independent energy absorbing component. The present invention improves the impact energy absorbing performance of the vehicle without increasing the overall dimension of the vehicle body structure. Because the overall dimension of the vehicle is not increased, the rail vehicle of the present invention may adapt to technical requirements for a small coupling gap at the end of the vehicle and small radius curve negotiations, and may adapt to requirements for more complicated road conditions.

BRIEF DESCRIPTION OF THE DRAWINGS

The accompanying drawings constituting a part of the present application are used for providing further understanding of the present invention. Schematic embodiments of the present invention and description thereof are used for illustrating the present invention and not intended to form an improper limit to the present invention. In the accompanying drawings.

Figure 1:
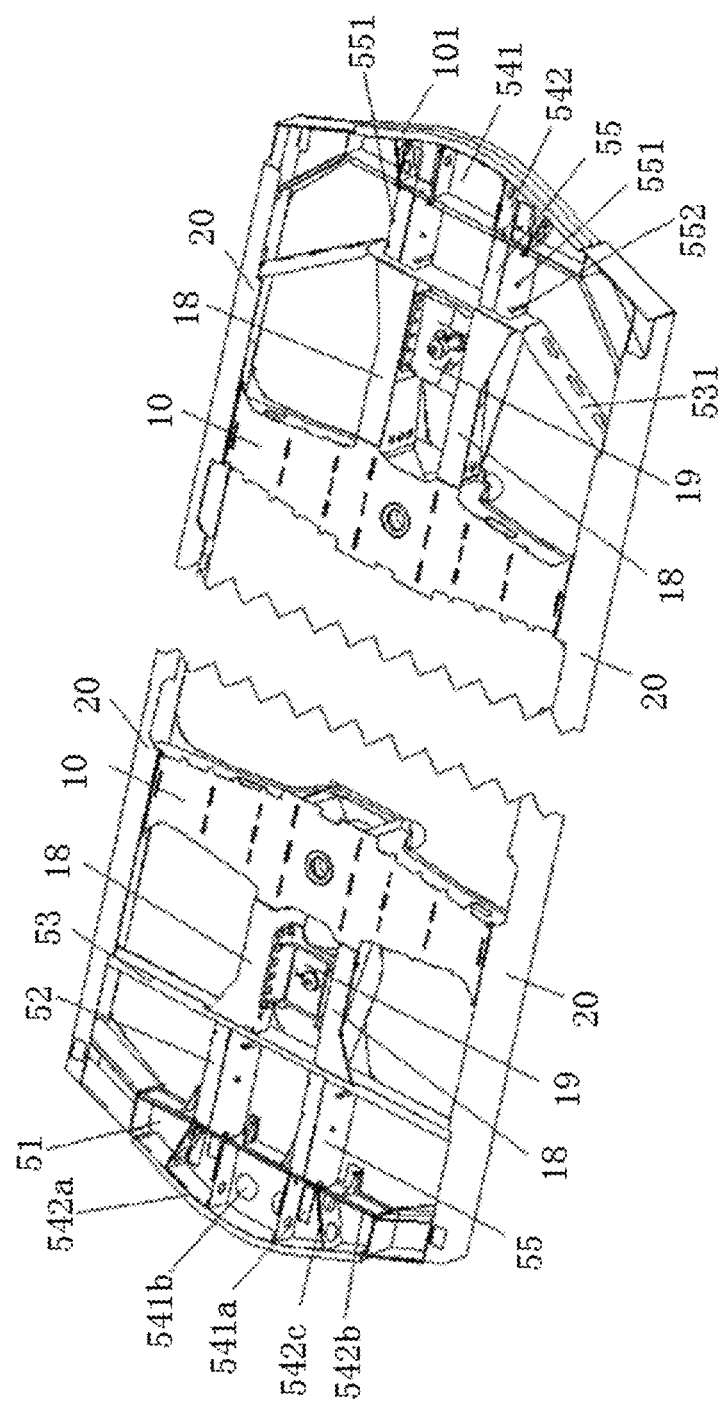
FIG. 1 is a first structure diagram of an underframe assembly of a rail vehicle according to the present invention.

The above accompanying drawings include the following reference numbers.

10 represents the sleeper beam; 11 represents a center pin; 12 represents a vertical plate; 13 represents the rib plate; 131 represents a protrusion; 132 represents a weight-reducing through hole; 14 represents a web structure; 141 represents a web; 142 represents a wire passage hole; 15 represents the upper cover plate; 151 represents a through hole; 152 represents a first penetration-out hole; 16 represents the lower cover plate; 161 represents a second penetration-out hole; 17 represents an inner boundary beam; 18 represents a traction beam; 19 represents a vehicle hook mounting seat; 101 represents an anti-creeping tooth;

20 represents an edge beam of underframe; 201 represents a first flat plate; 202 represents a vertical plate; 203 represents a second flat plate; 21 represents a connecting base; 211 represents a first connecting plate; 212 represents a second connecting plate; 213 represents a third connecting plate; 214 represents a weight-reducing hole; 22 represents a pipe passage structure; 23 represents a first reinforcing member; 231 represents a first reinforcing plate; 232 represents a second reinforcing plate; 24 represents a ventilation opening; 25 represents a supporting seat; 251 represents a first edge plate; 252 represents a second edge plate; 253 represents a third edge plate; 26 represents a drain hole; 27 represents a corner post installing hole; 28 represents a second reinforcing member; 29 represents a lower boundary beam;

30 represents a middle beam; 31 represents a first horizontal segment; 311 represents a bent portion; 32 represents a vertical segment; 33 represents a second horizontal segment; 34 represents the reinforcing member; 341 represents a first reinforcing structure; 342 represents a second reinforcing structure; 35 represents the cover plate; 351 represents a first cover plate; 352 represents a second cover plate; 353 represents a reinforcing rib;

40 represents a cross beam component; 41 represents a first cross beam; 411 represents U-shaped beam; 412 represents a connecting beam; 42 represents a second cross beam; 421 represents a hooking portion; 422 represents a first horizontal beam; 423 represents a vertical beam; 424 represents a second horizontal beam; 425 represents a wire passage groove; 43 represents a floor;

50 represents the underframe assembly; 51 represents the primary energy absorption structure; 52 represents a secondary energy absorption structure 53 represents a tertiary energy absorption structure; 531 represents a stopping beam; 54 represents an end beam; 541 represents a end beam bottom plate; 542 represents a end beam vertical plate; 541a represents a first column mounting hole; 541b represents a vehicle hook mounting hole; 541c represents a second column mounting hole; 542a represents a first edge vertical plate; 542b represents a second edge vertical plate; 542c represents a central vertical plate; 55 represents an energy absorption tube; 551 represents an induction hole; 552 represents a depression portion; 553 represents a first induction portion; 554 represents a first tube body portion; 555 represents a second tube body part; 556 represents a second induction portion;

60 represents the vehicle end assembly; 63 represents the end energy absorption structure; 61 represents a first energy absorption column; 62 represents a second energy absorption column;

70 represents the side wall assembly; 701 represents a side wall body; 702 represents an air duct opening; 703 represents under-window cross beam; 704 represents the side wall corner post; 7041 represents a first vertical plate; 7042 represents a second vertical plate; 705 represents a connecting structure; 706 represents the reinforcing member; 73 represents a window; 74 represents the reinforcing structure; 741 represents a first reinforcing plate; 742 represents a second reinforcing plate; 743 represents a turned edge; 75 represents the handrail mounting seat; 750 represents the handrail bar; 751 represents a first mounting plate; 752 represents a second mounting plate; 753 represents a arc-shaped plate; 754 represents a connecting plate; 755 represents the reinforcing plate; 756 represents a third mounting plate; 757 represents a fourth mounting plate; 758 represents a handrail mounting groove; 76 represents a door frame; 761 represents a first door frame; 762 represents a second door frame; 763 represents a reinforcing corner plate; 78 represents an inner cover plate; 79 represents a reinforcing cross beam; 791 represents a first reinforcing cross beam; 791a represents a flange structure; 792 represents a second reinforcing cross beam; 710 represents a side wall upright; 7101 represents a first folded edge; 7102 represents a second folded edge; 7103 represents a vertical edge; 7104 represents an avoidance groove;

81 represents an end wall corner post;

90 represents the vehicle roof assembly; 91 represents the vehicle roof body; 92 represents the upper edge beam; 921 represents a first upper edge beam segment; 922 represents a second upper edge beam segment; 923 represents a water chute; 93 represents the water baffle; 932 represents a junction surface; 94 represents the bending cross beam component; 941 represents the end bending beam; 9411 represents a first end bending beam segment; 9412 represents a second end bending beam segment; 942 represents the center bending beam; 9421 represents a first connecting beam; 9422 represents a second connecting beam; 9423 represents a third connecting beam; 943 represents a transition beam; 944 represents an inserting part.

DETAILED DESCRIPTION OF THE EMBODIMENTS

The technical solutions in the embodiments of the present invention are clearly and completely described below in combination with the accompanying drawings in the embodiments of the present invention. It is apparent that the described embodiments are only a part of the embodiments of the present invention but not all. The description of at least one exemplary embodiment below is actually just illustrative, and is never seen as any limit to the present invention and its application or use. Based on the embodiments of the present invention, all the other embodiments obtained by those of ordinary skill in the art on the premise of not contributing creative effort should belong to the protection scope of the present invention.

As shown in the accompanying drawings FIG. 1 to FIG. 9, the embodiments of the present invention provide a rail vehicle, which mainly includes: a primary energy absorption structure 51, a vehicle end assembly 60, and a vehicle roof assembly 90. The primary energy absorption structure 51 is configured to be connected with an edge beam of underframe 20. The primary energy absorption structure 51 has at least two energy absorbing cavities that are set at interval. The vehicle end assembly 60 includes an end energy absorption structure 63 whose lower end is configured to be connected with the primary energy absorption structure 51. The upper end of the end energy absorption structure 63 is connected with the vehicle roof assembly 90.

In the present invention, the primary energy absorption structure 51 of the underframe assembly 50, the vehicle roof assembly 90, and the end energy absorption structure 63 which is installed between the vehicle roof assembly 90 and the primary energy absorption structure 51 form the overall energy absorbing structure at the end of the vehicle body structure, so there is no need to add an independent energy absorbing component. The present invention improves impact energy absorbing performance of the vehicle without increasing the overall dimension of the vehicle body structure, thereby meeting a requirement for impact energy absorption of the vehicle body structure. Moreover, because there is no need to change the overall dimension of the vehicle body structure, the dimension of the vehicle may be consistent with the existing vehicle, thereby meeting a requirement of the vehicle for compatible negotiation, and improving compatibility of the vehicle. Because the overall dimension of the vehicle is not increased, the rail vehicle of the present invention may adapt to technical requirements for a small coupling gap at the end of the vehicle and small radius curve negotiations, and may adapt to requirements for more complicated road conditions.

Firstly, the primary energy absorption structure 51 of the collision energy absorption structure is described.

According to an embodiment of the present invention, as shown in FIG. 1, the primary energy absorption structure 51 includes an end beam 54, two ends of the end beam 54 are connected to the edge beam of underframe 20 of the vehicle respectively, the end beam 54 has an end beam bottom plate 541 and an end beam vertical plate 542 connected to the end beam bottom plate 541, and the end beam vertical plate 542 is vertically disposed and defines the energy absorption cavity on the end beam bottom plate 541. The end beam vertical plate 542 is vertically disposed on the end beam bottom plate 541, so that the primary energy absorption structure 51 naturally forms an energy absorption cavity having an energy absorption effect, thus improving the collision performance of the rail vehicle, and guaranteeing the personal safety of people in the vehicle. That is, when the primary energy absorption structure 51 is subjected to a collision pressure in a direction reverse to the running direction of the rail vehicle, the energy absorption cavity is deformed by the pressure to absorb the collision extrusion force, thus guaranteeing the personal safety of people in the vehicle.

It is to be noted that the end beam bottom plate 541 includes a first bottom plate and a second bottom plate disposed oppositely. The end beam vertical plate 542 is vertically disposed and is connected to the end beam bottom plate 541, so as to define the energy absorption cavity on the end beam bottom plate 541. Specifically, the end beam vertical plate 542 is vertically disposed on the first bottom plate, and defines the energy absorption cavity on the first bottom plate. In addition, the second bottom plate covers the end beam vertical plate 542. That is, the end beam vertical plate 542 is vertically disposed under the second bottom plate, and defines the energy absorption cavity under the second bottom plate. That is, the energy absorption cavity is surrounded by the end beam vertical plate 542 and the end beam bottom plate 541. In the present embodiment, the first bottom plate and the second bottom plate included by the end beam bottom plate 541 are disposed above and below the energy absorption cavity respectively.

For the above energy absorption cavity, in the present embodiment, specifically as shown in FIG. 1, the end beam vertical plate 542 includes a first edge vertical plate 542a, a second edge vertical plate 542b and multiple middle vertical plates 542c, wherein the first edge vertical plate 542a and the second edge vertical plate 542b are spaced, two ends of the middle vertical plates 542c are connected to the first edge vertical plate 542a and the second edge vertical plate 542b respectively, the multiple middle vertical plates 542c are spaced, and multiple spaced energy absorption cavities are defined between the first edge vertical plate 542a and the second edge vertical plate 542b. The design of forming multiple energy absorption cavities by the first edge vertical plate 542a, the second edge vertical plate 542b and the multiple middle vertical plates 542c enables the primary energy absorption structure 51 to have multiple energy absorption cavities provided along the vehicle width direction of the rail vehicle, so that when being subjected to a collision extrusion force, the end beam vertical plate 542 forming multiple energy absorption cavities is inclined and deformed into the energy absorption cavities, so as to absorb collision energy. Specifically speaking, when the middle vertical plate 542c and the first edge vertical plate 542a spaced by the multiple energy absorption cavities are subjected to a collision extrusion force, a support force is provided against the collision extrusion force, and finally, the middle vertical plate 542c and the first edge vertical plate 542a are deformed to absorb the energy of the collision extrusion force.

For the above first edge vertical plate 542a, in the present embodiment, specifically as shown in FIG. 1, the first edge vertical plate 542a is connected to the tail end of one end of the edge beam of underframe 20, and the first edge vertical plate 542a is an arc-shaped structure.

It is to be noted that in the present embodiment, the collision energy absorption structure is used for improving the collision performance of a vehicle end. Therefore, the collision energy absorption structure may be disposed at any one end of a rail vehicle, that is, the collision energy absorption structure may be disposed at a first end of the rail vehicle or the collision energy absorption structure may be disposed at a second end of the rail vehicle or the collision energy absorption structure may be symmetrically disposed at the first end and the second end of the rail vehicle as shown in FIG. 1.

From the above description, it can be seen that the scenario in which the first edge vertical plate 542a is connected to the tail end of one end of the edge beam of underframe 20 includes that: the first vertical plate may be connected to the tail end of the first end of the edge beam of underframe 20, or the first vertical plate may be connected to the tail end of the second end of the edge beam of underframe 20, or the first vertical plate may be connected to the tail ends of the first end and the second end of the edge beam of underframe 20.

The first edge vertical plate 542a is disposed at a end of the underframe, and a first layer of vertical plate protection is formed at the end of the underframe. Secondly, the first edge vertical plate 542a is connected to the tail end of the edge beam of underframe 20 and connected to one end of multiple middle vertical plates 542c, thus ensuring that the first edge vertical plate 542a can disperse the collision extrusion force to the multiple middle vertical plates 542c and the edge beam of underframe 20 when the end of the rail vehicle is collided and extruded, so that the situation that the primary energy absorption structure 51 cannot steadily absorb energy due to over-concentrated applying point of the collision extrusion force is prevented.

In addition, the first edge vertical plate 542a is an arc-shaped structure, which has the technical effect of enhancing dispersion of the collision extrusion force. In addition, the first edge vertical plate 542a is designed as an arc-shaped structure, so that multiple connected rail vehicles may be prevented from colliding each other while turning.

In the present embodiment, a side, away from the energy absorption cavity, of the first edge vertical plate 542a may be connected with an anti-creeping tooth 101, so that the collision energy absorption structure achieves an anti-creeping effect as well. That is, when two rail vehicles collide each other, the height and tooth number of the anti-creeping teeth 101 of the two vehicles are consistent, so that when the collision occurs, the end beam 54 ensures engagement of at least one anti-creeping tooth 101, and the vehicles will not mismatch in the height direction.

It is to be noted that in order to ensure the connecting stability of the primary energy absorption structure 51 and ensure the collision performance of the primary energy absorption structure 51, the first edge vertical plate 542a, the second edge vertical plate 542b, the multiple middle vertical plates 542c and the end beam bottom plate 541 included in the primary energy absorption structure 51 are welded to each other. In addition, the first edge vertical plate 542a, the second edge vertical plate 542b and the edge beam of underframe 20 are also welded.

The primary energy absorption structure 51 may also be adjusted in various manners. As an optional example, at least one middle vertical plate 542c in the multiple middle vertical plates 542c is provided with a first weight-reducing hole, wherein the first weight-reducing hole is used for reducing the weight of the rail vehicle or the collision energy absorption structure.

As another optional example, the middle of the end beam bottom plate 541 is provided with a vehicle hook mounting hole 541b connected to a vehicle hook of the rail vehicle.

As an optional example, as shown in FIG. 1, the multiple middle vertical plates 542c include: two first middle vertical plates, two second middle vertical plates and two third middle vertical plates, wherein the two first middle vertical plates, the two second middle vertical plates and the two third middle vertical plates are symmetrically disposed along the vehicle width direction of the rail vehicle, a first energy absorption cavity is formed between the two first middle vertical plates, a first bottom plate corresponding to the first energy absorption cavity is provided with a vehicle hook mounting hole 541b, a second energy absorption cavity is formed between the first middle vertical plate and the second middle vertical plate, the end beam bottom plate 541 corresponding to the second energy absorption cavity is provided with a first column mounting hole 541a, a third energy absorption cavity is formed between the second middle vertical plate and the third middle vertical plate, and a fourth energy absorption cavity is formed between the third energy absorption cavity and the edge beam of underframe 20. In addition, the first middle vertical plate is parallel to the third middle vertical plate, both the first middle vertical plate and the third middle vertical plate are vertical to the second middle vertical plate, and a preset angle is provided between the first middle vertical plate and the second middle vertical plate. In addition, both the first middle vertical plate and the second middle vertical plate are provided with first weight-reducing holes.

The end energy absorption structure 63 is further described.

Figure 6:
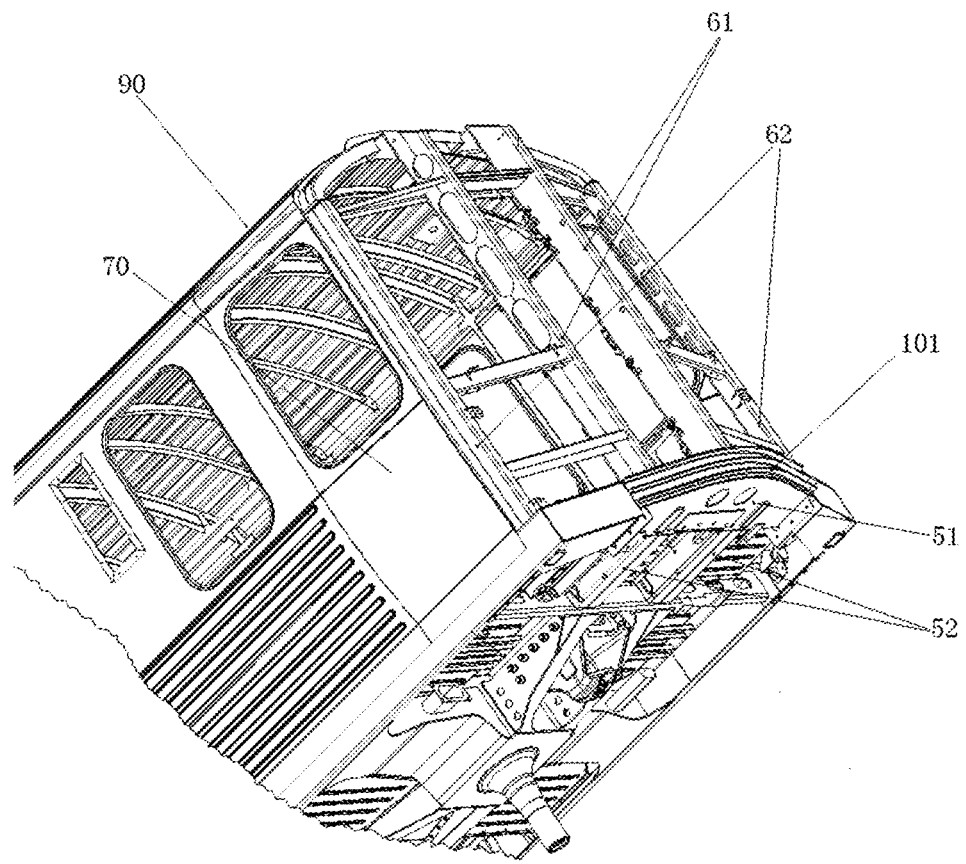
FIG. 6 is a second structure diagram of a vehicle end assembly of the rail vehicle according to the present invention.

As shown in FIG. 6, in the present embodiment, the end energy absorption structure 63 includes a first energy absorption column 61, the middle of the end beam bottom plate 541 is provided with a first column mounting hole 541a, and the first energy absorption column 61 penetrates into the first column mounting hole 541a and is welded to the end beam bottom plate 541. This design of providing the first column mounting hole 541a in the middle of the end beam bottom plate 541 enables the first energy absorption column 61 to penetrate through the first column mounting hole 541a to be welded to the end beam bottom plate 541, and enhances the connecting strength between the end energy absorption column and the end beam 54, thus improving the connecting strength of an end skeleton of the rail vehicle, and protecting the personal safety of a passenger.

As an optional example, the end beam bottom plate 541 includes a first bottom plate and a second bottom plate, the middle of the first bottom plate is provided with a third column mounting hole, the middle of the second bottom plate is provided with a fourth column mounting hole, and the first energy absorption column penetrates through the third column mounting hole and the fourth column mounting hole and is welded to the first bottom plate and the second bottom plate respectively. This design not only enables the first bottom plate and the second bottom plate to be welded to the first energy absorption column, but also increases the connecting stability of the vehicle end skeleton. Moreover, since a certain height difference is provided between the first bottom plate and the second bottom plate, the degree of inclining the first energy absorption column into a carriage may be limited, so as to protect the personal safety of a passenger. It is to be noted that the first column mounting hole 541a includes a third column mounting hole and a fourth column mounting hole.

As shown in FIG. 6, the end energy absorption structure 63 further includes a second energy absorption column 62, having a first end welded to the vehicle roof assembly 90 and a second end welded to the primary energy absorption structure 51.

In an embodiment of the present invention, two second energy absorption columns 62 are designed, the two second energy absorption columns 62 are spaced, and the second energy absorption columns 62 are welded to a side wall assembly 70 of the rail vehicle. The above design enhances the connecting strength between the vehicle roof assembly 90 of the rail vehicle and the chassis of the rail vehicle, and the design of welding the second energy absorption columns 62 to the side wall assembly 70 of the rail vehicle improves the integrity of the vehicle end skeleton structure, so that when the vehicle end skeleton structure is collided and extruded, more components of the rail vehicle provide an anti-collision support. The design of spacing two energy absorption columns improves the balance of a connecting relationship between the vehicle roof assembly 90 and the chassis structure, and avoids the distortion and deformation of the vehicle end skeleton structure at a weak part of the connecting relationship caused by the unbalanced connecting relationship between the vehicle roof assembly 90 and the chassis structure.

As another optional example, as shown in FIG. 6, there are two second energy absorption columns 62, the two second energy absorption columns 62 are spaced, there are two first energy absorption columns 61, and the two first energy absorption columns 61 are located between the two second energy absorption columns 62. The example is obtained based on statistic analysis of a great number of experimental data. The number and position of the first energy absorption column 61 in the example and the number and position of the second energy absorption column 62 in the example are stably balanced, that is, a balance between the weight and connecting strength of the end energy absorption structure 63 is achieved, and a balance between the position design and connecting stability of the end energy absorption structure 63 is achieved.

Preferably, two ends of the end beam bottom plate 541 are separately provided with a second column mounting hole 541c, and the second energy absorption column 62 penetrates into the second column mounting hole 541c and is welded to the end beam bottom plate 541. This design of providing the second column mounting hole 541c in the middle of the end beam bottom plate 541 enables the second energy absorption column 62 to penetrate through the second column mounting hole 541c to be welded to the end beam bottom plate 541, and enhances the connecting strength between the second column mounting hole 541c and the end beam bottom plate 541, thus improving the connecting strength of an end skeleton of the rail vehicle, and protecting the personal safety of a passenger.

In an example, the first energy absorption column 61 is a collision column, and the second energy absorption column 62 is an end corner post. The collision column and the end corner post form a protection structure of a vehicle front end, so as to protect the life safety of a crew member and a passenger in the vehicle. The four columns are of a closed tubular structure, and the size of the section needs to meet the requirements. The collision column and the end corner post form an integrated structure with a roof bending beam on a roof and the end beam 54 at the vehicle front end. The side wall assembly 70 of the remaining vehicle body and the vehicle roof assembly 90 are welded together to form a whole.

Then, the rail vehicle further includes a secondary energy absorption structure 52, the secondary energy absorption structure 52 being connected to the primary energy absorption structure 51, the secondary energy absorption structure 52 including at least two spaced energy absorption tubes 55, and the primary energy absorption structure 51 being connected to a first end of the energy absorption tube 55. The secondary energy absorption structure 52 is then described.

This design of providing the energy absorption cavity of the primary energy absorption structure 51 and the energy absorption tube 55 of the secondary energy absorption structure 52 at the end of the rail vehicle at least forms double energy absorption guarantee for the end of the rail vehicle. That is, at least two spaced energy absorption cavities of the primary energy absorption structure 51 and the energy absorption tube 55 of the secondary energy absorption structure 52 may absorb certain collision energy to cause energy absorption deformation, thus improving the collision performance of the rail vehicle, and ensuring the personal safety of a passenger. In addition, if the vehicle is collided, since the energy absorption structure is disposed stage by stage, each stage of energy absorption structure will be deformed stage by stage, so that the deformation of the energy absorption structure is within a controllable range, thus avoiding from affecting the safety of people in the vehicle due to non-controllable deformation caused by the train structure.

The energy absorption tube 55 is set as a hollow structure, and the energy absorption tube 55 is provided with a first induction portion 553. The structure of the energy absorption tube is simple, and since the first induction portion 553 is provided, the part, in the first induction portion 553, of the energy absorption tube 55 is first deformed when the collision occurs, so that the deformation of the energy absorption tube 55 is in a controllable state, thus avoiding from threatening the personal safety of people in the vehicle due to non-controllable deformation of other parts of a rail train. Therefore, the present invention improves the anti-collision performance of the collision energy absorption structure. Preferably, the energy absorption tube 55 is symmetrically disposed along the vehicle width direction, and the energy absorption tube 55 is a thin-wall tube provided with an induction hole 551, thus facilitating deformation control of the energy absorption tube 55. The energy absorption tube 55 is connected to the second edge vertical plate 542b and a cross beam of a traction beam 18 in a welding manner.

Figure 7:
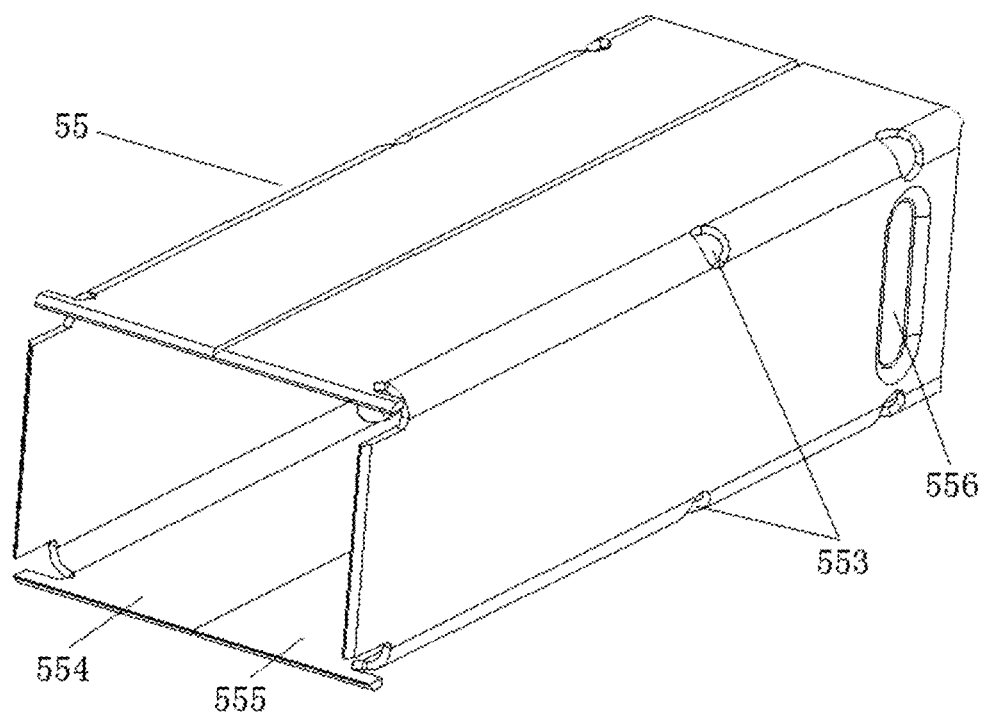
FIG. 7 is a schematic diagram of three-dimensional structure of an energy absorption tube of the rail vehicle according to the present invention.

According to an embodiment of the present invention, as shown in FIG. 7, the energy absorption tube 55 includes a first tube body portion 554 and a second tube body portion 555, the first tube body portion 554 and the second tube body portion 555 being spliced. The two tube body portions are spliced to form the energy absorption tube 55 having a cavity, and during processing, the first tube body portion 554 and the second tube body portion 555 are spliced and welded at the spliced part. This structural form is simple in structure, and facilitates modular design, so that the cost can be reduced, and the processing efficiency is improved.

Specifically, the first tube body portion 554 is a U-shaped structure, the first tube body portion 554 includes a first bottom wall and two first side walls, the second tube body portion 555 is a U-shaped structure, the second tube body portion 555 includes a second bottom wall and two second side walls, and the two first side walls are butted with the two second side walls respectively.

In the present embodiment, the first tube body portion 554 and the second tube body portion 555 are U-shaped structures and are symmetrically disposed. The two side walls of the first tube body portion 554 and the second tube body portion 555 are butted in a one-to-one correspondence manner. Such design forms a flat plane at a to-be-welded part, facilitates the welding process, and improves the production efficiency. The first tube body portion 554 and the second tube body portion 555, which are symmetrically disposed, have the same structure, thereby facilitating batch production, and reducing the cost.

In the present invention, as shown in FIG. 7, the energy absorption tube 55 includes at least two adjacent side walls, the two adjacent side walls are connected to form a bending portion, and the first induction portion 553 is disposed on at least one bending portion of the energy absorption tube 55. The bending portion of the energy absorption tube 55 is provided with the first induction portion 553 to form a collision induction structure. When the rail train is collided, the first induction portion 553 on the energy absorption tube 55 will be deformed prior to the integrated structure, so that the deformation of the energy absorption tube 55 is controllable, thus avoiding from threatening the personal safety of people in the vehicle due to non-controllable deformation of other parts of a rail train. The first induction portion 553 is disposed at the bending part, which is easy to process, so that the production efficiency can be improved. Preferably, the cross section of the energy absorption tube 55 in the present embodiment is rectangular, the rectangular energy absorption tube 55 has a good torsional property, and the safety of the collision energy absorption structure can be further improved.

Figure 8:
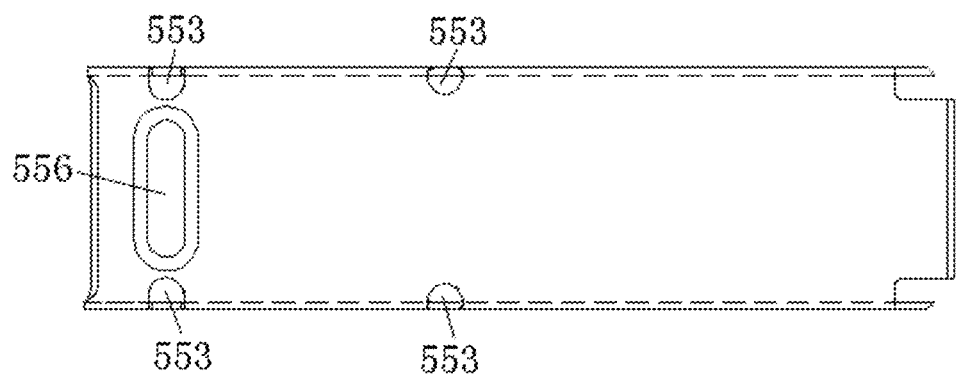
FIG. 8 is a schematic diagram of front view structure of the energy absorption tube of the rail vehicle according to the present invention.
Figure 9:
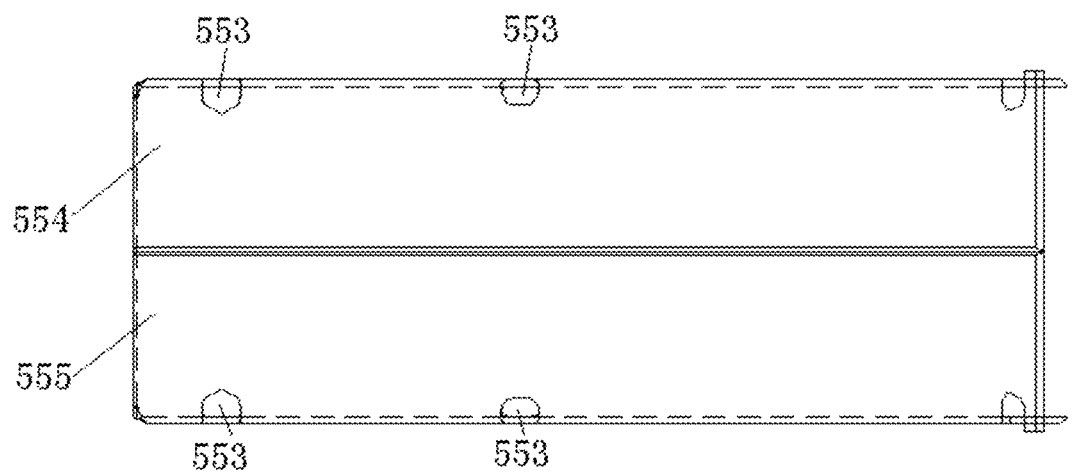
FIG. 9 is a schematic diagram of top view structure of the energy absorption tube of the rail vehicle according to the present invention.

In the present embodiment, preferably, as shown in FIG. 7, FIG. 8 and FIG. 9, the first induction portion 553 includes an induction hole 551, the induction hole 551 being a through hole. The induction hole 551 is a through hole, which is easy to process.

As shown in FIG. 7, FIG. 8 and FIG. 9, the first induction portion 553 includes at least one group of induction holes 551, and each group of induction holes 551 is spaced in the circumferential direction of the energy absorption tube 55 along a plane vertical to the axis of the energy absorption tube 55.

Multiple induction holes 551 are spaced on the energy absorption tube 55 along each plane vertical to the axis of the energy absorption tube 55, and the multiple induction holes 551 are uniformly distributed along the circumferential direction of the energy absorption tube 55. When the collision occurs, the induction holes 551 uniformly distributed in the circumferential direction of the energy absorption tube 55 make the energy absorption tube 55 folded basically along a plane, so that the deformation is more controllable.

In a preferred example, the first induction portion 553 includes multiple groups of induction holes 551, the multiple groups of induction holes 551 being spaced along an extending direction of the energy absorption tube 55.

The multiple groups of induction holes 551 are spaced on the energy absorption tube 55. When the collision occurs, deformation is performed once at each group of induction holes 551. By providing the multiple groups of induction holes 551, the energy absorption tube 55 may be deformed repeatedly, thus improving the energy absorption capability of the energy absorption tube 55.

Figure 10:
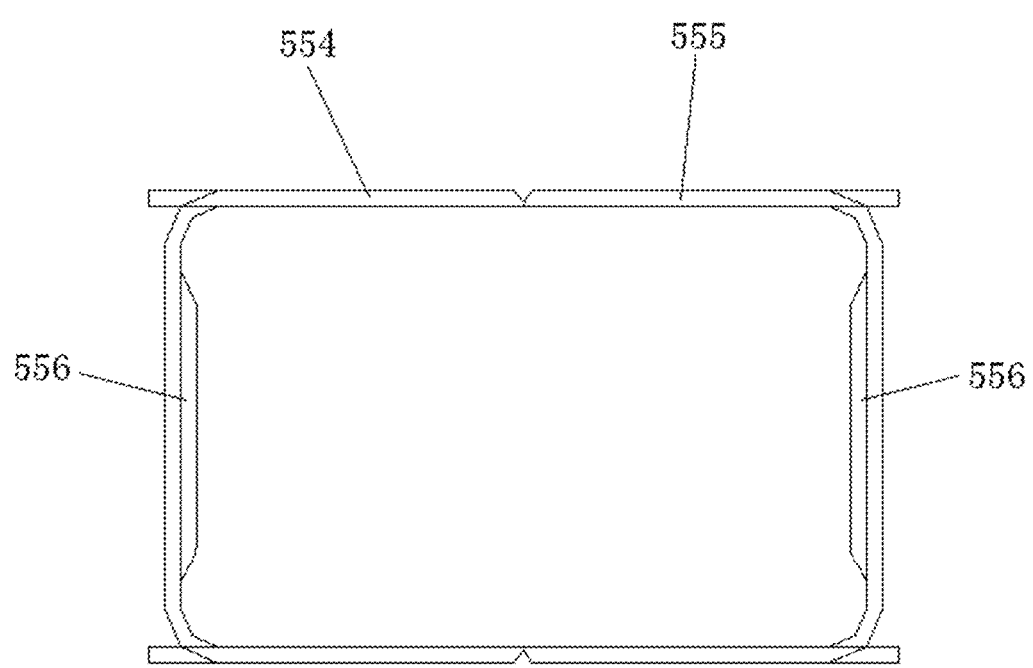
FIG. 10 is a schematic diagram of section structure of the energy absorption tube of the rail vehicle according to the present invention.

As shown in FIG. 7, FIG. 8 and FIG. 10, the energy absorption tube 55 is further provided with a second induction portion 556, the second induction portion 556 being disposed on the side wall of the energy absorption tube 55. Preferably, in the present embodiment, the second induction portion 556 is depressed into the side wall of the energy absorption tube 55 to form a depression portion 552.

As shown in FIG. 7 and FIG. 8, in an embodiment, the axes of the first induction portion 553 and the second induction portion 556 are on the same plane vertical to the extending direction of the energy absorption tube 55. On the basis of the first induction portion 553, the provision of the second induction portion 556 facilitates the formation of a weaker induction part at this part, so that this part may be deformed prior to other parts.

As shown in FIG. 10, in an embodiment, the cross section of the energy absorption tube 55 is rectangular, there are two second induction portions 556, and the two second induction portions 556 are disposed on the side wall of the energy absorption tube 55 oppositely. The first tube body portion 554 is a U-shaped structure, and the first tube body portion 554 includes a first bottom wall and two first side walls. The second tube body portion 555 is a U-shaped structure, and the second tube body portion 555 includes a second bottom wall and two second side walls. The two first side walls are butted with the two second side walls respectively, and the second induction portion 556 is disposed on the first bottom wall and the second bottom wall respectively.

Preferably, the second induction portion 556 is a groove depressed into the energy absorption tube 55, the bottom wall of the groove is parallel to the side wall of the energy absorption tube 55, and the side wall of the groove is an inclined surface, and the cross section of the groove is trapezoidal.

Finally, the collision energy absorption structure further includes a tertiary energy absorption structure 53. The tertiary energy absorption structure 53 is described hereinafter.

Figure 2:
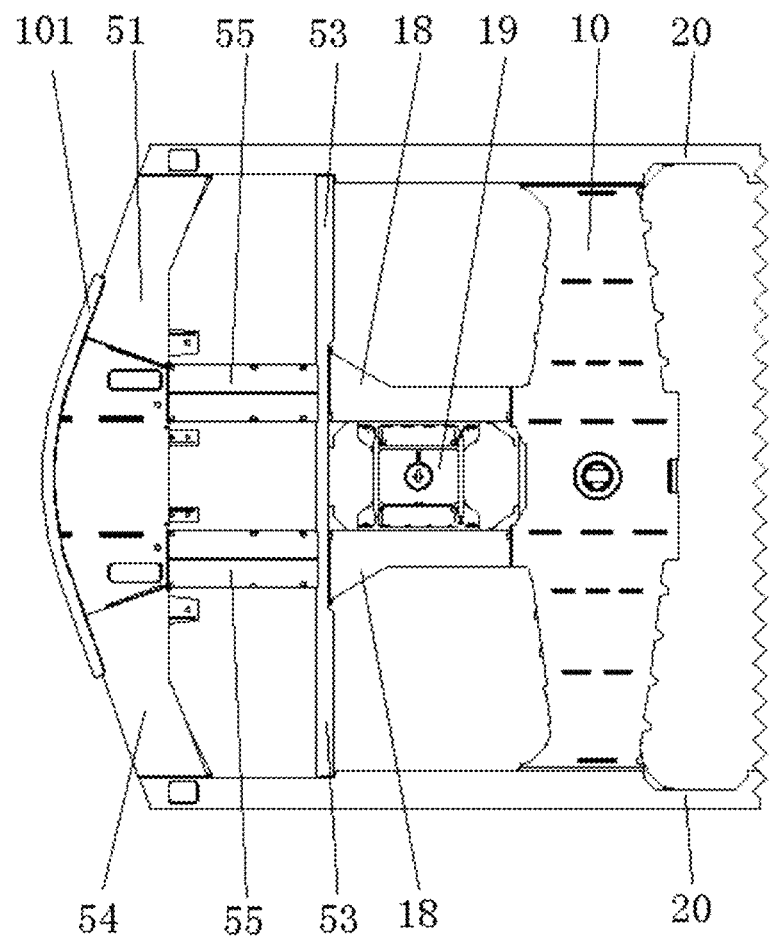
FIG. 2 is a top view of a first end of the underframe assembly of the rail vehicle according to the present invention.
Figure 3:
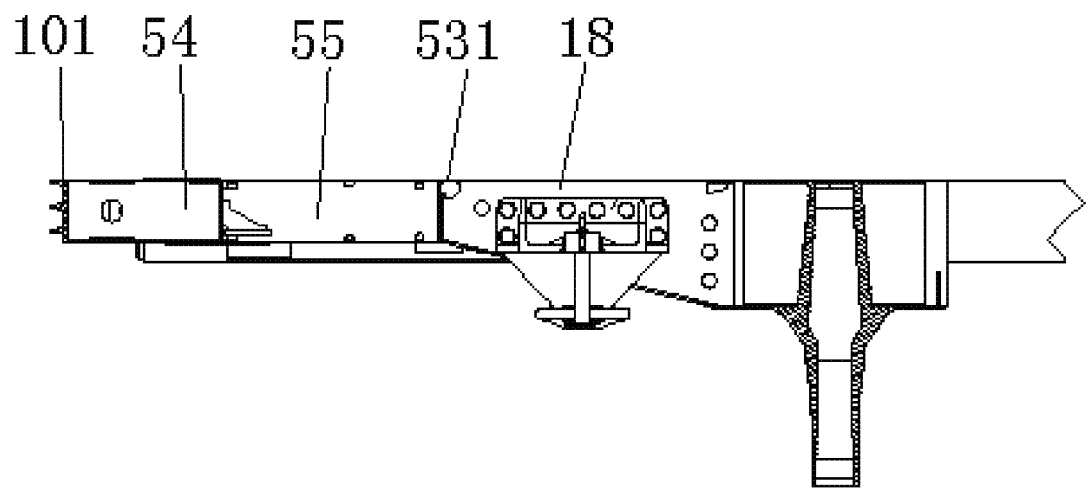
FIG. 3 is a side view of the first end of the underframe assembly of the rail vehicle according to the present invention.
Figure 4:
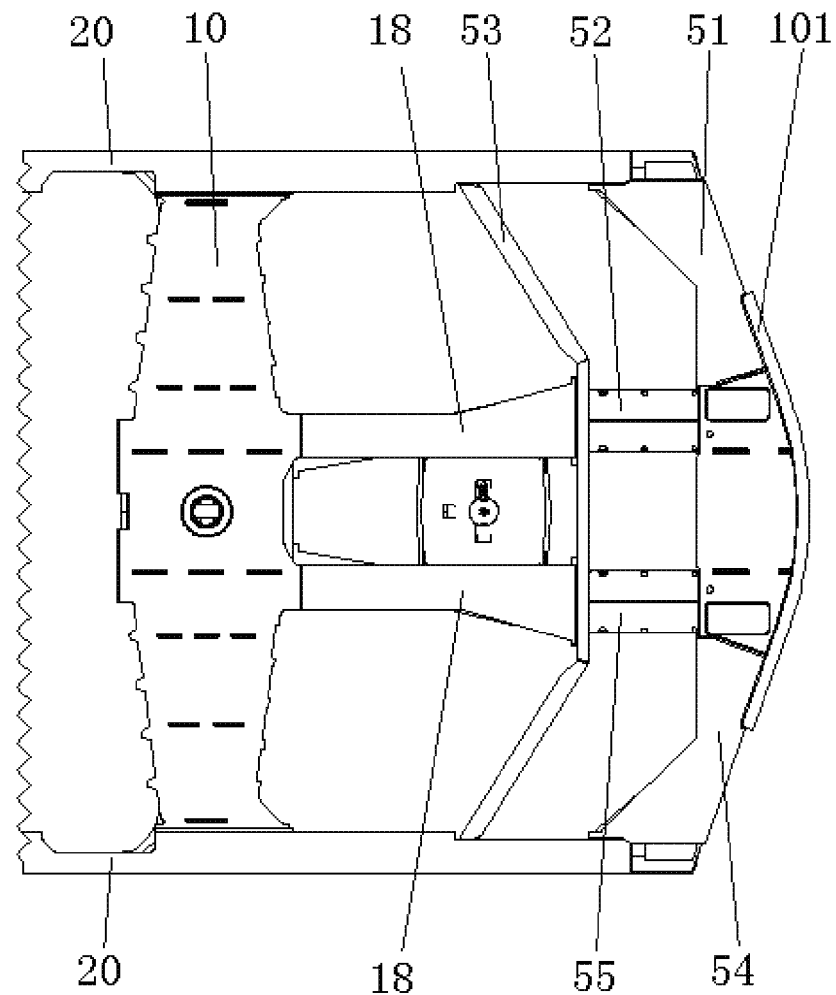
FIG. 4 is a top view of a second end of the underframe assembly of the rail vehicle according to the present invention.
Figure 5:
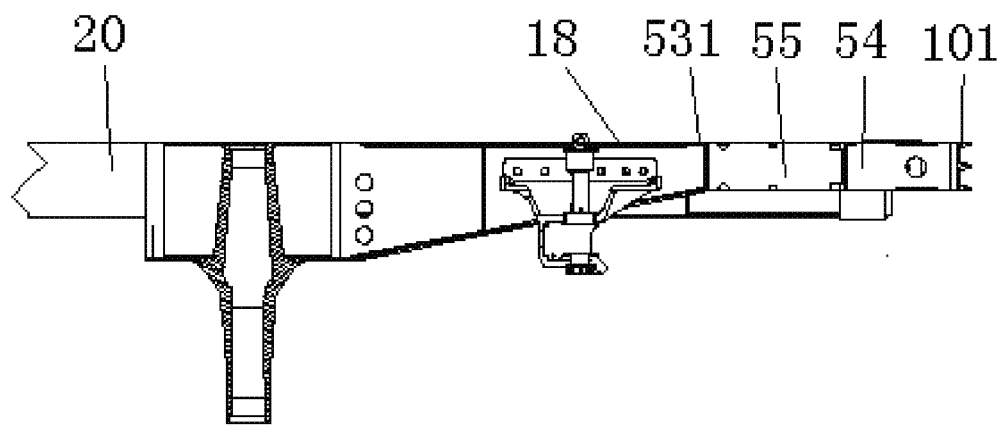
FIG. 5 is a side view of the second end of the underframe assembly of the rail vehicle according to the present invention.

As shown in FIG. 1, FIG. 2 and FIG. 4, in the present embodiment, the tertiary energy absorption structure 53 is connected to the second end of the energy absorption tube 55. Specifically, the tertiary energy absorption structure 53 includes a stopping beam 531, two ends of the stopping beam 531 are connected to the edge beam of underframe 20 of the rail vehicle respectively, and the second end of the energy absorption tube 55 is connected to the stopping beam 531. Such design increases the connecting strength of the energy absorption tube 55. That is, the energy absorption tube 55 forms an indirect connecting relationship with the edge beam of underframe 20 through the stopping beam, thereby avoiding the situation that controllable deformation cannot be performed due to unbalanced stress caused by the position offset of the energy absorption tube 55 when being collided. In addition, this design also increases the collision performance of the rail vehicle. That is, when the rail vehicle is collided, the stopping beam can provide a support against the collision, so as to reduce the degree of deformation of the rail vehicle. Further, the stopping beam is subjected to energy absorption deformation to absorb certain collision energy.

In addition, in the present embodiment, the stopping beam 531 is a cross beam having a U-shaped section. This design makes the stopping beam unlikely to deform, that is, the stopping beam 531 having the U-shaped section may bear a larger collision force without deformation. It is to be noted that the direction of the collision force may be the running direction of the rail vehicle, or may be the vehicle width direction of the rail vehicle.

As an optional example, specifically as shown in FIG. 1 and FIG. 4, the stopping beam 531 includes a first stopping segment, a second stopping segment and a third stopping segment connected in sequence, the second end of the energy absorption tube 55 is welded to the second stopping segment, a first included angle is provided between the first stopping segment and the second stopping segment, the first included angle is an obtuse angle, a second included angle is provided between the third stopping segment and the second stopping segment, and the first included angle is equal to the second included angle.

As another optional example, specifically as shown in FIG. 1 and FIG. 2, the stopping beam includes a fourth stopping segment, a fifth stopping segment and a sixth stopping segment connected in sequence, and the second end of the energy absorption tube 55 is welded to the second stopping segment. The length of the side surface of the fourth stopping segment is the same as the length of the side surface of the sixth stopping segment, the length of the side surface of the fifth stopping segment is smaller than the length of the side surface of the stopping segment, and the length of the side surface of the stopping beam is based on the running direction of the rail vehicle.

It is to be noted that the other surface of the second stopping segment is also welded to first ends of two traction beams 18, and second ends of the two traction beams 18 are welded to a sleeper beam 10, wherein a vehicle hook mounting seat 19 is also disposed between the two traction beams 18, the stopping beam and the sleeper beam 10.

The tertiary energy absorption structure 53 may also be adjusted in various manners. As an optional example, the first stopping segment is provided with multiple spaced second weight-reducing holes, wherein the second weight-reducing holes are used for reducing the weight of the rail vehicle or the collision energy absorption structure. Similarly, as another optional example, the third stopping segment is provided with multiple spaced third weight-reducing holes, wherein the third weight-reducing holes are used for reducing the weight of the rail vehicle or the collision energy absorption structure.

Further, the outer contour of the tertiary energy absorption structure 53 may be changed as required. For example, the stopping beam 531 is lengthened, or the stopping beam 531 is widened.

A preferred embodiment is then provided for further description.

1. When two adjacent vehicles collide, anti-creeping teeth 101 are touched, and the anti-creeping teeth 101 are welded to the primary energy absorption structure 51 and protrude from the primary energy absorption structure 51. The height and tooth number of the anti-creeping teeth 101 of the two vehicles are consistent, so that when the collision occurs, the end beam 54 ensures engagement of at least one anti-creeping tooth of the energy absorption beam, and the vehicles will not mismatch in the height direction.

2. When the collision is more severe, the primary energy absorption structure 51 formed by welding the first bottom plate and the second bottom plate of the end beam bottom plate 541 and the end beam vertical plate 542 connected to the end beam bottom plate 541 is locally deformed to absorb a part of energy. Moreover, the collision column welded to the end beam 54 and serving as the first energy absorption column 61 and the end corner post serving as the second energy absorption column 62 are always connected to the end beam 54.

3. When the collision is more severe, the secondary energy absorption structure 52 is induced by the first induction portion 553 and the second induction portion 556 to be deformed to absorb energy. Moreover, the end corner post, the end beam 54 and the secondary energy absorption structure 52 are always connected together, thus ensuring the safety of people behind the collision column and the end corner post.

4. After the energy absorption tube 55 absorbs energy to complete deformation, the front end is deformed, collision columns of the two vehicles are touched and collided to be deformed to absorb energy, and the energy absorption space of an end area is used completely. The vehicle roof assembly 90, the side wall assembly 70 and the chassis connected together with the vehicle front end are locally deformed, and the collision energy absorption of the vehicle is completed.

5. After the deformation of collision energy absorption is completed, the vehicle roof assembly 90, the side wall assembly 70 and the chassis connected together with the vehicle front end are locally deformed, but not separated.

Another embodiment of the present invention provides a rail vehicle. The rail vehicle includes a collision energy absorption structure, wherein the collision energy absorption structure is the above collision energy absorption structure. The collision energy absorption structure of the solution is not only an energy absorption member, but also a load carrying structure.

The primary energy absorption structure 51 on an end chassis, the vehicle roof assembly 90 and the end energy absorption structure 63 mounted between the vehicle roof assembly 90 and the primary energy absorption structure 51 form an end integrated energy absorption structure of a vehicle body structure, and an independent energy absorption structure element is no longer needed. The present invention improves the collision energy absorption performance of a vehicle without increasing the external dimension of the vehicle body structure, and meets the requirements for collision energy absorption of a vehicle body structure. In addition, since the external dimension of the vehicle body structure does not need to be changed, the dimension of the vehicle can be consistent with the existing vehicle, so that the requirements for a vehicle compatible with couplings can be met, and the compatibility of the vehicle is improved. Since the external dimension of the vehicle is not increased, the collision energy absorption structure of the present invention can meet the technical requirements of small gap between vehicle end couplings and small curve negotiation and can adapt to more complex road conditions.

Figure 11:
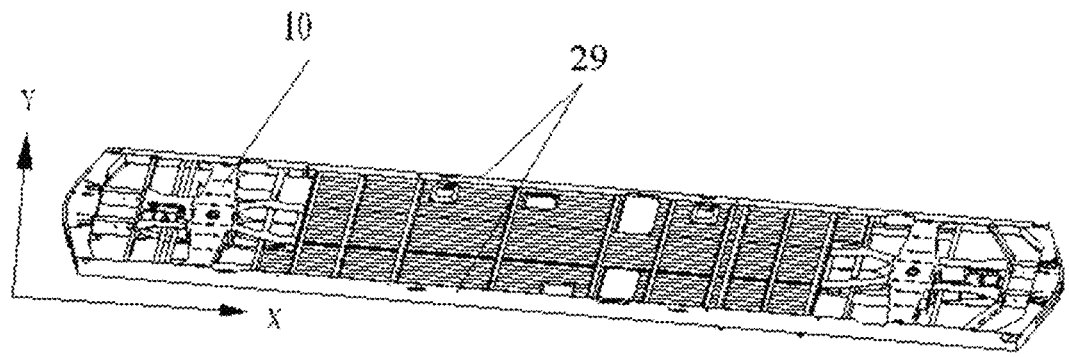
FIG. 11 is a third structure diagram of the underframe assembly of the rail vehicle according to the present invention.
Figure 13:
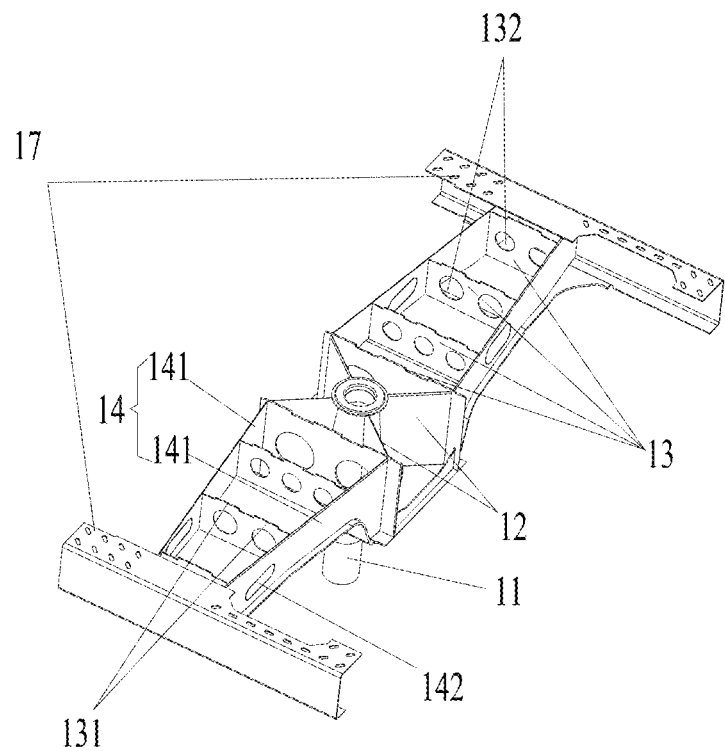
FIG. 13 is a schematic diagram of a part of structure of the sleeper beam in FIG. 12 (herein, an upper cover plate is removed)

As shown in FIG. 11 and FIG. 13, an embodiment of the present invention provides a chassis component of a rail vehicle. The chassis component of the present embodiment includes two spaced lower boundary beams 29 and two spaced sleeper beams 10. The two spaced sleeper beams 10 are disposed between the two lower boundary beams 29 along a length direction of the lower boundary beam 29, and the sleeper beam 10 includes a web structure 14, a center pin 11 and a mounting frame. The center pin 11 is connected to a bogie of a rail vehicle, the mounting frame is connected to the web structure 14, the center pin 11 is disposed on the mounting frame, the mounting frame includes multiple vertical plates 12, and the multiple vertical plates 12 are spaced along an outer wall surface of the center pin 11.

In the present application, multiple vertical plates 12 are disposed on the outer wall surface of the center pin 11 to form the mounting frame, so that the connecting area between the center pin 11 and the web structure 14 is increased, thus improving the connecting strength between the center pin 11 and the web structure 14. Compared with the screw-based threaded connection between the center pin disposed on the bogie and the sleeper beam in the conventional art, in the present application, the mounting frame is additionally provided to connect the center pin 11 and the web structure 14 of the sleeper beam 10, multiple vertical plates 12 are used to increase the connecting strength between the mounting frame and the center pin 11, and then the mounting frame provided with the center pin 11 is connected to the web structure 14, so that the connecting strength between the center pin 11 and the web structure 14 is improved, thus improving the overall strength of the sleeper beam 10.

Figure 39:
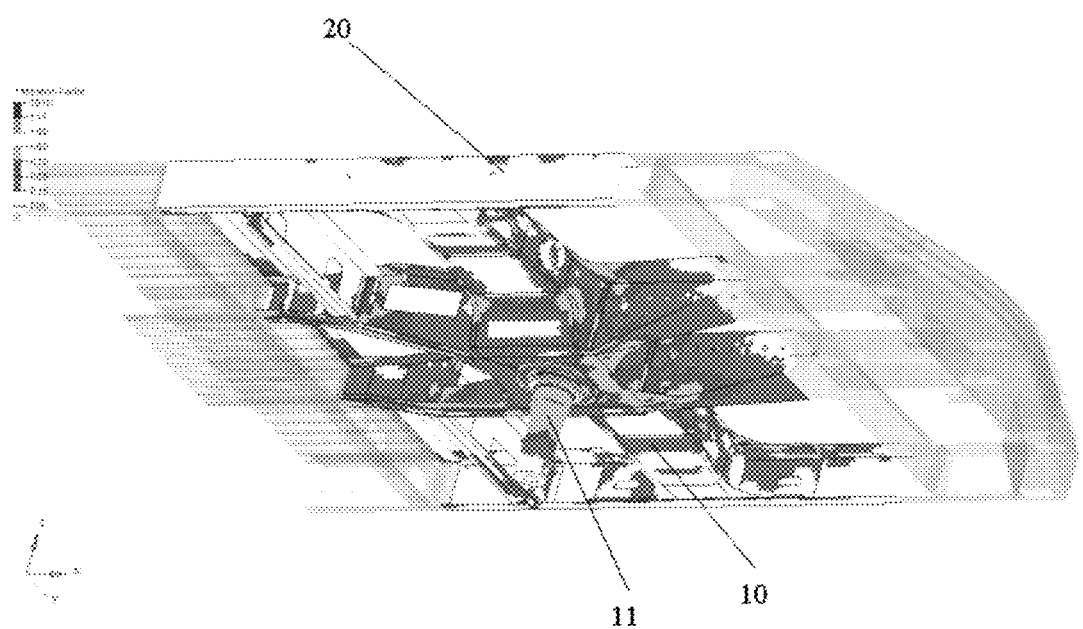
FIG. 39 is a stress nephogram of a part of the underframe assembly of the rail vehicle according to an embodiment of the present invention.
Figure 40:
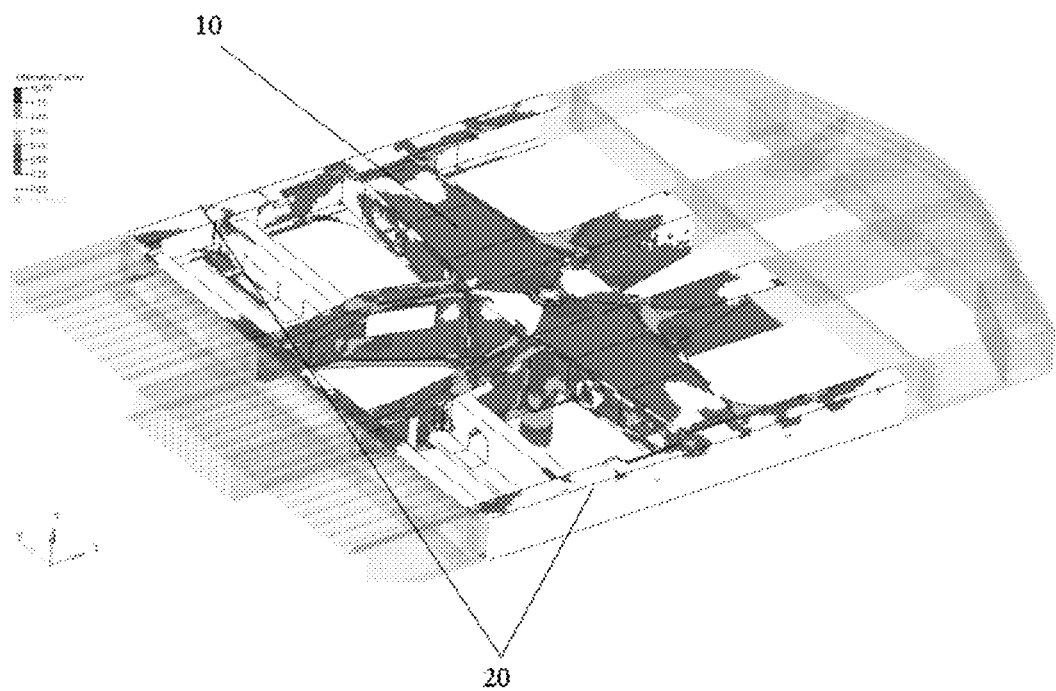
FIG. 40 is a stress nephogram in another direction of FIG. 39.

Specifically, as shown in FIG. 39 and FIG. 40, a joint between the sleeper beam 10 and the center pin 11 on the chassis component of the rail vehicle is a stress concentration area on the chassis component. During the operation process of the rail vehicle, it is necessary to ensure the connecting strength between the center pin 11 and the sleeper beam 10, so as to ensure that the center pin 11 can stably transfer force and torque from the bogie. Therefore, the center pin 11 in the present application is connected to the web structure 14 of the sleeper beam 10 through the mounting frame, the connecting strength is good, the connection is firm, and the normal operation of the rail vehicle is ensured.

As shown in FIG. 13, in the embodiment of the present invention, multiple vertical plates 12 are arranged on the outer wall surface of the center pin 11 in an X shape, each vertical plate 12 being welded to the outer wall surface of the center pin 11.

Specifically, the mounting frame in the embodiment of the present application is composed of four vertical plates 12, the four vertical plates 12 being arranged on the outer wall surface of the center pin 11 in an X shape. The arrangement improves the strength of the mounting frame, and the four vertical plates 12 simultaneously support the center pin 11, thereby improving the connecting strength between the center pin 11 and the mounting frame. Thus, when the mounting frame provided with the center pin 11 is subsequently assembled to the web structure 14, the center pin 11 is not easily separated from the mounting frame, and can be better connected to the bogie.

Further, the four vertical plates 12 are welded to the outer wall surface of the center pin 11 respectively, and compared with bolt connection between the center pin and the sleeper beam in the conventional art, the connecting mode of the present application is firmer. The four vertical plates 12 and the center pin 11 are welded to form a whole, thereby ensuring the overall strength of the sleeper beam 10.

Of course, in an alternative embodiment not illustrated in the drawings of the present invention, the number of vertical plates 12 of the mounting frame is not limited to 4, and can be appropriately set according to the internal space of the sleeper beam 10.

As shown in FIG. 13, in the embodiment of the present invention, the sleeper beam 10 includes two web structures 14, the mounting frame being located between the two web structures 14.

In the present application, the mounting frame is located between the two web structures 14, and the mounting frame is connected to the two web structures 14 respectively, so that two ends of the mounting frame are fixed, and the stability of the mounting frame is improved, thus ensuring the stability of connection between the center pin 11 and the web structure 14 of the sleeper beam 10.

As shown in FIG. 13, in the embodiment of the present invention, the sleeper beam 10 further includes multiple rib plates 13, the web structure 14 includes two spaced webs 141, and multiple rib plates 13 are spaced between the two webs 141.

Preferably, the two webs 141 of the web structure 14 in the present application form an included angle, and spacing between the two webs 141 is gradually reduced along a direction away from the mounting frame.

Multiple rib plates 13 are disposed between the two webs 141, and preferably, the multiple rib plates 13 are disposed between the two webs 141 in parallel. The arrangement improves the structural strength of the sleeper beam 10, and the multiple rib plates 13 can effectively share the action force transferred to the sleeper beam 10, thereby improving the bearing capacity of the sleeper beam 10.

Of course, in an alternative embodiment not illustrated in the drawings of the present invention, the multiple rib plates 13 may form an included angle between the two webs 141, and a specific arrangement mode may be selected according to the bearing situation of the sleeper beam 10.

As shown in FIG. 13, in the embodiment of the present invention, the web structure 14 is connected to at least one vertical plate 12 of the mounting frame through at least one rib plate 13.

Specifically, the web structure 14 is connected to the two vertical plates 12 of the mounting frame through the outermost rib plate 13, that is, the rib plate 13 closest to the mounting frame is connected to the two vertical plates 12, and the rib plate 13 is connected to the two webs 141 of the web structure 14.

In the arrangement, the mounting frame is connected to the web structure 14 through the rib plate 13. Compared with direct connection between the mounting frame and the web structure 14, the arrangement mode of the present application converts line-to-line connection between the mounting frame and the web structure 14 into line-to-surface connection between the vertical plate 12 and the rib plate 13 and line-to-surface connection between the web 141 and the rib plate 13, so that the connecting strength between the mounting frame and the web structure 14 is improved, and the stability of connection between the mounting frame and the web structure 14 is ensured, thus ensuring the stability of connection between the center pin 11 and the web structure 14.

As shown in FIG. 13, in the embodiment of the present invention, at least one rib plate 13 in the multiple rib plates 13 is provided with a weight-reducing through hole 132.

Preferably, each rib plate 13 is provided with a weight-reducing through hole 132.

On the premise of ensuring that the rib plate 13 can improve the strength of the sleeper beam 10, the weight of the rib plate 13 is reduced, thus realizing the light weight of the sleeper beam 10, and reducing the weight of the chassis component. Further, by providing the weight-reducing through hole 132, the transfer of the impact force can be stopped when the vehicle body is impacted, thereby avoiding damage to the rear end of the vehicle body caused by the impact force, and improving the safety of the vehicle body.

Of course, in an alternative embodiment not illustrated in the drawings of the present invention, the size of the rib plate 13 may be designed as required, and the weight-reducing through hole 132 may also be provided on the partial rib plate 13, so as to ensure the strength of the sleeper beam 10 and reduce the weight of the sleeper beam 10.

Figure 14:
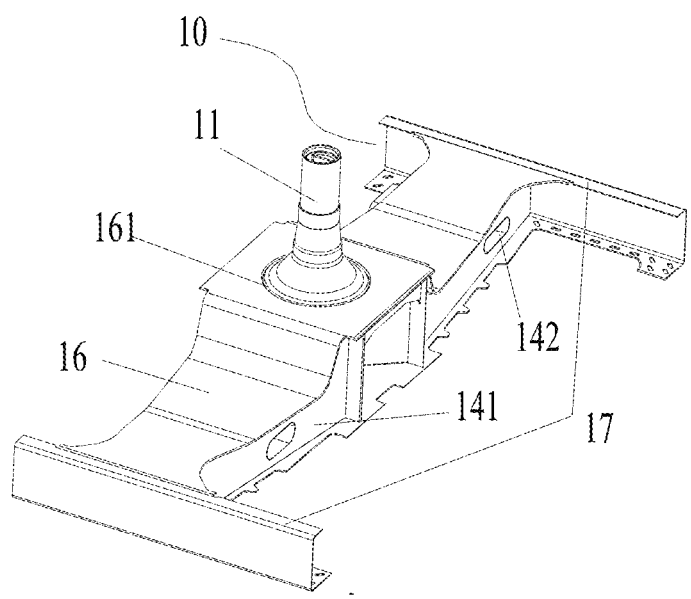
FIG. 14 is a structure diagram of the sleeper beam in another direction in FIG. 12.

As shown in FIG. 13 and FIG. 14, in the embodiment of the present invention, each web 141 is provided with a wire passage hole 142.

A wire harness may pass through the chassis component of the rail vehicle, and in order to facilitate the connection and penetration of the wire harness, a wire passage hole 142 is provided on the web 141 for the penetration out or in of the wire harness.

Specifically, in the present application, the wire passage holes 142 on the two webs 141 of the web structure 14 are correspondingly provided to facilitate the penetration of the wire harness. Preferably, a pipeline for wire passage may penetrate into the wire passage hole 142, so that the wire harness penetrates into the pipeline for the storage of the wire harness, thereby avoiding damage to the wire harness caused by wire harness exposure.

Figure 12:
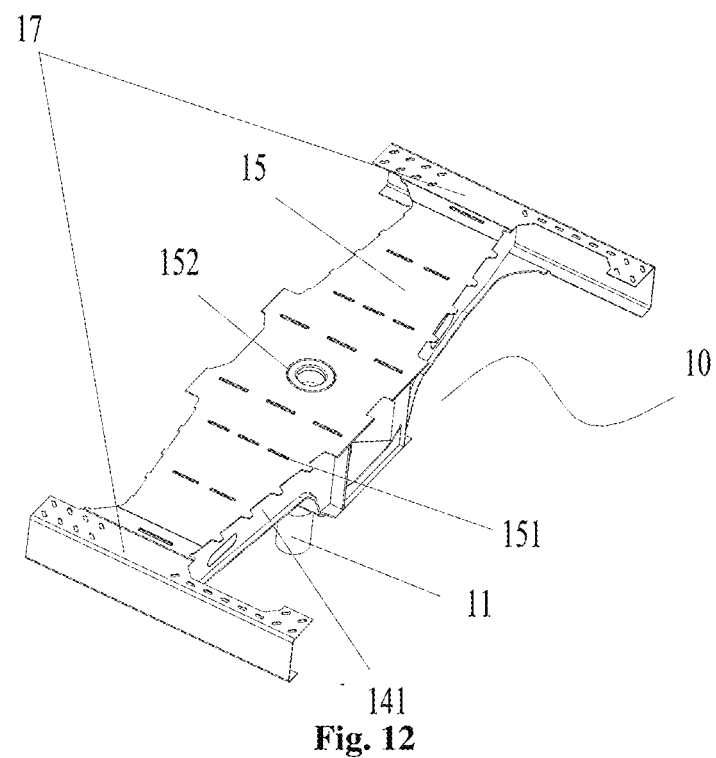
FIG. 12 is a structure diagram of a sleeper beam of the underframe assembly in FIG. 11.

As shown in FIG. 12, in the embodiment of the present invention, the sleeper beam 10 further includes an upper cover plate 15 covering the web 141, the upper cover plate 15 is provided with multiple through holes 151, the rib plate 13 is provided with a protrusion 131, and the protrusion 131 matches the corresponding through hole 151.

Figure 15:
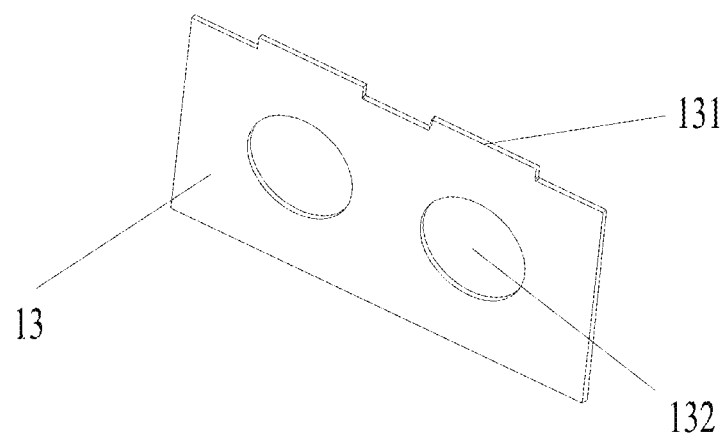
FIG. 15 is a structure diagram of a reinforcing plate of the sleeper beam in FIG. 12.

Preferably, as shown in FIG. 15, each rib plate 13 of the present application is provided with a protrusion 131, and the upper cover plate 15 is provided with multiple through holes 151 in one-to-one correspondence with the multiple protrusions 131. By means of the arrangement, after the upper cover plate 15 covers the web 141, the protrusions 131 on the rib plate 13 are in inserted fit with the through holes 151 on the upper cover plate 15, so as to connect the upper cover plate 15 and the rib plate 13 together. Thus, the upper cover plate 15 covers a cavity defined by the web structure 14 and the rib plate 13, so as to form a box structure of the sleeper beam 10.

Further, in order to ensure the connecting strength between the upper cover plate 15 and the rib plate 13, after the protrusions 131 are in inserted fit with the through holes 151, the fit part is welded, so as to further ensure the connecting strength between the upper cover plate 15 and the rib plate 13, thereby ensuring the overall strength of the sleeper beam 10.

As shown in FIG. 12, in the embodiment of the present invention, the upper cover plate 15 is provided with a first penetration-out hole 152, one end of the center pin 11 penetrating out of the first penetration-out hole 152.

The arrangement ensures the fit between the center pin 11 and the upper cover plate 15, the first penetration-out hole 152 limits the center pin 11, and it is ensured that the center pin 11 is pivoted to the bogie disposed at the lower part of the chassis component.

As shown in FIG. 14, in the embodiment of the present invention, the sleeper beam 10 further includes a lower cover plate 16 disposed at the lower part of the web 141, the lower cover plate 16 being fixedly connected to each rib plate 13.

In the present application, the upper cover plate 15 corresponds to the lower cover plate 16, and the upper cover plate 15, the lower cover plate 16 and the web structure 14 jointly define a box structure. Further, the lower cover plate 16 is fixedly connected to each rib plate 13, thereby ensuring the stability of connection between the rib plate 13 and the lower cover plate 16.

Preferably, each web 141 is welded to the lower cover plate 16, the rib plate 13 is welded to the web 141, and after the upper cover plate 15 is in inserted fit with each rib plate 13, welding fixing is performed. The arrangement makes the sleeper beam 10 form a stable whole, and ensures the overall strength of the sleeper beam 10.

Preferably, as shown in FIG. 14, in the embodiment of the present invention, the lower cover plate 16 is provided with a second penetration-out hole 161, the other end of the center pin 11 penetrating out of the second penetration-out hole 161.

The arrangement ensures the connection between the center pin 11 and the bogie disposed at the lower part of the chassis component, thus ensuring that the sleeper beam 10 may transfer force and torque transferred from the bogie to the vehicle body.

As shown in FIG. 11 and FIG. 12, in the embodiment of the present invention, the sleeper beam 10 further includes two spaced inner boundary beams 17, the two inner boundary beams 17 being in one-to-one corresponding connection with the two lower boundary beams 29.

In a width direction of the chassis component, the two inner boundary beams 17 are spaced at two ends of the sleeper beam 10. Moreover, the two inner boundary beams 17 are in one-to-one corresponding connection with the two lower boundary beams 29 respectively so as to connect the sleeper beam 10 and the lower boundary beam 29.

Preferably, the inner boundary beam 17 is welded to the lower boundary beam 29, thereby ensuring the connecting strength between the sleeper beam 10 and the lower boundary beam 29.

As shown in FIG. 13, in the embodiment of the present invention, the inner boundary beam 17 is connected to two webs 141 of at least one web structure 14.

Specifically, in the embodiment of the present invention, the sleeper beam 10 includes two web structures 14, the two web structures 14 being located on two sides of the mounting frame respectively. The inner boundary beams 17 located on the same side of the mounting frame are welded to the two webs 141 of the web structure 14 respectively.

The arrangement forms a complete cavity inside the sleeper beam 10, and the web 141 is welded to the inner boundary beam 17, thus ensuring the overall strength of the sleeper beam 10.

Figure 16:
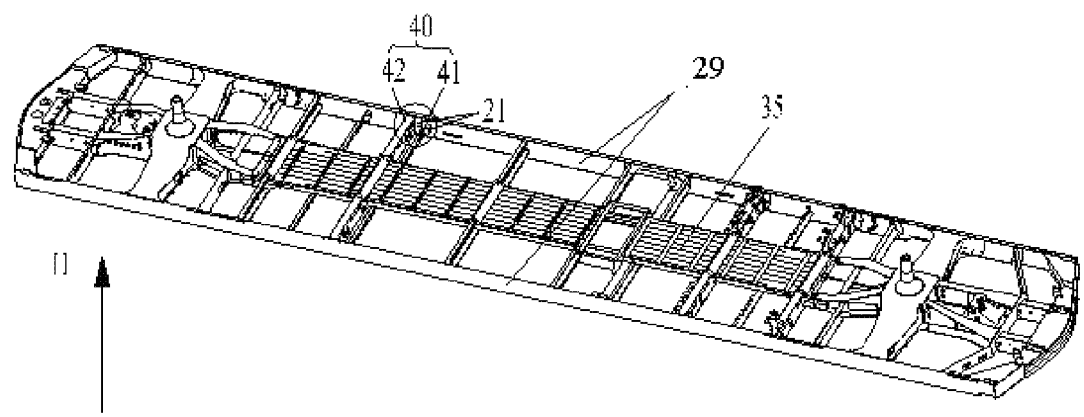
FIG. 16 is a schematic diagram of three-dimensional structure of the underframe assembly in FIG. 11.
Figure 17:
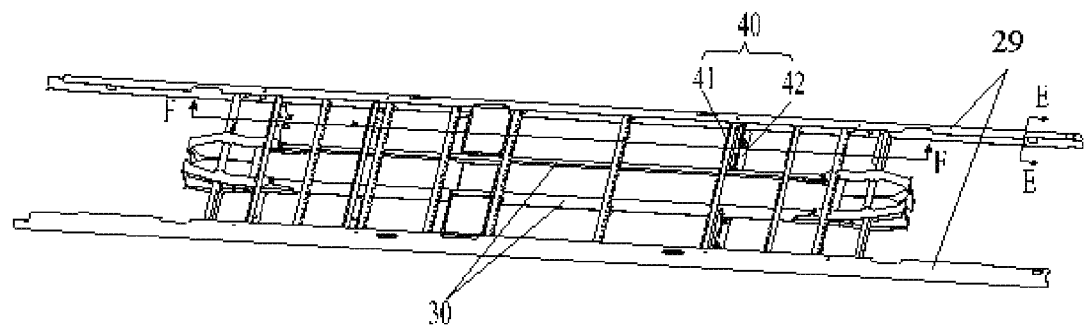
FIG. 17 is a structure diagram of the underframe assembly in direction H in FIG. 16 (herein, a lower boundary beam, a crossbeam, and a middle beam are shown)

As shown in FIG. 16 and FIG. 17, an embodiment of the present invention provides a underframe assembly of a rail vehicle. The underframe assembly of the present embodiment further includes two spaced lower boundary beams 29 and multiple cross beam components 40 disposed between the two lower boundary beams 29, the multiple cross beam components 40 are spaced along a length direction of the lower boundary beam 29, at least one of the lower boundary beams 29 is provided with a connecting base 21, and at least one end of the cross beam component 40 is connected to the lower boundary beam 29 through the connecting base 21.

Specifically, the connecting base 21 in the present application is in surface-to-surface contact with the cross beam component 40, and the connecting base 21 is in surface-to-surface contact with the lower boundary beam 29. Thus, a connecting relationship between the cross beam component 40 and the lower boundary beam 29 is converted into connection between the cross beam component 40 and the connecting base 21 and connection between the connecting base 21 and the lower boundary beam 29, and a line-to-surface contact between the cross beam component 40 and the lower boundary beam 29 in the conventional art is converted into a surface-to-surface contact through the connecting base 21, thereby improving the connecting strength between the cross beam component 40 and the lower boundary beam 29, and ensuring the strength and rigidity requirements for the underframe assembly. Further, compared with a line-to-surface contact achieved by welding or clamping between the cross beam component 40 and the lower boundary beam 29 in the conventional art, the surface-to-surface contact in the present application more facilitates connection, facilitates assembly of the underframe assembly by an operator, and improves the assembly efficiency.

As shown in FIG. 18 to FIG. 21, in the embodiment of the present invention, the lower boundary beam 29 includes a first flat plate 201, a vertical plate 202 and a second flat plate 203 connected in sequence, and the connecting base 21 includes a first connecting plate 211, a second connecting plate 212 and a third connecting plate 213. The first connecting plate 211 is connected to the vertical plate 202; the second connecting plate 212 forms an included angle with the first connecting plate 211, and the second connecting plate 212 is connected to the cross beam component 40; and the third connecting plate 213 forms an included angle with the first connecting plate 211 and the second connecting plate 212 respectively, the third connecting plate 213 is connected to the first flat plate 201 or the second flat plate 203.

Specifically, the connecting base 21 in the present application is composed of three connecting plates, any two connecting plates are vertically connected, the connection between the cross beam component 40 and the lower boundary beam 29 is converted into the connection between the cross beam component 40 and the connecting base 21 and the connection between the connecting base 21 and the lower boundary beam 29 by providing the connecting base 21. Thus, a line connection or a point connection between the cross beam component 40 and the lower boundary beam 29 in the conventional art is converted into a surface connection between the cross beam component 40 and the connecting base 21 and a surface connection between the connecting base 21 and the lower boundary beam 29. Therefore, the arrangement improves the connecting strength of the cross beam component 40 connected to the lower boundary beam 29, and ensures the rigidity requirements for the underframe assembly of the rail vehicle.

Preferably, in the embodiment of the present invention, when the connecting base 21 is used for connecting the first cross beam 41 and the lower boundary beam 29, the first connecting plate 211 is welded to the vertical plate 202, and the third connecting plate 213 is welded to the first flat plate 201; and when the connecting base 21 is used for connecting the second cross beam 42 and the lower boundary beam 29, the first connecting plate 211 is welded to the vertical plate 202, and the third connecting plate 213 is welded to the second flat plate 203.

In the arrangement, the welding mode is simpler and high in strength, and ensures the connecting strength between the connecting base 21 and the lower boundary beam 29.

Preferably, the second connecting plate 212 is welded to the cross beam component 40.

The arrangement ensures the connecting strength between the cross beam component 40 and the connecting base 21, and the connecting base 21 is also connected to the lower boundary beam 29 in a welding mode, thus ensuring the connecting strength between the cross beam component 40 and the lower boundary beam 29, and meeting the strength and rigidity requirements for the underframe assembly.

Preferably, the first connecting plate 211, the second connecting plate 212 and the third connecting plate 213 in the present application are of an integrated forming structure, and the arrangement ensures the strength of the connecting base 21.

Figure 19:
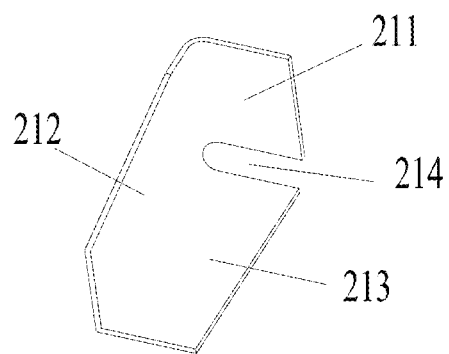
FIG. 19 is a structure diagram of a connecting base of the underframe assembly in FIG. 16.

As shown in FIG. 19, the connecting base 21 in the present application is further provided with a weight-reducing hole 214. The provision of the weight-reducing hole 214 reduces the weight of the underframe assembly, and facilitates forming of the connecting base 21.

As shown in FIG. 16 and FIG. 17, in the embodiment of the present invention, at least one cross beam component 40 in the multiple cross beam components 40 includes a first cross beam 41 and a second cross beam 42. Two opposite ends of the first cross beam 41 are correspondingly connected to the two lower boundary beams 29, and the second cross beam 42 and the first cross beam 41 are correspondingly disposed in a height direction of the lower boundary beam 29.

Specifically, as shown in FIG. 10, the first cross beam 41 and the second cross beam 42 are correspondingly disposed in the height direction of the lower boundary beam 29, and the second cross beam 42 is disposed below the first cross beam 41.

Further, multiple first cross beams 41 and multiple second cross beams 42 are disposed between the two lower boundary beams 29 in the length direction of the underframe assembly. Optionally, the length of the first cross beam 41 is equal to spacing between the two opposite lower boundary beams 29.

In the present application, the cross beam component 40 is set as a matching structure of the first cross beam 41 and the second cross beam 42, multiple first cross beams 41 having the same structure and multiple second cross beams 42 having the same structure are processed during the production, and then the first cross beams 41 and the second cross beams 42 are assembled according to the structure requirements of the underframe assembly, thereby implementing the modularization of the assembly process, and improving the production efficiency.

Figure 18:
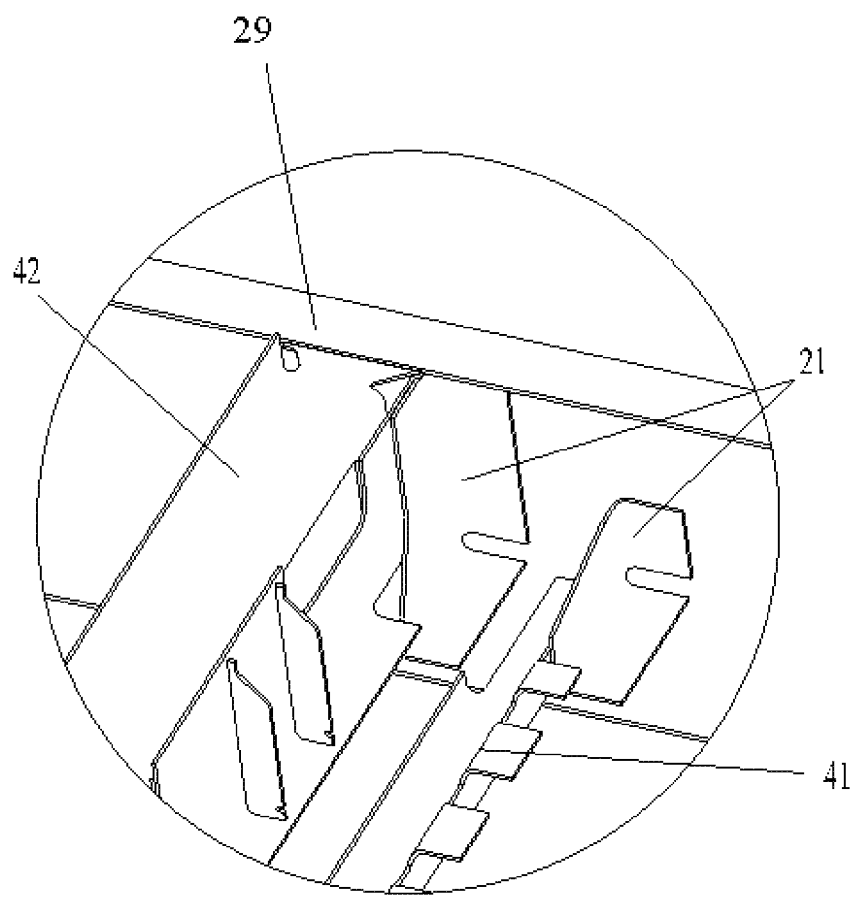
FIG. 18 is a partial enlargement diagram of FIG. 16.

As shown in FIG. 16 and FIG. 18, in the embodiment of the present invention, at least one lower boundary beam 29 is provided with two connecting bases 21, and the first cross beam 41 and the second cross beam 42 are connected to the lower boundary beam 29 through the corresponding connecting bases 21, respectively.

In the present application, the first cross beam 41 and the second cross beam 42 are connected to the lower boundary beam 29 through the connecting bases 21, respectively.

Preferably, the size of the connecting base 21 may be adjusted according to the cross section sizes of the first cross beam 41 and the second cross beam 42, so as to match the cross section size of the first cross beam 41 or the second cross beam 42.

As shown in FIG. 16, in the embodiment of the present invention, the second cross beam 42 includes multiple cross beam segments connected in sequence, at least one of the multiple cross beam segments is connected to one of the two lower boundary beams 29, and at least another of the multiple cross beam segments is connected to the other one of the two lower boundary beams 29.

Specifically, the second cross beam 42 in the present application includes three cross beam segments connected in sequence. One end of one outermost cross beam segment is connected to one of the lower boundary beams 29 through the connecting base 21, and the other end is connected to the cross beam segment in the middle of the second cross beam 42. One end of the other outermost cross beam segment is connected to the other lower boundary beam 29 through the connecting base 21. Therefore, the two outermost cross beam segments in the three cross beam segments are correspondingly connected to the two lower boundary beams 29, and the middle cross beam segment is connected to the cross beam segments at two ends.

Figure 20:
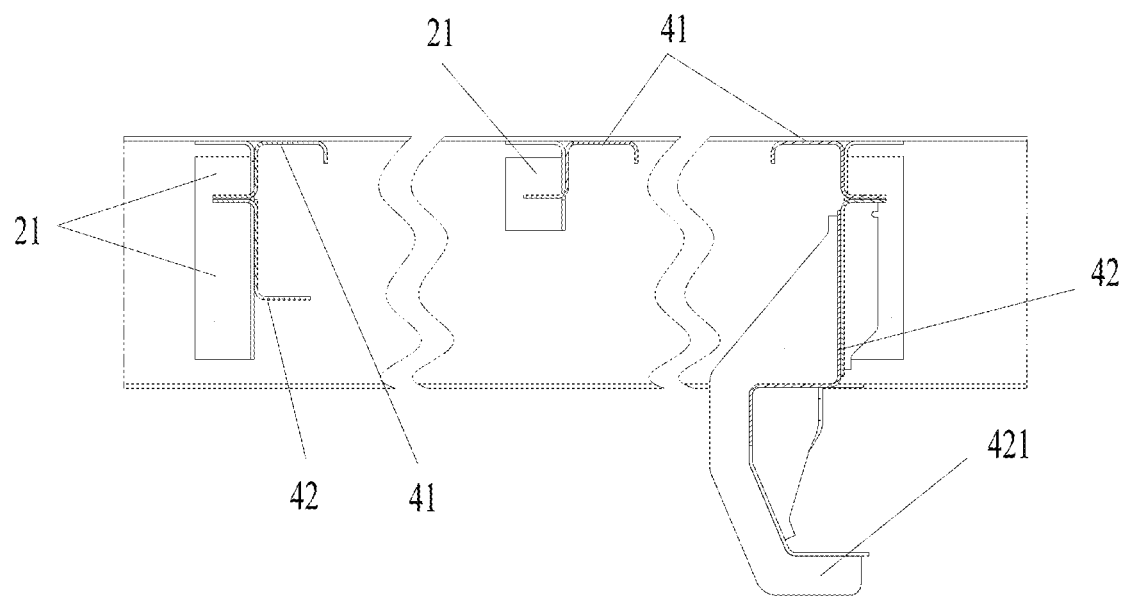
FIG. 20 is a section view in direction F-F in FIG. 17.
Figure 21:
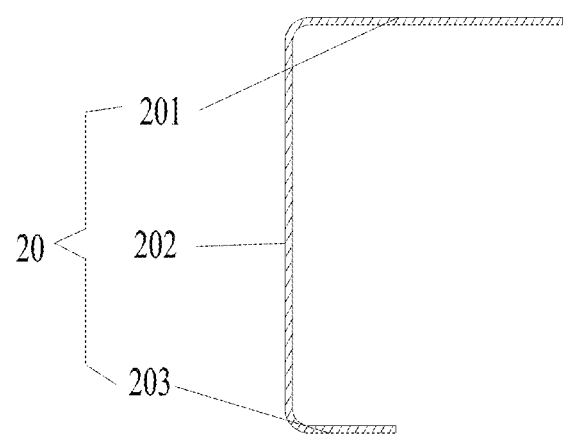
FIG. 21 is a section view in direction E-E in FIG. 17.

As shown in FIG. 20, in the embodiment of the present invention, the underframe assembly includes multiple second cross beams 42, a side, away from the first cross beam 41, of at least one second cross beam 42 is provided with a hooking portion 421.

In the present application, since a device at the bottom of the underframe assembly cannot be welded to the underframe assembly, the underframe assembly can be hooked to the bottom device by providing the hooking portion 421, so that the connection requirements are met.

Preferably, the hooking portion 421 and the second cross beam 42 are of an integrated forming structure.

As shown in FIG. 16 and FIG. 17, in the embodiment of the present invention, the underframe assembly further includes a middle beam 30 disposed between the two lower boundary beams 29, the middle beam 30 extending along the length direction of the lower boundary beam 29.

Specifically, the underframe assembly of the present application includes two spaced middle beams 30, the two middle beams 30 extend along the length direction of the lower boundary beam 29, and the two middle beams 30 match the lower boundary beam 29, so as to meet the strength requirements in the length direction of the underframe assembly.

Of course, in an alternative embodiment not illustrated in the drawings of the present invention, the number of the middle beams 30 is not limited to two, and can be set according to the space of the underframe assembly and the strength and rigidity requirements.

Preferably, as shown in FIG. 16 and FIG. 17, in the embodiment of the present invention, the middle beam 30 forms an included angle with each cross beam component 40.

In the present application, each cross beam component 40 is vertical to the middle beam 30, and each cross beam component 40 is also vertical to the two lower boundary beams 29. The arrangement makes the underframe assembly form a structure similar to a grid, thus improving the strength and rigidity of the underframe assembly, and ensuring the mounting and normal operation of the device on the underframe assembly.

As shown in FIG. 16, in the embodiment of the present invention, the underframe assembly further includes a cover plate 35 disposed on the middle beam 30, a ventilation air duct being formed between the cover plate 35 and the middle beam 30.

Specifically, the ventilation air duct is disposed on the underframe assembly, and the ventilation air duct is provided with an air supply opening and an air outlet communicated with an in-vehicle environment. The cover plate 35 matches the middle beam 30 to form the ventilation air duct, thus forming a longitudinal beam along the length direction of the underframe assembly. The longitudinal beam and the lower boundary beam 29 cooperatively share the weight of a vehicle body structure and an apparatus in the vehicle, thereby improving the bearing capacity of the rail vehicle.

In the present application, at least one cross beam component 40 in the multiple cross beam components 40 only includes a first cross beam 41. The second cross beam 42 in the present application supports the cover plate 35, a person skilled in the art may appropriately set the number of second cross beams 42 as required, on the premise of ensuring the strength of the underframe assembly, the number of the second cross beams 42 may be appropriately reduced, and the second cross beams do not need to be in one-to-one correspondence with the first cross beams 41. The reduction of the number of the second cross beams 42 can reduce the weight of the underframe assembly, thereby achieving the effect of light weight.

Figure 22:
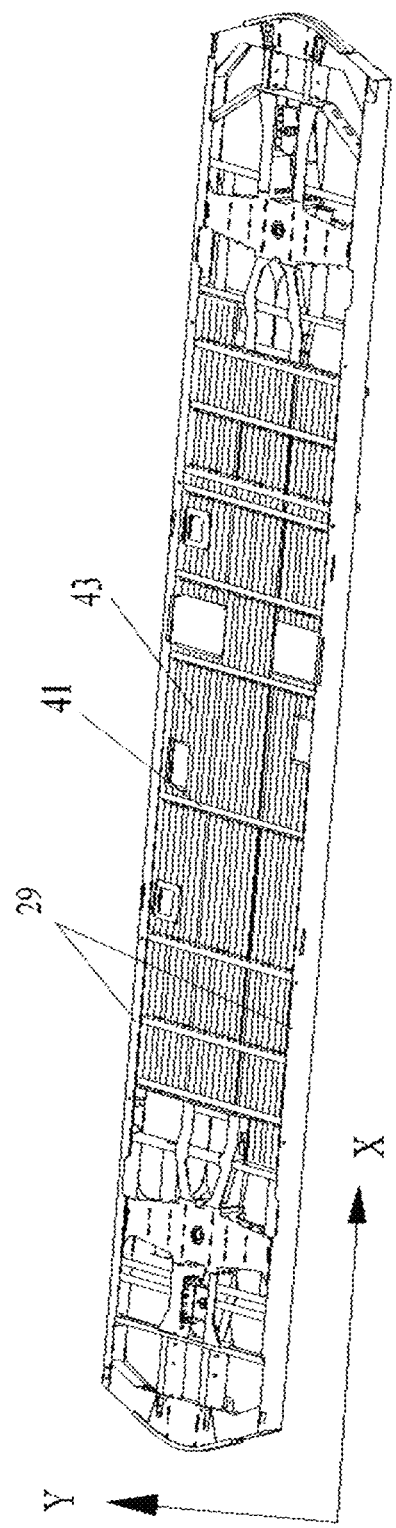
FIG. 22 is a fourth structure diagram of the underframe assembly of the rail vehicle according to the present invention (herein, a floor is shown)

In the present invention and the embodiments of the present invention, as shown in FIG. 22, a length direction of a underframe assembly is an X direction, and a width direction of the underframe assembly is a Y direction.

Figure 23:
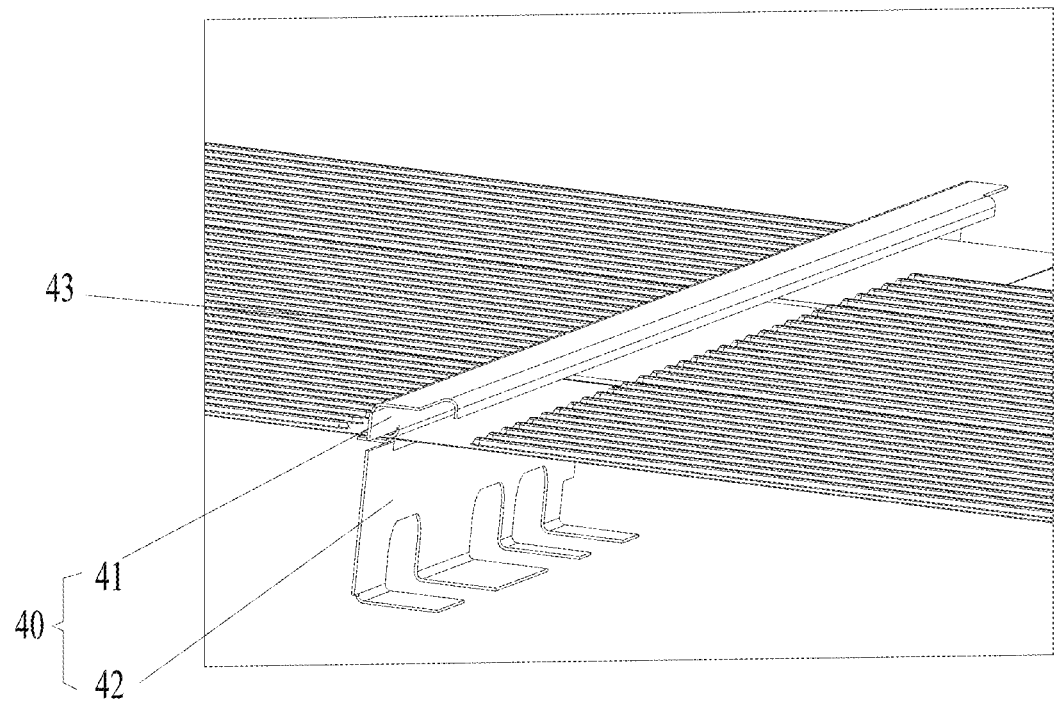
FIG. 23 is a partial structure diagram showing that a cross beam component of the underframe assembly coordinates with the floor in FIG. 22.

As shown in FIG. 22 and FIG. 23, an embodiment of the present invention provides a underframe assembly of a rail vehicle. The underframe assembly includes a lower boundary beam 29 and a cross beam component 40. There are two lower boundary beams 29, the two lower boundary beams 29 being spaced. The cross beam component 40 is disposed between the two lower boundary beams 29, there are multiple cross beam components 40, and the multiple cross beam components 40 are spaced along the length direction of the lower boundary beam 29, wherein at least one cross beam component 40 includes a first cross beam 41 and a second cross beam 42 disposed below the first cross beam 41 in the height direction of the lower boundary beam 29, the first cross beam 41 and the second cross beam 42 form a mounting cavity, and a portion of the floor 43 of the rail vehicle penetrates in the mounting cavity.

In the present application, the cross beam component 40 includes a first cross beam 41 and a second cross beam 42, the first cross beam 41 and the second cross beam 42 being disposed in sequence in the height direction of the lower boundary beam 29, so that the first cross beam 41 and the second cross beam 42 are both located in a space formed by the two lower boundary beams 29, and a mounting cavity is formed between the first cross beam 41 and the second cross beam 42. Thus, when the floor 43 is mounted in the mounting cavity of the cross beam component 40, the height of an upper surface of the floor 43 is lower than the height of an upper surface of the lower boundary beam 29. Compared with the conventional art in which the floor is directly paved above the cross beam, the present application enlarges the internal space of the vehicle when ensuring that the height of the underframe assembly is not increased. Further, the floor 43 at least partially penetrates into the mounting cavity, and the floor 43 is sandwiched between the first cross beam 41 and the second cross beam 42, thereby improving the mounting strength of the floor 43.

Figure 24:
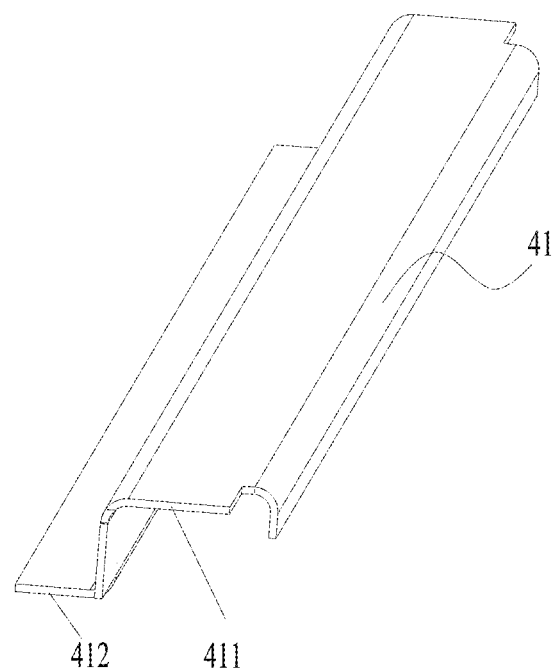
FIG. 24 is a structure diagram of a first crossbeam of the cross beam component in FIG. 23.

As shown in FIG. 23 and FIG. 24, in the embodiment of the present invention, the first cross beam 41 includes a U-shaped beam 411 and a connecting beam 412 connected to the U-shaped beam 411, the connecting beam 412 being connected to the floor 43.

Specifically, the U-shaped beam 411 of the present application includes two opposite vertical segments and a horizontal segment connecting the two vertical segments, wherein one of the two vertical segments is connected to the connecting beam 412, and the height size of the vertical segment is greater than the height size of the other vertical segment.

By means of the arrangement, the strength of the U-shaped beam 411 is good, and the strength requirements for the underframe assembly of the rail vehicle are met. Further, the connecting beam 412 is of a flat plate structure, and the connecting beam 412 is in surface-to-surface contact with the floor 43, so that the connecting strength between the first cross beam 41 and the floor 43 is improved.

Specifically, in the embodiment of the present invention, the U-shaped beam 411 and the connecting beam 412 are of an integrated forming structure.

The arrangement ensures the overall strength of the first cross beam 41, facilitates processing, and makes the integrity of the first cross beam 41 good.

Of course, in an alternative embodiment not illustrated in the present invention, the U-shaped beam 411 and the connecting beam 412 may be separately disposed, as long as the connecting strength between the U-shaped beam 411 and the connecting beam 412 can be ensured.

Figure 25:
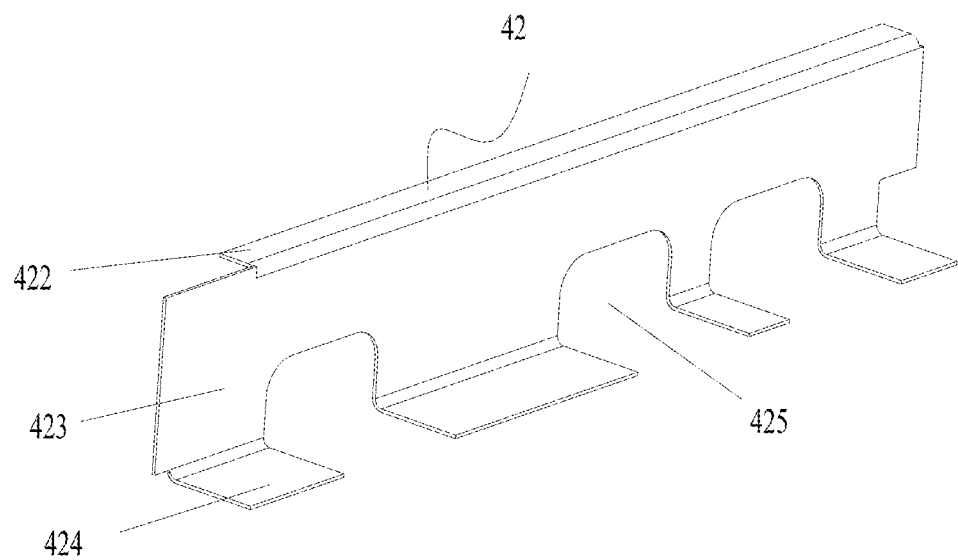
FIG. 25 is a structure diagram of a second crossbeam of the cross beam component in FIG. 23.

As shown in FIG. 23 and FIG. 25, in the embodiment of the present invention, the cross section of the second cross beam 42 is Z-shaped in the width direction of the underframe assembly.

The arrangement makes the strength of the second cross beam 42 high. Compared with the conventional art in which the cross beam is usually C-shaped, the Z-shaped second cross beam 42 of the present application can better meet the strength and rigidity requirements for the underframe assembly of the rail vehicle.

As shown in FIG. 25, in the embodiment of the present invention, the second cross beam 42 includes a first horizontal beam 422, a vertical beam 423 and a second horizontal beam 424 connected in sequence, the first horizontal beam 422 and the second horizontal beam 424 are located on two sides of the vertical beam 423 respectively, and the first horizontal beam 422 is connected to a side, away from the first cross beam 41, of the floor 43.

In the present application, the first horizontal beam 422 and the second horizontal beam 424 are disposed on two sides of the vertical beam 423, and a joint between the first horizontal beam 422 and the floor 43 is a surface-to-surface contact, so that the connecting strength between the first horizontal beam 422 and the floor 43 is better.

Preferably, in the embodiment of the present invention, the first horizontal beam 422, the vertical beam 423 and the second horizontal beam 424 are of an integrated forming structure.

The arrangement ensures the overall strength of the first cross beam 41, facilitates processing, and makes the integrity of the first cross beam 41 good.

As shown in FIG. 25, in the embodiment of the present invention, the second cross beam 42 is provided with a wire passage groove 425, the wire passage groove 425 penetrating through the second horizontal beam 424 and extending to the vertical beam 423.

Specifically, a wire harness will pass through the lower part of the underframe assembly. Since the second cross beam 42 is located below the floor 43 and the wire passage groove 425 is provided on the second cross beam 42, the wire harness is convenient to penetrate out of the wire passage groove 425, which facilitates wiring of the rail vehicle and storage of the wire harness. Further, the wire harness is received in the wire passage groove 425, so that the wire harness is prevented from occupying a space below the underframe assembly and ensuring the compact structure and good integrity of the underframe assembly.

Preferably, in the embodiment of the present invention, the floor 43 is welded to the first cross beam 41, and the floor 43 is welded to the second cross beam 42.

The arrangement ensures the connecting strength between the floor 43 and the cross beam component 40, the connecting beam 412 of the first cross beam 41 is in surface-to-surface contact with the floor 43, and the first horizontal beam 422 of the second cross beam 42 is also in surface-to-surface contact with the floor 43, thereby facilitating welding. Further, the floor 43 is sandwiched between the first cross beam 41 and the second cross beam 42, the second cross beam 42 supports the floor 43, and the floor 43 is firmly mounted.

Preferably, in the embodiment of the present invention, the floor 43 is a corrugated plate. The strength of the corrugated plate is good, thereby ensuring the use strength of the floor 43.

As shown in FIG. 22, in the embodiment of the present invention, two opposite ends of the first cross beam 41 correspond to the two lower boundary beams 29 respectively along the width direction of the underframe assembly, and the distance between the two ends of the first cross beam 41 is smaller than or equal to the distance between the two lower boundary beams 29.

Preferably, two opposite ends of the first cross beam 41 in the present invention urge against the two lower boundary beams 29 respectively. The arrangement ensures the overall width of the underframe assembly, and the first cross beam 41 urges against the two lower boundary beams 29. Not only the second cross beam 42 supports the first cross beam 41, but also the lower boundary beam 29 connected to the first cross beam 41 may also support the first cross beam 41, so that the connecting strength between the first cross beam 41 and the lower boundary beam 29 is further ensured, and the structure and apparatus disposed at the upper part of the underframe assembly may be effectively supported.

Further, the upper surface of the first cross beam 41 is flush with the upper surface of the lower boundary beam 29.

The arrangement facilitates mounting of the device at the upper part of the underframe assembly, the flatness is better, and the device is steadily mounted. Further, the arrangement forms a planar grid structure by the upper surface of the first cross beam 41 and the upper surface of the lower boundary beam 29, the supporting strength is good, and the requirements for the strength and rigidity of the underframe assembly are met.

Figure 26:
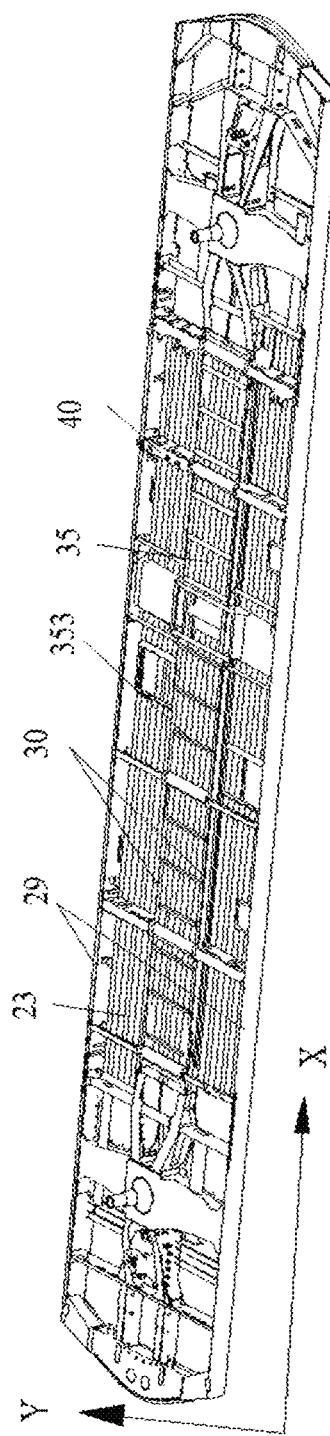
FIG. 26 is a fifth structure diagram of an embodiment of the underframe assembly of the rail vehicle according to the present invention (herein, the floor is shown)

In the present invention and the embodiments of the present invention, as shown in FIG. 26, a length direction of a underframe assembly is an X direction, and a width direction of the underframe assembly is a Y direction.

Figure 29:
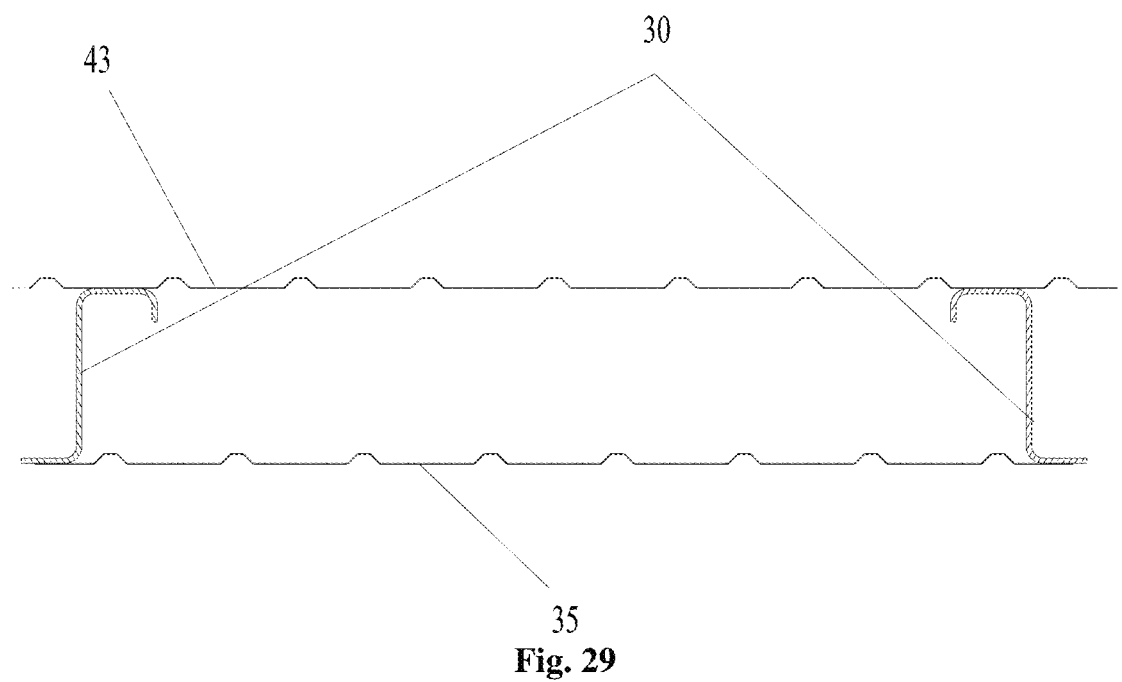
FIG. 29 is a section view in direction M-M in FIG. 27.

As shown in FIG. 26 and FIG. 29, an embodiment of the present invention provides a underframe assembly of a rail vehicle. The underframe assembly of the present embodiment includes two spaced lower boundary beams 29 and a middle beam 30. The middle beam 30 of the present embodiment is disposed between the two lower boundary beams 29, the middle beam 30 extends along the length direction of the lower boundary beam 29, and the cross section of the middle beam 30 is Z-shaped in the width direction of the rail vehicle.

In the present application, since the cross section of the middle beam 30 is Z-shaped, the structural strength of the middle beam 30 is better. Also since the length extending directions of the middle beam 30 and the lower boundary beam 29 are the same, the middle beam 30 and the lower boundary beam 29 may be supporting beams in the length direction of the underframe assembly at the same time. Therefore, the arrangement ensures the strength requirements for the middle beam 30, and improves the overall strength and rigidity of the underframe assembly. Compared with the middle beam having a C-shaped cross section in the conventional art, the middle beam 30 in the present application is higher in strength and better in supporting effect.

Figure 30:
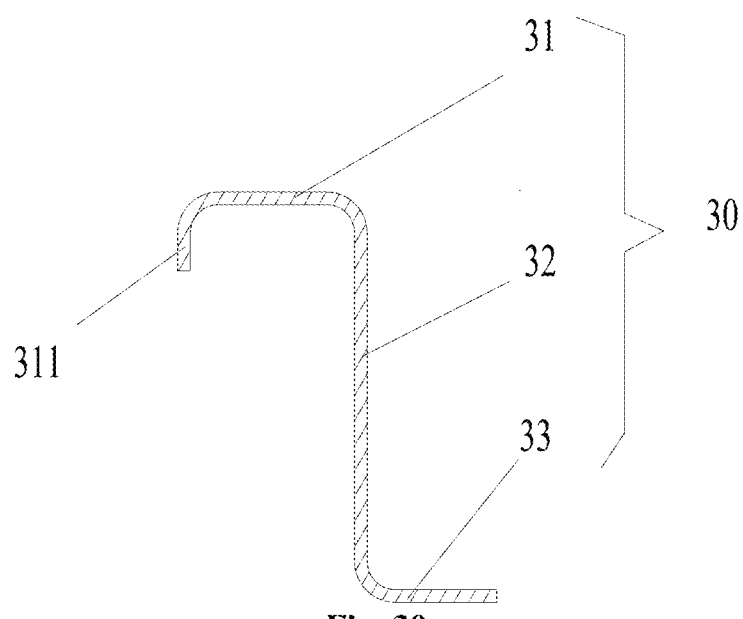
FIG. 30 is an enlarged view of the middle beam in FIG. 29.

As shown in FIG. 30, in the embodiment of the present invention, the middle beam 30 includes a first horizontal segment 31, a vertical segment 32 and a second horizontal segment 33 connected in sequence, the first horizontal segment 31 and the second horizontal segment 33 being disposed on two opposite sides of the vertical segment 32 respectively.

Specifically, the first horizontal segment 31 and the second horizontal segment 33 in the present application are disposed on two opposite sides of the vertical segment 32 respectively, the bearing force is transferred to other parts via the vertical segment and the second horizontal segment, the bearing pressure of the middle beam 30 can be effectively scattered, and the structural strength of the middle beam 30 is improved.

Further, in the embodiment of the present invention, the underframe assembly includes two opposite middle beams 30, and the first horizontal segments 31 of the two middle beams 30 are close to each other in the width direction of the underframe assembly, so that when the underframe assembly bears the pressure, the two middle beams 30 can share the pressure from the upper part of the underframe assembly, and the strength and rigidity requirements for the underframe assembly are met.

Preferably, in the embodiment of the present invention, an end, away from the vertical segment 32, of the first horizontal segment 31 is provided with a bending portion 311. The arrangement of the bending portion 311 further improves the structural strength of the middle beam 30.

Further, as shown in FIG. 29 and FIG. 30, the bending portion 311 bends toward one side where the second horizontal segment 33 is located. By providing the bending portion 311, the tail end of the first horizontal segment 31 extends downward, thereby avoiding the problem that a mounter is easily scratched during the assembly process due to the sharp tail end of the first horizontal segment 31.

Preferably, the first horizontal segment 31, the vertical segment 32 and the second horizontal segment 33 are of an integrated forming structure. The arrangement improves the overall structure strength of the middle beam 30, and meets the strength and rigidity requirements for the underframe assembly. The middle beam 30 is good in integrity, facilitates processing, and simplifies the assembly process.

Figure 27:
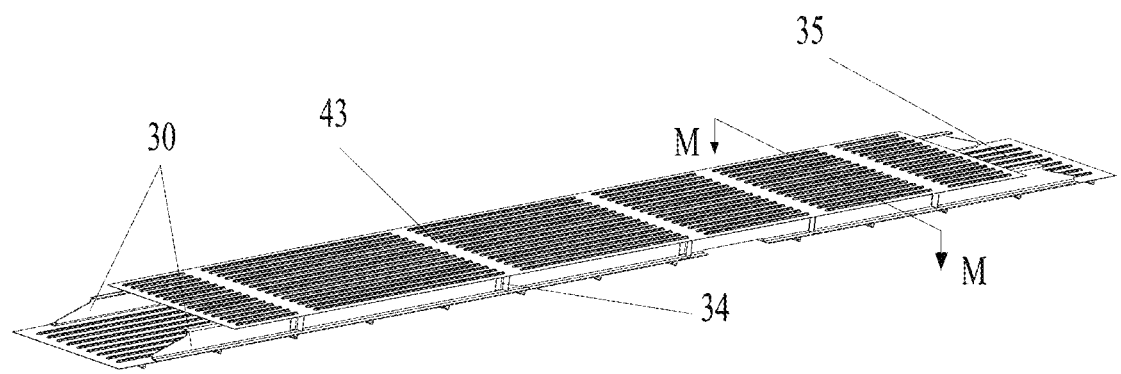
FIG. 27 is a structure diagram showing that the middle beam and the cover plate of the underframe assembly coordinates with the floor of the rail vehicle in FIG. 26.

As shown in FIG. 26 and FIG. 27, in the embodiment of the present invention, the rail vehicle further includes a floor 43, the floor 43 covers the middle beam 30, and the floor 43 is connected to each lower boundary beam 29; and the underframe assembly further includes a cover plate 35, the cover plate 35 is connected to the middle beam 30, the middle beam 30 is located between the floor 43 and the cover plate 35, and the floor 43, the cover plate 35 and the middle beam 30 jointly define a main air duct of the rail vehicle.

Specifically, the underframe assembly shown in FIG. 26 is a structural schematic diagram viewed up from the bottom of the rail vehicle. The middle beam 30 in the present application is disposed between the two lower boundary beams 29, the floor 43 is disposed above two middle beams 30, and two ends of the floor 43 are connected to each lower boundary beam 29 along the width direction of the underframe assembly, so that the middle beams 30 and the lower boundary beams 29 support the floor 43 simultaneously, thereby ensuring the connecting strength of the floor 43.

Further, as shown in FIG. 29, a cover plate 35 is disposed at the lower parts of the two middle beams 30, and the cover plate 35 is used for covering spacing between the two middle beams 30, so that the cover plate 35, the floor 43 and the middle beams 30 jointly define a main air duct located on the underframe assembly.

By means of the arrangement, the main air duct on the underframe assembly facilitates circulation of air, the main air duct and the lower boundary beam 29 jointly share pressure above the underframe assembly, and the floor 43 of the main air duct and the cover plate 35 are of a flat plate structure, thereby increasing the bearing area, effectively scattering the pressure, and improving the bearing capacity of the underframe assembly.

Preferably, in the embodiment of the present invention, the floor 43 is a corrugated plate, and the cover plate 35 is a corrugated plate.

In the present application, the extending direction of ripples of the floor 43 and the cover plate 35 is consistent with the length extending direction of the lower boundary beam 29. Since the length of the rail vehicle is much greater than the width of the rail vehicle, the strength requirements for the rail vehicle in the length direction are higher. Therefore, the arrangement of the corrugated plate ensures the strength of the floor 43 and the cover plate 35, so that the main air duct and the lower boundary beam 29 have the supporting function together in the length direction of the rail vehicle, thus improving the strength of the underframe assembly.

Preferably, in the embodiment of the present invention, the floor 43 is welded to the middle beam 30, and the floor 35 is also welded to the middle beam 30. Moreover, spot welding sealants are disposed at the joint between the middle beam 30 and the floor 43 and the joint between the middle beam 30 and the cover plate 35, and are used for sealing gaps in the joints, thus improving the connecting strength between the middle beam 30 and the floor 43 as well as the cover plate 35.

Figure 28:
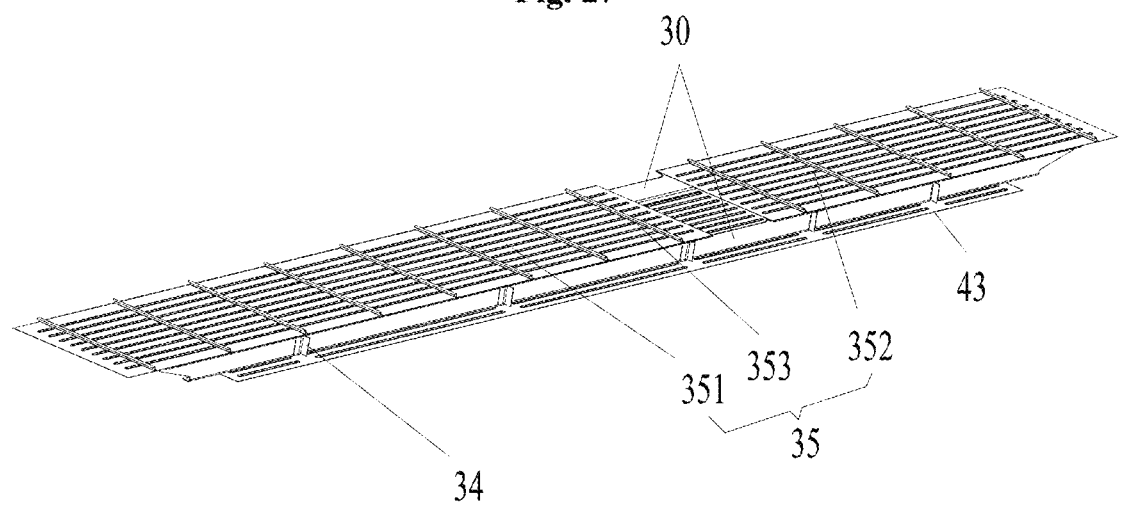
FIG. 28 is a structure diagram in another direction of FIG. 27.

As shown in FIG. 28, in the embodiment of the present invention, the cover plate 35 includes a first cover plate 351 and a second cover plate 352 spaced from the first cover plate 351, spacing between the first cover plate 351 and the second cover plate 352 forming an air inlet communicated with the main air duct.

Specifically, the first cover plate 351 and the second cover plate 352 are spaced in the length direction of the lower boundary beam 29, so as to form an air inlet communicated with the main air duct. The arrangement ensures an air source of the main air duct on the underframe assembly. Further, the floor 43 is provided with multiple air outlets. Air entering the main air duct from the air inlet may enter the rail vehicle from the air outlets, thereby ensuring the circulation of air inside the rail vehicle, and improving the user experience.

As shown in FIG. 28, in the embodiment of the present invention, the underframe assembly further includes multiple reinforcing ribs 353, and the multiple reinforcing ribs 353 being spaced on the cover plate 35.

Preferably, the reinforcing ribs 353 are spaced on the cover plate 35 along the length direction of the lower boundary beam 29. The reinforcing ribs 353 effectively improve the strength of the cover plate 35 in the width direction, and match longitudinal ripples of the corrugated plate, so that the strength and rigidity of the cover plate 35 meet the requirements for the underframe assembly.

Further, the reinforcing ribs 353 are disposed on the cover plate 35 in a welding manner.

As shown in FIG. 26, in the embodiment of the present invention, the underframe assembly further includes multiple cross beam components 40 disposed between the two lower boundary beams 29, the multiple cross beam components 40 are spaced along the length direction of the lower boundary beam 29, and the middle beam 30 forms an included angle with each cross beam component 40.

In the present application, preferably, each cross beam component 40 is vertical to the middle beam 30, and each cross beam component 40 is also vertical to the two lower boundary beams 29. The arrangement makes the underframe assembly form a structure similar to a grid, thus improving the strength and rigidity of the underframe assembly, and ensuring the mounting and normal operation of the device on the underframe assembly.

As shown in FIG. 27 and FIG. 28, in the embodiment of the present invention, the middle beam 30 is provided with multiple reinforcing members 34, and the multiple reinforcing members 34 are in one-to-one correspondence with multiple cross beam components 40.

The arrangement ensures the connecting strength between the middle beam 30 and the cross beam component 40, thus ensuring the strength and rigidity of the underframe assembly.

Preferably, the reinforcing member 34 includes a first reinforcing structure 341 and a second reinforcing structure 342, the first reinforcing structure 341 and the second reinforcing structure 342 forms an included angle, and the first reinforcing structure is disposed on the vertical segment 32 of the middle beam 30.

Figure 31:
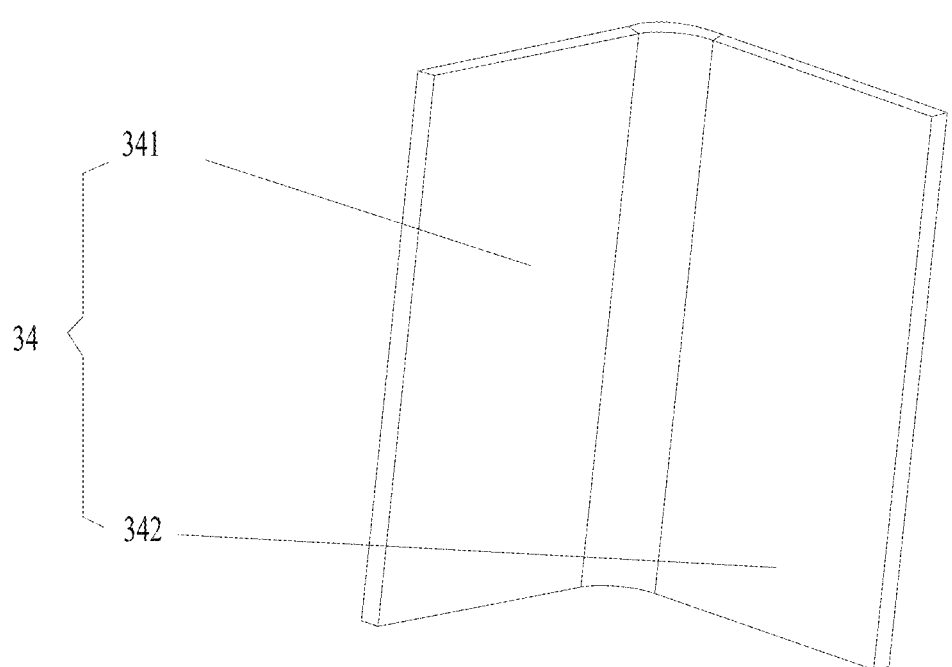
FIG. 31 is a structure diagram of a reinforcing member in FIG. 27.

In the present application, as shown in FIG. 31, the reinforcing member 34 is L-shaped angle iron, the L-shaped angle iron includes a first reinforcing segment and a second reinforcing segment vertically connected to the first reinforcing segment, wherein the first reinforcing segment forms the first reinforcing structure 341, and the second reinforcing segment forms the second reinforcing structure 342. The first reinforcing segment of the L-shaped angle iron is welded to the vertical segment 32 of the middle beam 30, and the second reinforcing segment of the L-shaped angle iron is welded to the cross beam component 40, so that the middle beam 30 and the cross beam component 40 are connected together, and the connecting strength between the middle beam 30 and the cross beam component 40 is good.

Most of the main air ducts of the traditional rail vehicle are mounted on a roof. In the present application, the main air duct of the rail vehicle is arranged on the underframe assembly, more under-vehicle devices need to be hung at the lower part of the underframe assembly of the rail vehicle, and there is no extra space. Therefore, on the premise of ensuring the sufficient strength of the underframe assembly, the main air duct is formed by using the middle beam 30, the floor 43 and the cover plate 35 of the underframe assembly, so that the problem of provision of the main air duct is solved.

Specifically, firstly, a main air duct is formed by using the middle beam 30, the floor 43 and the cover plate 35 of the underframe assembly in a spot welding manner; and then, the cross section of the middle beam 30 of the underframe assembly is Z-shaped, and the front and rear ends of the middle beam 30 are in inserted connection with an in-sleeper longitudinal beam, so that the underframe assembly forms a whole, thereby improving the strength of the underframe assembly.

The middle beam 30 in the present invention is disposed in the middle of the underframe assembly, and jointly achieves a longitudinal supporting function with the lower boundary beam 29. The cross section of the middle beam 30 is Z-shaped, the bearing capacity is high, and the front and rear ends of the middle beam 30 are connected to an in-sleeper longitudinal beam of an end chassis, so that the underframe assembly forms an integrated structure, and the floor 43 and the cover plate 35 are welded to two middle beams 30 to form a hollow cavity. The floor 43 is provided with an air outlet, an air inlet is formed between the first cover plate 351 and the second cover plate 352, and the air inlet and the air outlet are both communicated with the main air duct, so that the circulation of air inside the rail vehicle is ensured, and the user experience is improved.

Figure 32:
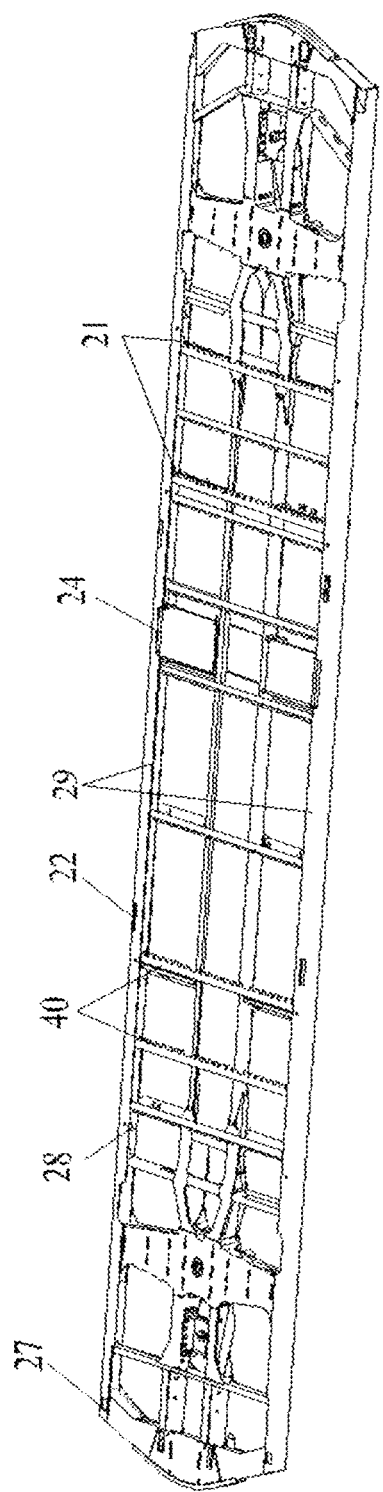
FIG. 32 is a sixth structure diagram of the embodiment of the underframe assembly of the rail vehicle according to the present invention.
Figure 33:
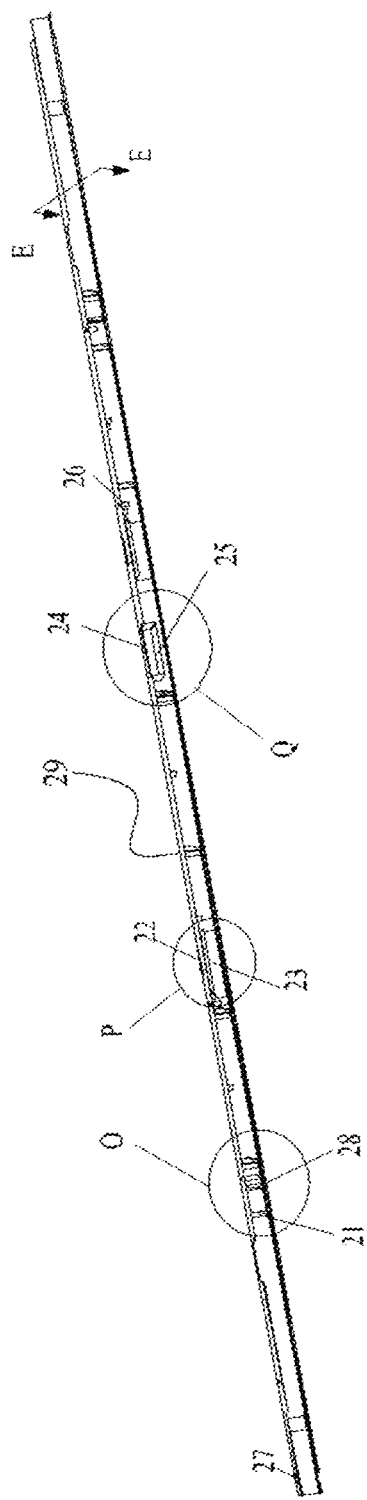
FIG. 33 is a structure diagram of the lower boundary beam of the underframe assembly in FIG. 32.
Figure 35:
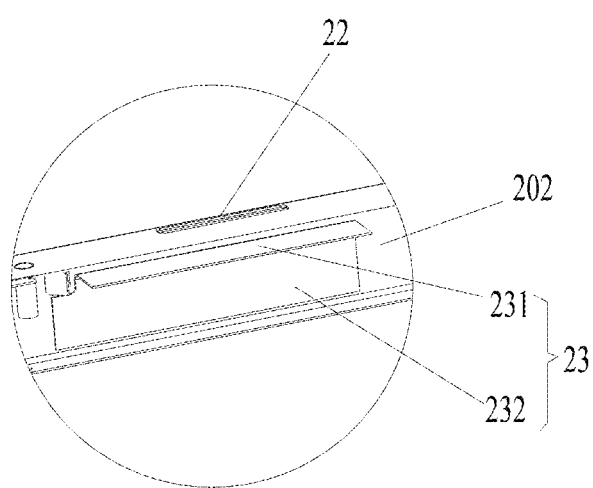
FIG. 35 is an enlarged view of the position P of the lower boundary beam in FIG. 33.

As shown in FIG. 32, FIG. 33 and FIG. 35, an embodiment of the present invention provides a underframe assembly of a rail vehicle. The underframe assembly of the present embodiment includes two spaced lower boundary beams 29 and a pipe passage structure 22. A side, facing a vehicle body of the rail vehicle, of at least one lower boundary beam 29 is provided with the pipe passage structure 22, wherein the pipe passage structure is a pipe passage channel disposed on the lower boundary beam 29.

In the present application, since the pipe passage structure 22 is disposed on the lower boundary beam 29, a pipeline penetrating from the upside of the rail vehicle to the downside or a pipeline penetrating from the downside of the rail vehicle to the upside may penetrate out of the pipe passage structure 22, so as to achieve the penetration of a pipeline on the underframe assembly of the rail vehicle, thus avoiding additional arrangement of the structure for pipeline penetration on the underframe assembly, saving space on the underframe assembly, and making the structure of the entire underframe assembly compact.

Therefore, the arrangement effectively utilizes the effective space of the underframe assembly, facilitates penetration of a pipeline on the underframe assembly, and simplifies the overall structure of the underframe assembly.

Preferably, the pipe passage structure 22 in the present application is particularly applied to penetration of an air conditioning pipeline, and the pipe passage channel in the present application is a pipe passage hole or a pipe passage groove provided on the lower boundary beam 29. Of course, in an alternative embodiment not illustrated in the present invention, the pipe passage structure 22 may also be applied to penetration of other pipelines or lines.

As shown in FIG. 33 and FIG. 35, in the embodiment of the present invention, the underframe assembly further includes a first reinforcing member 23, the first reinforcing member 23 is located on a side, away from the vehicle body, of the pipe passage structure 22, and the first reinforcing member 23 is connected to a portion of the lower boundary beam 29.

Specifically, in the present application, the first reinforcing member 23 is disposed below the pipe passage structure 22, so as to reinforce the periphery of the pipe passage structure 22. The arrangement ensures the surrounding structure strength of the pipe passage structure 22, thus ensuring the structural strength of the lower boundary beam 29. Therefore, the lower boundary beam 29 not only facilitates penetration of the pipeline on the underframe assembly, but also ensures the own strength of the lower boundary beam 29.

Figure 37:
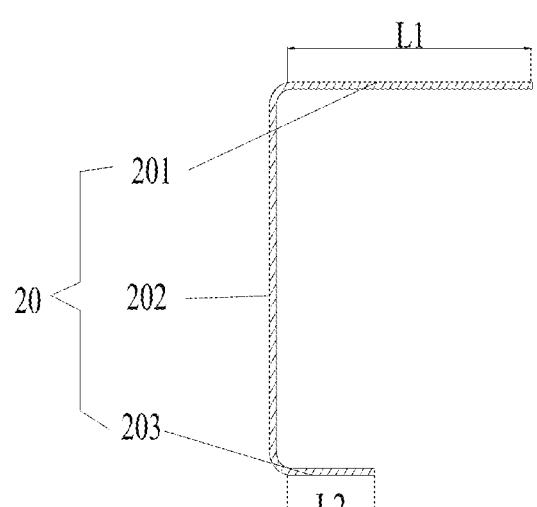
FIG. 37 is a section view in direction E-E of the lower boundary beam in FIG. 33.

As shown in FIG. 37, in the embodiment of the present invention, the lower boundary beam 29 includes a first flat plate 201, a vertical plate 202 and a second flat plate 203. The first flat plate 201 is spaced from the second flat plate 203, and the vertical plate 202 is connected to the first flat plate 201 and the second flat plate 203.

In the present application, the cross section of the lower boundary beam 29 is U-shaped along the length direction of the lower boundary beam 29. The structure makes the strength of the lower boundary beam 29 higher, improves the bearing capacity of the lower boundary beam 29, and meets the strength requirements of the rail vehicle for the lower boundary beam 29. Moreover, the weight of the structure is light, the weight of the entire underframe assembly is reduced, and the light weight of the underframe assembly is realized.

Further, the pipe passage structure 22 in the present application is disposed on the first flat plate 201, which facilitates penetration of a pipeline on the underframe assembly.

Preferably, as shown in FIG. 35, the first reinforcing member 23 is fixedly connected to the vertical plate 202.

The first reinforcing member 23 is welded to the vertical plate 202, thereby improving the structural strength of the lower boundary beam 29 in the height direction.

As shown in FIG. 35, in the embodiment of the present invention, the first reinforcing member 23 includes a first reinforcing plate 231 and a second reinforcing plate 232 connected to the first reinforcing plate 231, wherein an included angle is provided between the first reinforcing plate 231 and the second reinforcing plate 232, and the first reinforcing plate 231 is fixedly connected to the vertical plate 202.

In the present application, the first reinforcing plate 231 is vertical to the second reinforcing plate 232, the first reinforcing plate 231 is welded to the vertical plate 202, the second reinforcing plate 232 is parallel to the first flat plate 201, and spacing is provided between the second reinforcing plate 232 and the first flat plate. By means of the arrangement, when the pipeline on the underframe assembly penetrates through the pipe passage structure 22, the second reinforcing plate 232 may support the pipeline, which facilitates penetration of the pipeline on the underframe assembly. The second reinforcing plate 232 may also restrain the pipeline, so that the pipeline is arranged according to a predetermined path.

Preferably, as shown in FIG. 37, in the embodiment of the present invention, the width size L1 of the first flat plate 201 is greater than the width size L2 of the second flat plate 203.

The pipe passage structure 22 in the present application is provided on the first flat plate 201, the width size L1 of the first flat plate 201 is greater than the width size L2 of the second flat plate 203, and a provision space is reserved for the pipe passage structure 22. Moreover, the strength of the first flat plate 201 after the pipe passage structure 22 is provided is ensured, thus ensuring the structural strength of the lower boundary beam 29.

Figure 34:
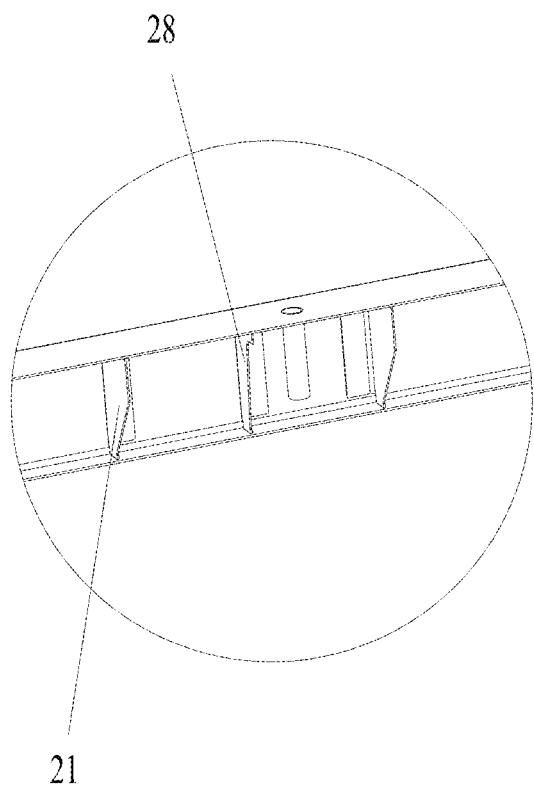
FIG. 34 is an enlarged view of the position O of the lower boundary beam in FIG. 33.

As shown in FIG. 32 to FIG. 34, in the embodiment of the present invention, at least one lower boundary beam 29 is further provided with multiple second reinforcing members 28, the multiple second reinforcing members 28 being spaced in the length direction of the lower boundary beam 29.

In the present application, the multiple second reinforcing members 28 are spaced in the length direction of the lower boundary beam 29, so as to reinforce the lower boundary beam 29, thereby ensuring the structural strength of the lower boundary beam 29.

Figure 36:
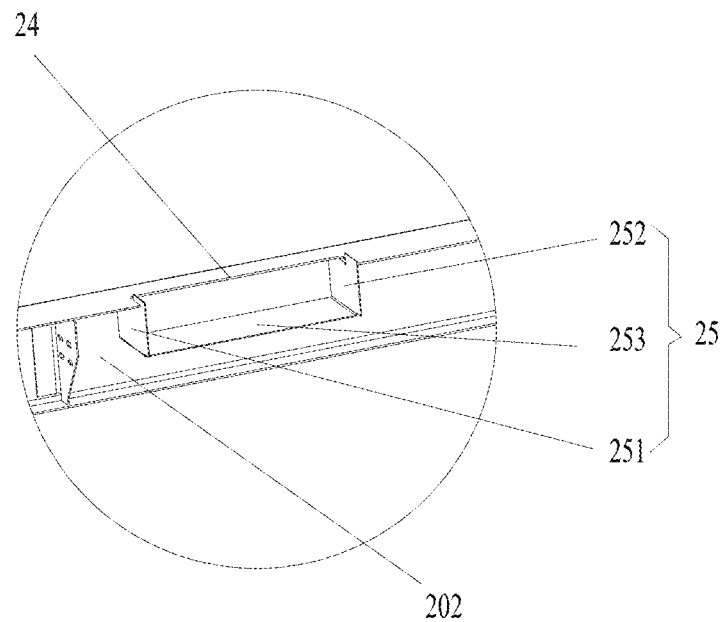
FIG. 36 is an enlarged view of the position Q of the lower boundary beam in FIG. 33.

As shown in FIG. 33 and FIG. 36, in the embodiment of the present invention, the underframe assembly further includes a main air duct and a branch air duct communicated with the main air duct, and the lower boundary beam 29 is provided with a ventilation opening 24 communicated with the branch air duct.

Specifically, the underframe assembly includes a middle beam disposed between two lower boundary beams 29, a cover plate is disposed on the two middle beams, and the cover plate, the two middle beams and the floor disposed on the underframe assembly form a main air duct. The main air duct in the present application is disposed along the length direction of the lower boundary beam 29, the branch air duct is vertical to the main air duct, and the lower boundary beam 29 is provided with a ventilation opening 24 communicated with the branch air duct.

The arrangement of the ventilation opening 24 ensures an air source of the main air duct and the branch air duct on the underframe assembly. Air entering the branch air duct from the ventilation opening 24 may circulate in the main air duct and the branch air duct, thereby ensuring the circulation of air inside the rail vehicle, and improving the user experience.

Preferably, in the embodiment of the present invention, the underframe assembly further includes a ventilation pipeline, an inner wall surface of the ventilation pipeline defines a branch air duct, a supporting seat 25 is disposed at a position, corresponding to the ventilation opening 24, on the lower boundary beam 29, and the ventilation pipeline is connected to the supporting seat 25.

The branch air duct in the present application is formed from the ventilation pipeline on the underframe assembly, and two ends of the ventilation pipeline are provided on the supporting seat 25, so that the branch air duct is communicated with the ventilation opening 24, thus ensuring the circulation of air inside the branch air duct.

As shown in FIG. 36, in the embodiment of the present invention, the supporting seat 25 includes a first edge plate 251, a second edge plate 252 and a third edge plate 253. The first edge plate 251 is connected to the vertical plate 202; the second edge plate 252 is spaced from the first edge plate 251; and the third edge plate 253 is connected to the first edge plate 251 and the second edge plate 252, and a ventilation pipeline is disposed on the third edge plate 253.

The first edge plate 251, the second edge plate 252 and the third edge plate 253 in the present application are all welded to the vertical plate 202, so that the connecting strength between the supporting seat 25 and the lower boundary beam 29 is ensured, and the structural strength of the lower boundary beam 29 is improved.

Further, the first edge plate 251, the second edge plate 252 and the third edge plate 253 are connected to form the supporting seat 25, thereby ensuring the supporting stability of the ventilation pipeline.

Preferably, the third edge plate 253 in the present application is parallel to the first flat plate 201. The arrangement ensures the steady mounting of the ventilation pipeline on the supporting seat.

Further, the cross section of the supporting seat 25 is U-shaped along the width direction of the underframe assembly.

As shown in FIG. 32 and FIG. 33, in the embodiment of the present invention, the underframe assembly further includes multiple cross beam components 40 disposed between the two lower boundary beams 29, the multiple cross beam components 40 are spaced along a length direction of the lower boundary beam 29, at least one of the lower boundary beams 29 is provided with a connecting base 21, and at least one end of the cross beam component 40 is connected to the lower boundary beam 29 through the connecting base 21.

Specifically, the connecting base 21 in the present application is in surface-to-surface contact with the cross beam component 40, and the connecting base 21 is in surface-to-surface contact with the lower boundary beam 29. Thus, a connecting relationship between the cross beam component 40 and the lower boundary beam 29 is converted into connection between the cross beam component 40 and the connecting base 21 and connection between the connecting base 21 and the lower boundary beam 29, and a line-to-surface contact between the cross beam component 40 and the lower boundary beam 29 in the conventional art is converted into a surface-to-surface contact through the connecting base 21, thereby improving the connecting strength between the cross beam component 40 and the lower boundary beam 29, and ensuring the strength and rigidity requirements for the underframe assembly. Further, compared with a line-to-surface contact achieved by welding or clamping between the cross beam component 40 and the lower boundary beam 29 in the conventional art, the surface-to-surface contact in the present application more facilitates connection, facilitates assembly of the underframe assembly by an operator, and improves the assembly efficiency.

Figure 38:
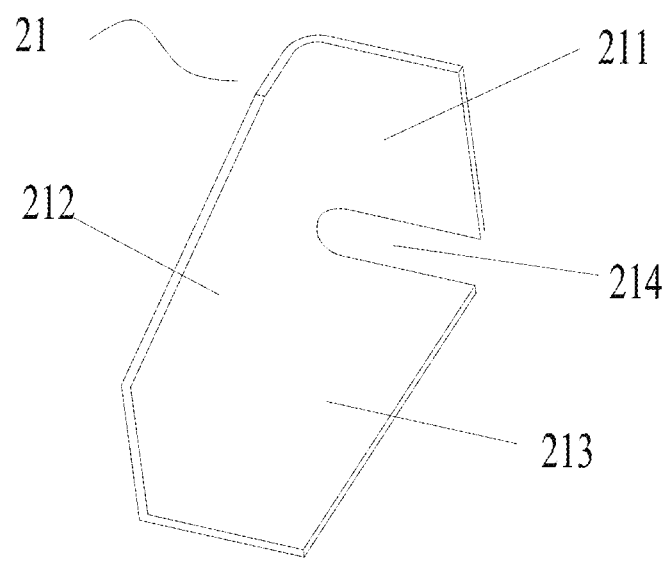
FIG. 38 is a structure diagram of the connecting base in FIG. 33.

As shown in FIG. 34 and FIG. 38, in the embodiment of the present invention, the connecting base 21 includes a first connecting plate 211, a second connecting plate 212 and a third connecting plate 213. The first connecting plate 211 is connected to the vertical plate 202; the second connecting plate 212 forms an included angle with the first connecting plate 211, and the second connecting plate 212 is connected to the cross beam component 40; and the third connecting plate 213 forms an included angle with the first connecting plate 211 and the second connecting plate 212 respectively, the third connecting plate 213 is connected to the first flat plate 201 or the second flat plate 203.

The connecting base 21 in the present application is composed of three connecting plates, any two connecting plates are vertically connected, the connection between the cross beam component 40 and the lower boundary beam 29 is converted into the connection between the cross beam component 40 and the connecting base 21 and the connection between the connecting base 21 and the lower boundary beam 29 by providing the connecting base 21. Thus, a line connection or a point connection between the cross beam component 40 and the lower boundary beam 29 in the conventional art is converted into a surface connection between the cross beam component 40 and the connecting base 21 and a surface connection between the connecting base 21 and the lower boundary beam 29. Therefore, the arrangement improves the connecting strength of the cross beam component 40 connected to the lower boundary beam 29, and ensures the rigidity requirements for the underframe assembly of the rail vehicle.

Further, as shown in FIG. 34, the connecting base 21 and the second reinforcing member 28 are cooperatively disposed on the lower boundary beam 29 to form a reinforcing concentration area, so that when the underframe assembly or the entire rail vehicle is hoisted, it can be hoisted in the reinforcing concentration area. Since the strength of the reinforcing concentration area is high, it is not prone to deformation during the hoisting process, thereby ensuring the good integrity of the entire underframe assembly.

As shown in FIG. 33, in the embodiment of the present invention, the lower boundary beam 29 is further provided with a drain hole 26.

The provision of the drain hole 26 facilitates the drainage of water gathered on the underframe assembly, thereby avoiding corrosion of the underframe assembly caused by the gathered water.

Further, the lower boundary beam 29 is further provided with a wire passage through hole, which facilitates the penetration of a wire harness on the underframe assembly.

Figure 41:
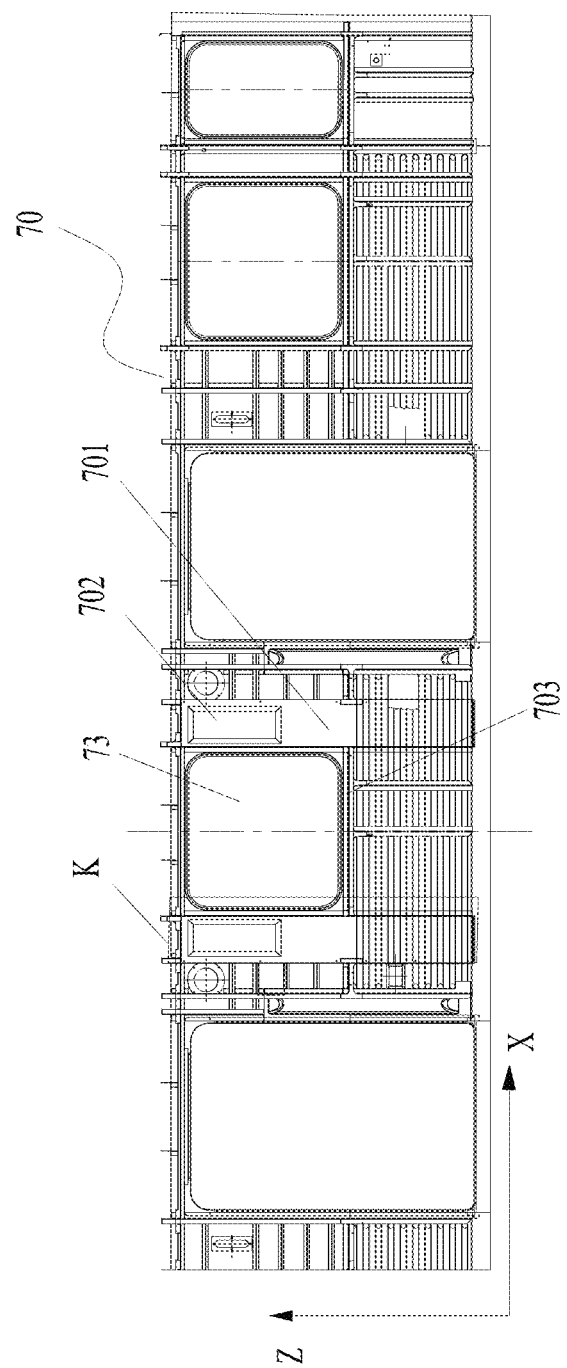
FIG. 41 is a second structure diagram of an embodiment of a side wall assembly of the rail vehicle according to the present invention.
Figure 42:
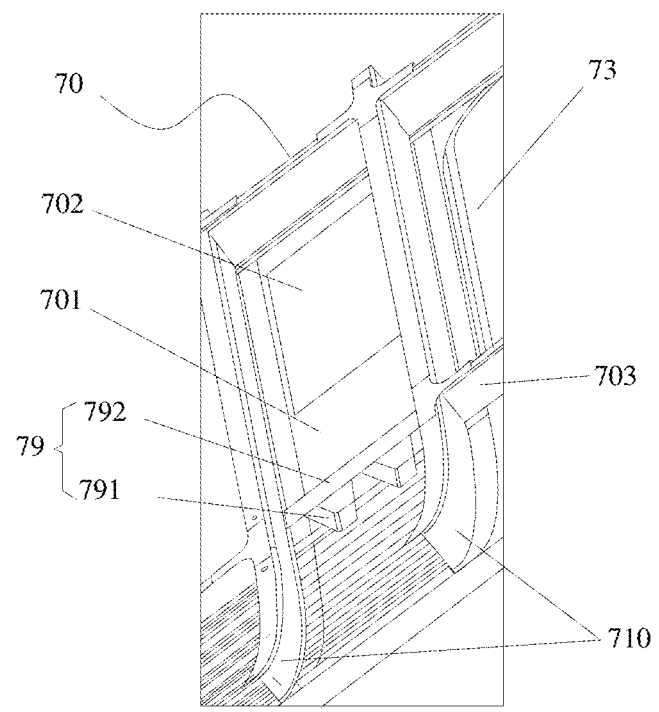
FIG. 42 is a schematic diagram of three-dimensional structure after the position K of the side wall assembly in FIG. 41 rotates at a certain angle (herein, a reinforcing crossbeam is shown)

As shown in FIG. 41 and FIG. 42, the side wall assembly 70 of the present embodiment includes a side wall body 701 and multiple side wall uprights 710. The multiple side wall uprights 710 are connected to the side wall body 701 respectively, and the multiple side wall uprights 710 are spaced along a length direction of the side wall body 701, wherein an auxiliary air duct of a rail vehicle is formed between at least two side wall uprights 710 and the side wall body 701 in the length direction of the side wall body 701.

In the present application, the side wall body 701 of the side wall assembly 70 and the side wall upright 710 are used to form the auxiliary air duct of the rail vehicle. Compared with the conventional art in which an air duct structure needs to be additionally provided and the additional air duct structure is welded or riveted to the exterior of the side wall assembly 70 or the interior of the side wall assembly 70, the auxiliary air duct of the present application is formed on the side wall assembly 70 and does not protrude from the side wall assembly 70, and the external or internal space of the vehicle cannot be additionally occupied, so that the integrity of the rail vehicle is ensured, thereby avoiding from increasing the wind resistance in the running process of the rail vehicle due to the additional air duct structure or occupying the internal space of the vehicle. Both the side wall body 701 and the side wall upright 710 are members of the side wall assembly 70, and the arrangement cannot increase the weight of the side wall assembly 70. Therefore, the auxiliary air duct is formed on the side wall assembly 70, thereby avoiding the problem of weight increase or volume increase of internal space reduction of the rail vehicle, so that the overall structure of the rail vehicle is compact.

Further, the auxiliary air duct is formed on the side wall assembly 70 in the present application, that is to say, the auxiliary air duct having a hollow structure is formed on the side wall assembly 70, and the auxiliary air duct runs through the height direction of the side wall body 701, so that on the premise of meeting the internal ventilation of the rail vehicle, the weight of the vehicle body is reduced, and the light weight of the rail vehicle is realized.

Preferably, the auxiliary air duct and a underframe assembly of the rail vehicle are provided with a main air duct, which is communicated with the auxiliary air duct.

The main air duct is communicated with the auxiliary air duct, so that air in the entire rail vehicle circulates, thereby ensuring the circulation of air inside the rail vehicle, and improving the user experience.

Figure 45:
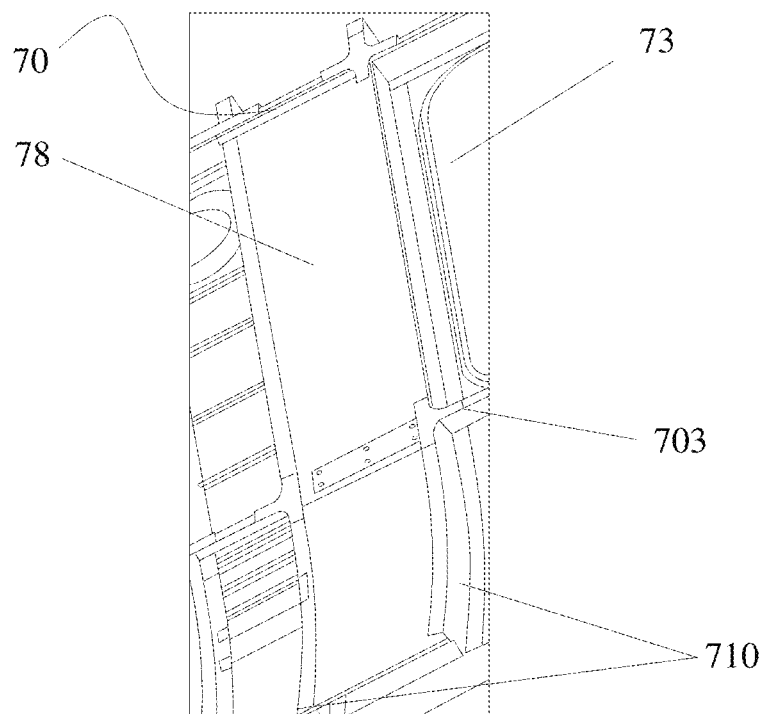
FIG. 45 is a schematic diagram of three-dimensional structure after the position K of the side wall assembly in FIG. 41 rotates at a certain angle (herein, the inner cover plate is shown)

As shown in FIG. 42 and FIG. 45, in the embodiment of the present invention, the side wall assembly 70 further includes a window 73 disposed on the side wall body 701, the at least two side wall uprights 710 being located on the same side of the window 73.

Specifically, the auxiliary air duct in the present application is disposed on the two side wall uprights 710 located on the same side of the window 73. In the present application, an under-window cross beam is not disposed between the two side wall uprights 710 located on the same side of the window 73. Thus, the two side wall uprights 710 and the side wall body 701 can be fully utilized to form an air duct, the entire auxiliary air duct can be kept to be smooth, and the ventilation effect of the auxiliary air duct is ensured.

Figure 43:
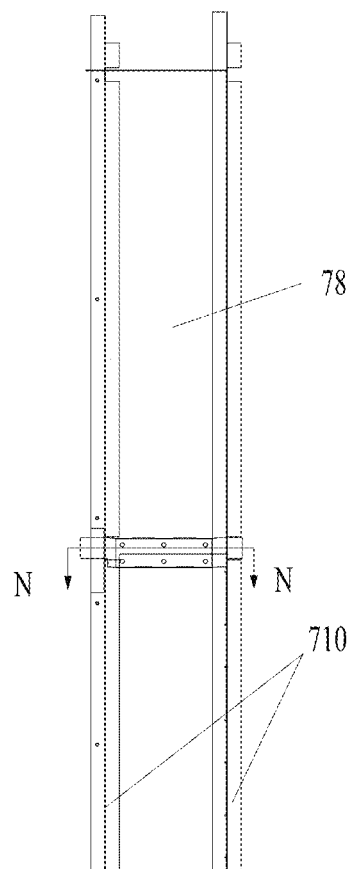
FIG. 43 is a schematic diagram of plane structure of the position K of the side wall assembly in FIG. 41 (herein, an inner cover plate is shown)

As shown in FIG. 43 and FIG. 45, in the embodiment of the present invention, the side wall assembly 70 further includes an inner cover plate 78, wherein the inner cover plate 78 is disposed on the at least two side wall uprights 710 located on the same side of the window 73, and the inner cover plate 78, the at least two side wall uprights 710 and the side wall body 701 jointly define the auxiliary air duct.

Specifically, the inner cover plate 78 covers the two side wall uprights 710, so that the inner cover plate 78, the at least two side wall uprights 710 and the side wall body 701 form an auxiliary air duct running through the side wall assembly 70 along the height direction of the side wall body 701. The entire auxiliary air duct is simple in structure and convenient for connection, and does not occupy the internal space of the vehicle.

Of course, in an alternative embodiment not illustrated in the drawings of the present invention, only the two side wall uprights 710 and the side wall body 701 may also define an auxiliary air duct, and a person skilled in the art may improve the structure of the side wall uprights 710 as required to define the needed auxiliary air duct, so that the auxiliary air duct is formed on the side wall assembly 70, as long as the structure in the inventive concept of the present application is improved within the scope of protection of the present application.

Figure 44:
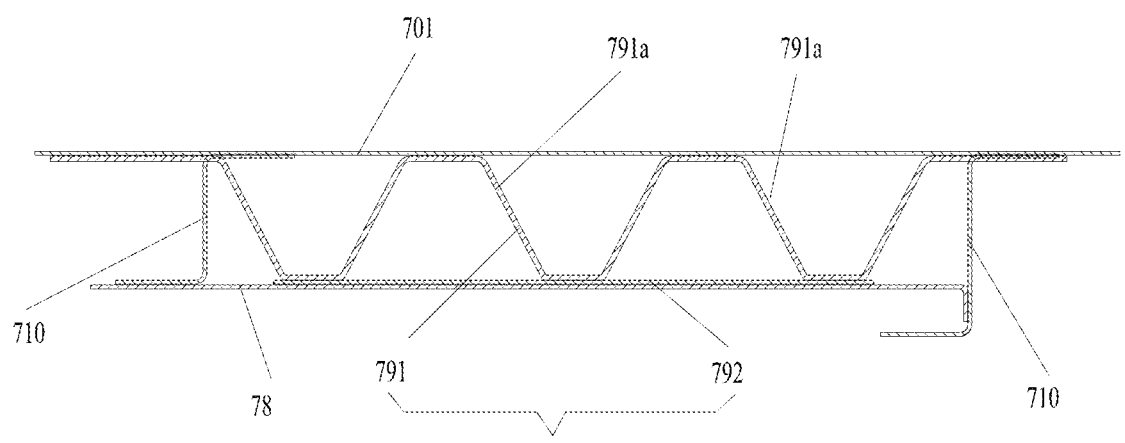
FIG. 44 is a section view of the side wall assembly in direction N-N in FIG. 43.

As shown in FIG. 42 and FIG. 44, in the embodiment of the present invention, the side wall assembly 70 further includes a reinforcing cross beam 79 located in the auxiliary air duct, two opposite ends of the reinforcing cross beam 79 being correspondingly connected to the at least two side wall uprights 710.

In the present application, in order to ensure the structural strength of the auxiliary air duct part on the side wall assembly 70, the reinforcing cross beam 79 is disposed in the auxiliary air duct so as to match the overall strength of the entire side wall assembly 70, thereby avoiding local damage to the entire side wall assembly 70 caused by insufficient local strength.

Specifically, two opposite ends of the reinforcing cross beam 79 are correspondingly connected to the two side wall uprights 710 along the length direction of the side wall body 701, so as to ensure the connecting strength of the reinforcing cross beam 79 in the auxiliary air duct, thereby avoiding the separation of the reinforcing cross beam 79.

As shown in FIG. 42 and FIG. 44, in the embodiment of the present invention, the auxiliary air duct 79 includes a first reinforcing cross beam 791 connected to the side wall body 701, and the first reinforcing cross beam 791 is provided with a transitional air duct communicated with the auxiliary air duct.

In the present application, it is necessary to consider the air circulation of the entire auxiliary air duct to provide the auxiliary air duct 79. Therefore, the auxiliary air duct 79 in the present application includes a first reinforcing cross beam 791 having a transitional air duct. The arrangement not only ensures the structural strength of the auxiliary air duct on the side wall assembly 70, but also ensures the circulation of air in the auxiliary air duct.

As shown in FIG. 42 and FIG. 44, in the embodiment of the present invention, the auxiliary air duct 79 further includes a second reinforcing cross beam 792, the second reinforcing cross beam 792 being connected to the first reinforcing cross beam 791 and located between the first reinforcing cross beam 791 and the inner cover plate 78, wherein the partial transitional air duct is defined between the second reinforcing cross beam 792 and the first reinforcing cross beam 791, and the remaining transitional air duct is defined between the side wall body 701 and the first reinforcing cross beam 791.

Specifically, a portion of the second reinforcing cross beam 792 is connected to a portion of the first reinforcing cross beam 791, and a portion of the first reinforcing cross beam 791 is connected to the side wall body 701. The provision of the transitional air duct ensures the penetration of the auxiliary air duct in the height direction of the side wall assembly 70, and ensures the ventilation effect of the auxiliary air duct.

As shown in FIG. 42 and FIG. 44, in the embodiment of the present invention, the first reinforcing cross beam 791 includes multiple spaced flange structures 791a, an inner wall surface of each flange structure 791a and the inner side of the second reinforcing cross beam 792 forming the transitional air duct.

Preferably, the first reinforcing cross beam 791 in the present application has a flange structure 791a of which the cross section is trapezoidal. The structure of the first reinforcing cross beam 791 in FIG. 4 is taken as an example. The inner wall surface of each flange structure 791a and the inner side of the second reinforcing cross beam 792 form the partial transitional air duct, and spacing between two adjacent flange structures 791a and the inner side of the side wall body 701 form another partial transitional air duct.

The arrangement ensures communication of the transitional air duct and the auxiliary air duct, so that the ventilation of the auxiliary air duct is smooth. Moreover, the strength of the first reinforcing cross beam 791 having the flange structure is good, and the structural strength of the side wall assembly 70 forming the auxiliary air duct is ensured.

Specifically, the first reinforcing cross beam 791 in the present application is made of a metal plate by using a bending process. As shown in FIG. 44, the trapezoidal flange structure 791a has an upper bottom and a lower bottom, the upper bottom of the flange structure 791a is connected to the side wall body 701, and the lower bottom of the flange structure 791a is connected to the second reinforcing cross beam 792. By providing the second reinforcing cross beam 792, the connecting area between the reinforcing cross beam 79 and the inner cover plate 78 is increased, and the connecting strength between the reinforcing cross beam 79 and the inner cover plate 78 is improved.

Of course, in an alternative embodiment not illustrated in the drawings of the present invention, the shape of the cross section of the flange structure 791a of the first reinforcing cross beam 791 is not limited to trapezoid, and may be triangle, rectangle, arc or the like.

Preferably, in the embodiment of the present invention, the first reinforcing cross beam 791 is welded to the side wall body 701, and the first reinforcing cross beam 791 is welded to the second reinforcing cross beam 792.

The welding connection strength is good, thereby ensuring the own structural strength of the reinforcing cross beam 79 and the connecting strength between the reinforcing cross beam 79 and the side wall body 701. A sealant is coated on the welding joint between the first reinforcing cross beam 791 and the side wall body 701, and a sealant is also coated on the welding joint between the first reinforcing cross beam 791 and the second reinforcing cross beam 792, so as to fill a gap at the welding joint, thereby ensuring the own structural strength of the reinforcing cross beam 79 and the connecting strength between the reinforcing cross beam 79 and the side wall body 701, and further ensuring that the strength of the side wall body 701 disposed at the auxiliary air duct matches the overall strength of the entire side wall assembly 70.

Figure 46:
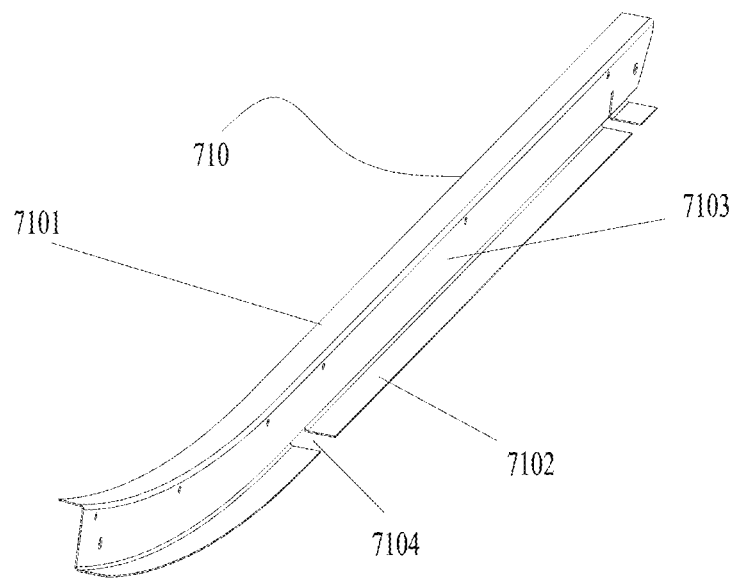
FIG. 46 is a schematic diagram of three-dimensional structure of a side wall upright of the side wall assembly in FIG. 42.

As shown in FIG. 44 and FIG. 46, in the embodiment of the present invention, the side wall upright 710 includes a first folded edge 7101, a second folded edge 7102 opposite to the first folded edge 7101, and a vertical edge 7103 connecting the first folded edge 7101 and the second folded edge 7102, the first folded edge 7101 being connected to the inner cover plate 78, and the second folded edge 7102 being connected to the side wall body 701.

Specifically, the first folded edge 7101 and the second folded edge 7102 are disposed on two sides of the vertical edge 7103, and the first folded edge 7101 and the second folded edge 7102 are parallel to each other. The first folded edge 7101 is welded to the inner cover plate 78, and the second folded edge 7102 is welded to the side wall body 701.

By means of the arrangement, the side wall body 701, the side wall upright 710 and the inner cover plate 78 are connected to form the entire auxiliary air duct, and the connecting strength is good.

Preferably, as shown in FIG. 44 and FIG. 46, the second folded edge 7102 is provided with an avoidance groove 7104 for avoiding the first reinforcing cross beam 791.

In the present application, a portion of the first reinforcing cross beam 791 is welded to the side wall body 701, and the second folded edge 7102 is provided with an avoidance groove 7104 for allowing the penetration of the first reinforcing cross beam 791, so as to connect the first reinforcing cross beam 791 and the side wall body 701.

Optionally, two opposite ends of the first reinforcing cross beam 791 are sandwiched between the side wall body 701 and the side wall upright 710, so that the mounting strength between the first reinforcing cross beam 791 and the side wall body 701 is ensured, thereby ensuring the structural strength of the auxiliary air duct.

As shown in FIG. 44 and FIG. 45, in the embodiment of the present invention, one end of the inner cover plate 78 is connected to the first folded edge 7101 of at least one side wall upright 710 in the at least two side wall uprights 710, the other end of the inner cover plate 78 is provided with a bending portion, and the bending portion is connected to the vertical edge 7103 of at least the other side wall upright 710 in the at least two side wall uprights 710.

Specifically, the inner cover plate 78 covers the two side wall uprights 710, the first end of the inner cover plate 78 is welded to the first folded edge 7101 of one of the side wall uprights, the second end of the inner cover plate 78 is provided with a bending portion, the bending portion bends toward the first folded edge 7101, and the bending portion is welded to the vertical edge 7103 of the other side wall upright 710. The arrangement ensures the connecting strength between the inner cover plate 78 and the side wall upright 710, and further ensures the integrity of the entire auxiliary air duct.

Further, the inner cover plate 78 is also welded to the second reinforcing cross beam 792. By providing the second reinforcing cross beam 792, the overall contact area between the inner cover plate 78 and the reinforcing cross beam 79 is increased, thus ensuring the mounting strength of the inner cover plate 78.

Of course, in an alternative embodiment not illustrated in the drawings of the present invention, the bending portion may also bend toward the second folded edge 7102, and the bending portion may be welded to the vertical edge 7103; or, the inner cover plate 78 may not be provided with a bending portion, so that the vertical edges 7103 of the two side wall uprights 710 have the same width, and the second end of the inner cover plate 78 is directly welded to the first folded edge 7101 of the other side wall upright 710. The above connection mode may realize the connection between the inner cover plate 78 and the side wall upright 710.

As shown in FIG. 41 and FIG. 42, in the embodiment of the present invention, the side wall body 701 is provided with an air duct opening 702 communicated with the auxiliary air duct, and the air duct opening 702 is located above the reinforcing cross beam 79 along the height direction of the side wall body 701.

The arrangement enables air to flow into the auxiliary air duct from the air duct opening, thereby ensuring the air source of the auxiliary air duct. Further, in the rail vehicle of the present application, the side wall body 701 above the reinforcing cross beam 79 is a common metal plate structure, and the side wall body 701 below the reinforcing cross beam 79 is a corrugated plate structure. Therefore, the air duct opening 702 is provided above the reinforcing cross beam 79 conveniently, so as to avoid the structural strength of the side wall body 701 from being affected by provision of the air duct opening on the corrugated plate structure.

As shown in FIG. 41, FIG. 42 and FIG. 45, in the embodiment of the present invention, the side wall assembly 70 further includes an under-window cross beam 703, the under-window cross beam 703 being located at the lower part of the window 73.

Specifically, in the conventional art, the under-window cross beam extends up along the length direction of the side wall body, and extends to two adjacent door frames from the lower part of the window to two ends, so as to improve the strength of the side wall body in the length direction. Since the under-window cross beam is a closed structure, the arrangement mode of the under-window cross beam cannot form an air duct on the side wall body. In the present application, the under-window cross beam 703 is only disposed at the lower part of the window 73, thereby ensuring the penetration of the auxiliary air duct in the height direction of the side wall body 701, and ensuring the ventilation effect of the auxiliary air duct.

Figure 47:
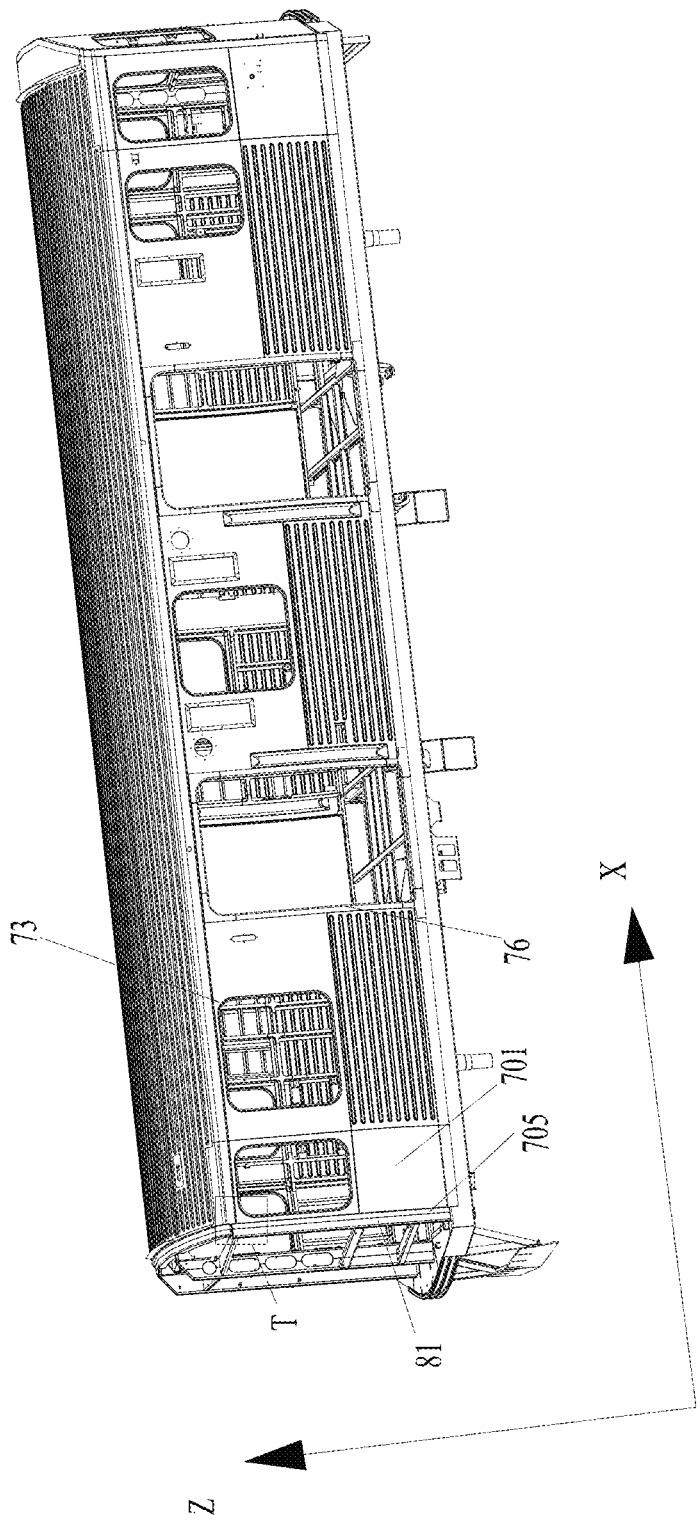
FIG. 47 is a structure diagram of an embodiment of the rail vehicle according to the present invention.

In the present invention and the embodiments of the present invention, as shown in FIG. 47, the length direction of the rail vehicle is an X direction, that is, the horizontal direction of the side wall body, and the width direction of the rail vehicle is a Z direction, that is, the longitudinal direction of the side wall body.

Figure 48:
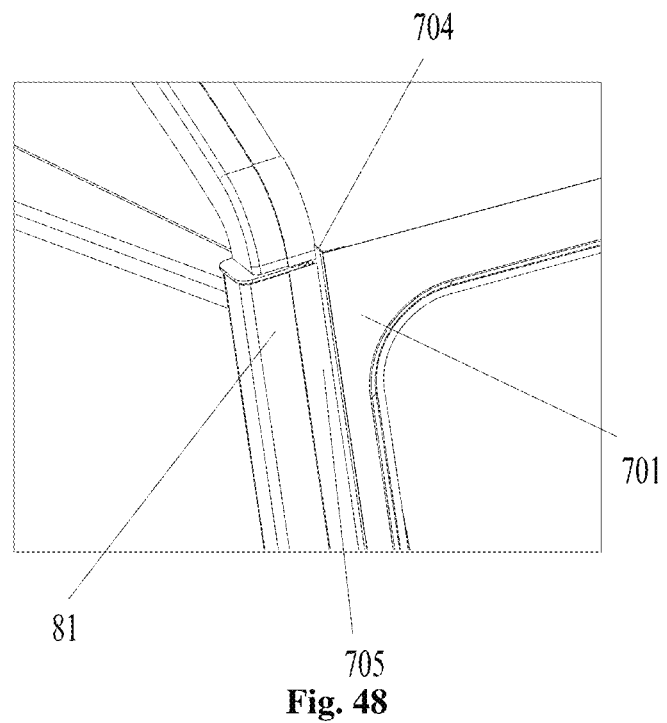
FIG. 48 is a schematic diagram of three-dimensional structure of the position T of the rail vehicle in FIG. 47.
Figure 49:
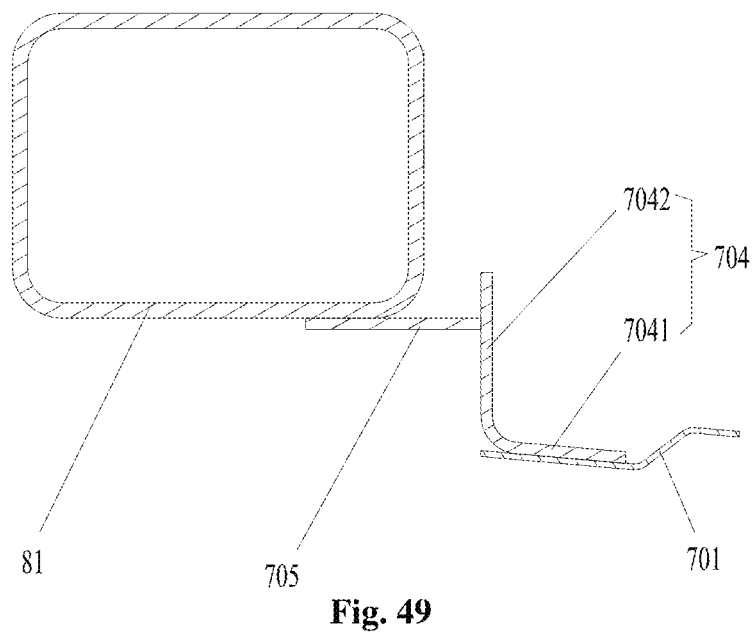
FIG. 49 is a top view of the position T of the rail vehicle in FIG. 47.

As shown in FIG. 47 to FIG. 49, the present invention provides a side wall assembly 70 of a rail vehicle. The side wall assembly 70 of the present embodiment includes: a side wall body 701, a side wall corner post 704 and a connecting structure 705. The side wall corner post 704 is disposed inside the side wall body 701, the first end of the connecting structure 705 is connected to an end wall corner post of the rail vehicle, and the second end of the connecting structure 705 is connected to the side wall corner post 704.

In the present invention, since the connecting structure 705 is provided, errors generated by assembly are compensated by the connecting structure 705 when the end wall corner post 81 is connected to the side wall assembly 70, thus avoiding the side wall corner post 704 or the end wall corner post 81 from deforming during the connection, ensuring the connecting strength between the side wall corner post 704 and the end wall corner post 81, and further ensuring the connecting strength between the side wall assembly 70 and the end wall assembly. Further, the connecting structure 705 may seal a gap between the side wall corner post 704 and the end wall corner post 81 caused by assembly errors or processing errors, thereby ensuring the sealing property of the entire vehicle body structure.

In the conventional art, due to the gap between the side wall assembly 70 and the end wall assembly, the side wall corner post 704 or the end wall corner post 81 may deform by directly connecting the side wall corner post 704 and the end wall corner post 81, so that the side wall assembly 70 or the end wall assembly is easily inclined, thereby affecting the strength of the entire vehicle body structure.

In order to solve the above problem, as shown in FIG. 49, in the embodiment of the present invention, the first end of the connecting structure 705 is lapped with the outer wall surface of the end wall corner post, and the second end of the connecting structure 705 urges against the side wall corner post 704.

Specifically, after the side wall assembly 70 and the end wall assembly are assembled completely, two ends of the connecting structure 705 are correspondingly connected to the end wall corner post 81 and the side wall corner post 704, so as to seal an assembly gap between the end wall corner post 81 and the side wall corner post 704 by using the connecting structure 705.

In an optional implementation manner, the first end of the connecting structure 705 and the outer wall surface of the end wall corner post 81 are lapped, and fixedly connected in a welding manner, so that the connecting strength is high, and the connection is stable. The second end of the connecting structure 705 urges against the side wall corner post 704, and they are fixedly connected in a welding manner. The above arrangement further ensures the sealing property of the entire vehicle body structure, the connecting strength is good, and the connecting structure is compact.

As shown in FIG. 49, in the embodiment of the present invention, the side wall corner post 704 includes a first vertical plate 7041 and a second vertical plate 7042. The first vertical plate 7041 is fixedly connected to the inner wall surface of the side wall body 701, an included angle is formed between the second vertical plate 7042 and the first vertical plate 7041, and the second vertical plate 7042 is fixedly connected to the second end of the connecting structure 705.

In the present application, the section of the side wall corner post 704 is L-shaped along the height direction of the rail vehicle. The L-shaped side wall corner post 704 is simple in structure and good in strength. The second vertical plate 7042 is welded to the second end of the connecting structure 705, thereby ensuring the sealing property and connecting strength of the vehicle body structure.

Preferably, as shown in FIG. 48 and FIG. 49, in the embodiment of the present invention, the connecting structure 705 is a flat connecting plate.

The connecting plate in the present application is a metal plate. The connecting plate is simple in structure and convenient for connection. Moreover, a surface-to-surface contact is formed between the connecting plate and the end wall corner post, thus improving the connecting strength.

Figure 50:
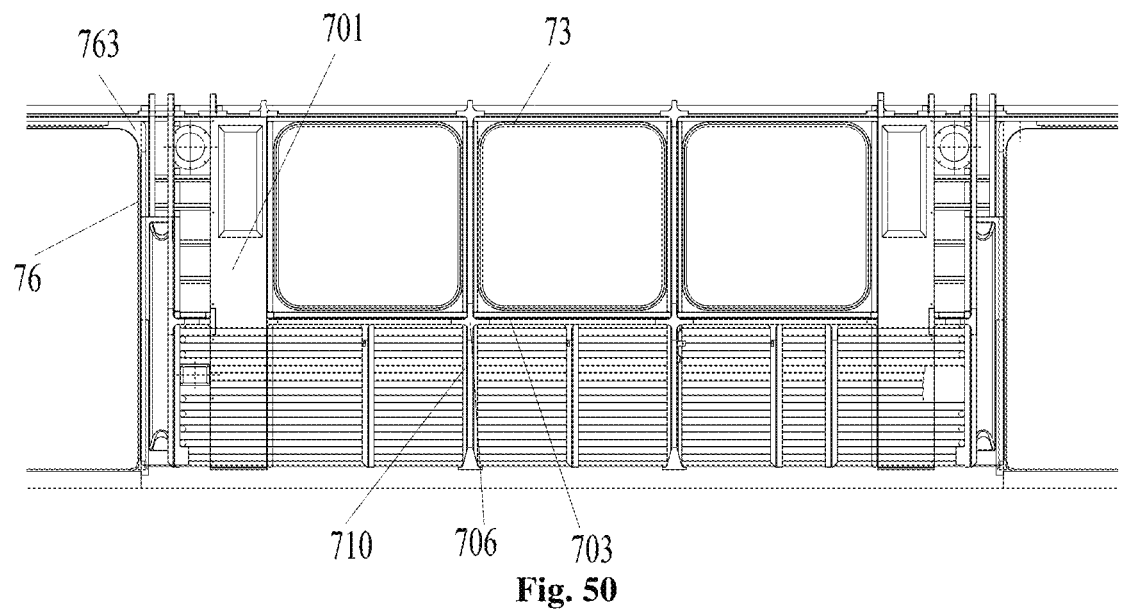
FIG. 50 is a partial structure diagram of the side wall assembly of the rail vehicle in FIG. 47.

As shown in FIG. 50, in the embodiment of the present invention, the side wall assembly 70 further includes a window 73, an under-window cross beam 703, and multiple side wall uprights 710. The under-window cross beam 703 is located below the window 73, the multiple side wall uprights 710 are connected to the side wall body 701 respectively, and the multiple side wall uprights 710 are spaced along the length direction of the side wall body 701, wherein at least one side wall upright 710 is connected to the under-window cross beam 703.

In the present application, the side wall upright 710 includes a first folded edge, a second folded edge opposite to the first folded edge, and a vertical edge connecting the first folded edge and the second folded edge, the first folded edge and the second folded edge are located on two opposite sides of the vertical edge and extend toward the opposite directions, the second folded edge is connected to the side wall body 701, and the under-window cross beam 703 extends in the length direction of the side wall body 701, so that the strength of the side wall body in the length direction can be improved. The side wall upright 710 and the under-window cross beam 703 are lapped to form a crisscross connecting portion. In the above arrangement, the under-window cross beam 703 extends along the horizontal direction of the side wall body 701 (the X direction as shown in FIG. 41), and the side wall upright 710 extends along the longitudinal direction of the side wall body 701 (the Z direction as shown in FIG. 41), so that the side wall body 701 is supported horizontally and longitudinally, thereby improving the structure strength of the entire side wall assembly 70.

As shown in FIG. 50, in the embodiment of the present invention, a reinforcing member 706 is disposed at the joint between at least one side wall upright 710 and the under-window cross beam 703.

Preferably, the reinforcing member 706 in the present application is a cross reinforcing member. The cross reinforcing member is disposed on the crisscross connecting portion of the side wall upright 710 and the under-window cross beam 703. The arrangement increases the connecting strength between the side wall upright 710 and the under-window cross beam 703, thus improving the overall structure strength of the side wall assembly 70.

As shown in FIG. 50, in the embodiment of the present invention, the reinforcing member 706 is fixedly connected to the side wall upright 710, and the reinforcing member 706 is fixedly connected to the under-window cross beam 703.

The reinforcing member 706 in the present application is welded to the side wall upright 710, and the reinforcing member 706 is welded to the under-window cross beam 703. The arrangement ensures the connecting strength between the reinforcing member 706 and the side wall upright 710, so as to achieve the firm connection between the under-window cross beam 703 and the side wall upright 710, thus improving the overall structure strength of the side wall assembly 70.

As shown in FIG. 50, in the embodiment of the present invention, the side wall assembly 70 further includes a door frame 76, the door frame 76 is fixedly connected to the side wall body 701, and the door frame 76 is provided with a reinforcing corner plate 763.

Preferably, the door frame 76 in the present application is of an integrated structure and is made of stainless steel, and the strength of the door frame 76 is further improved by providing the reinforcing corner plate 763 on the door frame 76.

Further, the reinforcing corner plate 763 is welded to the door frame 76, thus ensuring the connecting strength between the reinforcing corner plate 763 and the door frame 76.

As shown in FIG. 50, in the embodiment of the present invention, the door frame 76 has a corner portion, the reinforcing corner plate 763 corresponding to the corner portion.

Figure 63:
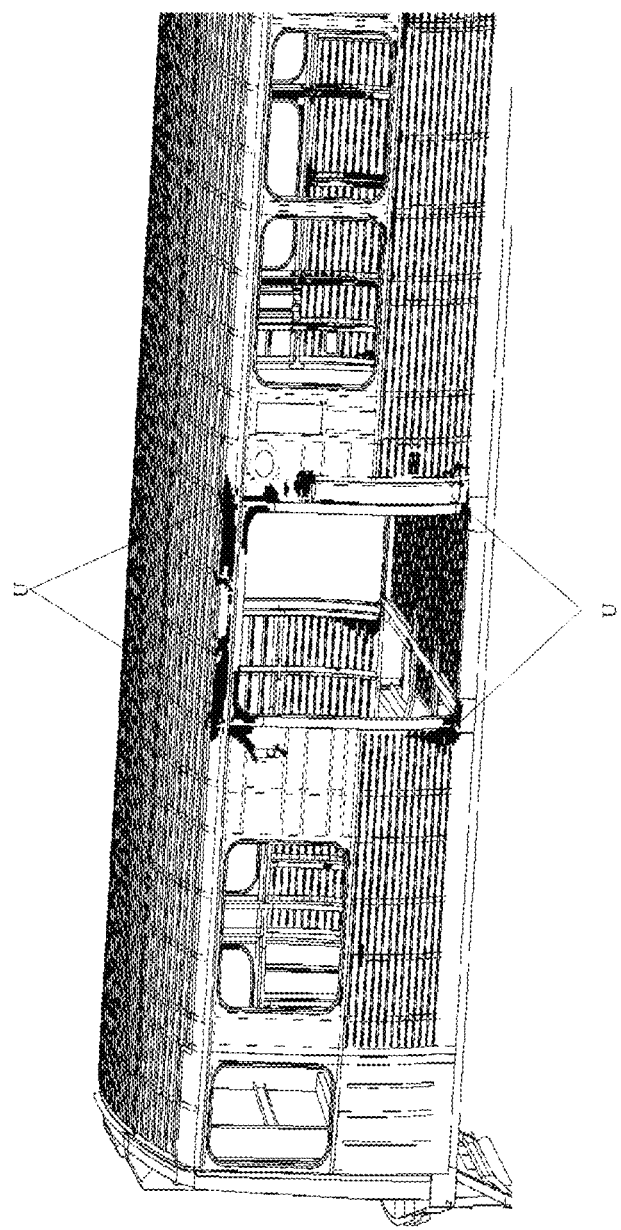
FIG. 63 is a stress nephogram of the side wall assembly according to an embodiment of the present invention.

As shown in FIG. 63, a stress nephogram of a side wall assembly 70 of a rail vehicle according to an embodiment of the present invention is illustrated. A part U in FIG. 63 is a stress concentration position, located on the corner portion of the door frame 76. For the stress distribution characteristics, the corner portion of the door frame 76 is provided with the reinforcing corner plate 763 for reinforcement, so as to improve the strength of the door frame 76.

Preferably, four reinforcing corner plates 763 are included in the present embodiment, and the four reinforcing corner plates 763 are correspondingly disposed on four corner portions of the door frame 76, so as to reinforce the door frame 76 from different parts of the door frame 76, thereby ensuring the overall strength of the door frame 76.

As shown in FIG. 50, in the embodiment of the present invention, the window frame of the window 73 is formed in a punching manner.

Specifically, the window frame of the window 73 in the present application can be punched by the process steps of drawing, trimming, punching and flanging, the strength of the punched window frame is high, the integrity is good, and there is no need to provide a reinforcing structure for reinforcement.

Further, the chassis component is provided with a corner post mounting hole, and the end wall corner post 81 is disposed in the corner post mounting hole in a penetration manner.

Specifically, the chassis component in the present application includes a lower boundary beam, the corner post mounting hole is provided on the lower boundary beam, and the end wall corner post 81 is disposed in the corner post mounting hole in a penetration manner, so that the connection between the end wall corner post 81 and the chassis component is realized.

As shown in FIG. 48 and FIG. 49, after the end wall assembly and the side wall assembly 70 are assembled completely, the end wall corner post 81 and the side wall corner post 704 are connected by the connecting structure 705. In the presence of processing errors and assembly errors, after the end wall assembly and the side wall assembly 70 are assembled completely, a certain gap exists between the end wall corner post 81 and the side wall corner post 704. During the connection, after the first end of the connecting structure 705 and the outer wall surface of the end wall corner post 81 are lapped, the connecting structure 705 is moved along the length direction of the rail vehicle, so that the second end of the connecting structure 705 urges against the side wall corner post 704, thus ensuring that the connecting structure 705 fully covers the gap between the end wall corner post 81 and the side wall corner post 704. The connecting structure is fixedly connected to the end wall corner post 81 and the side wall corner post 704 in a welding manner, so that the connection between the side wall corner post 704 and the end wall corner post 81 is realized.

Figure 59:
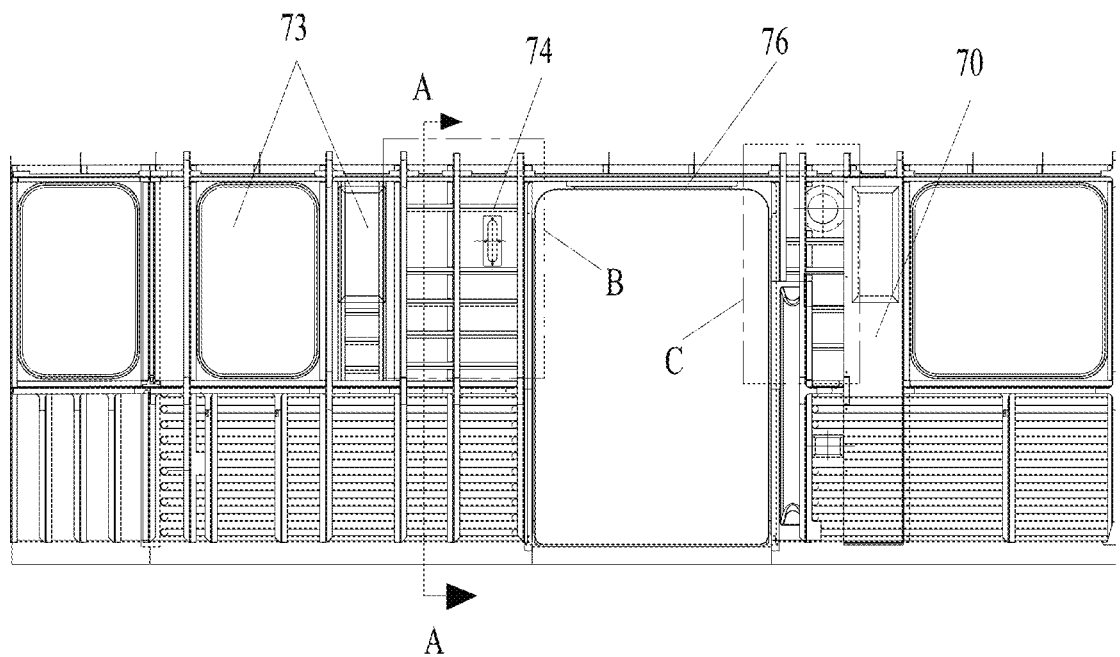
FIG. 59 is a structure diagram showing that an handrail bar is assembled to the handrail mounting seat.
Figure 60:
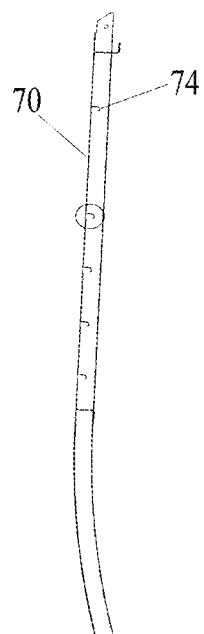
FIG. 60 is a partial enlargement diagram of FIG. 59.

As shown in FIG. 59 and FIG. 60, the embodiment of the present invention provides a reinforcing structure of a side wall of a rail vehicle. The reinforcing structure 74 of the present embodiment includes a reinforcing body and a turned edge 743 connected to the reinforcing body, the reinforcing body is fixedly connected to the side wall assembly 70, and the turned edge 743 and the side wall assembly 70 are spaced.

In the present application, the reinforcing structure 74 is disposed on the side wall assembly 70 of the rail vehicle to reinforce the strength of the side wall assembly 70. The reinforcing structure includes a reinforcing body and a turned edge 743 connected to the reinforcing body. Compared with the conventional art in which an L-shaped reinforcing structure is disposed on the side wall assembly 70, the reinforcing structure of the present application has the turned edge 743, thereby avoiding from scratching an operator by the sharp end of the reinforcing structure, and facilitating mounting and maintenance.

Further, as shown in FIG. 60, the side wall assembly 70 of the present invention includes a side wall body disposed on the outside and an interior member disposed on the inside. The reinforcing structure 74 is disposed on the side wall body. When a cold-proof material is filled between the side wall body and the interior member, the turned edge 743 of the reinforcing structure 74 cannot prevent filling of the cold-proof material. Compared with an n-shaped reinforcing structure or an m-shaped reinforcing structure in the conventional art, the reinforcing structure 74 of the present application facilitates attaching and bonding of the cold-proof material, thereby facilitating the development of a subsequent process.

Figure 61:
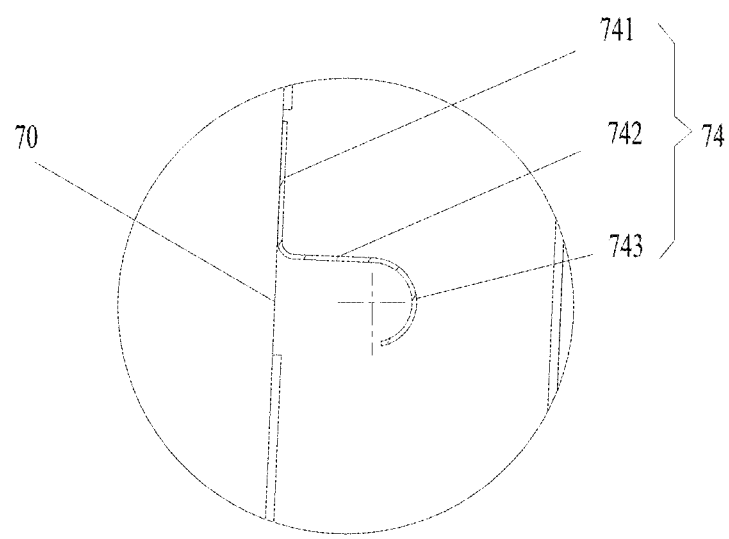
FIG. 61 is a front view of FIG. 59.
Figure 62:
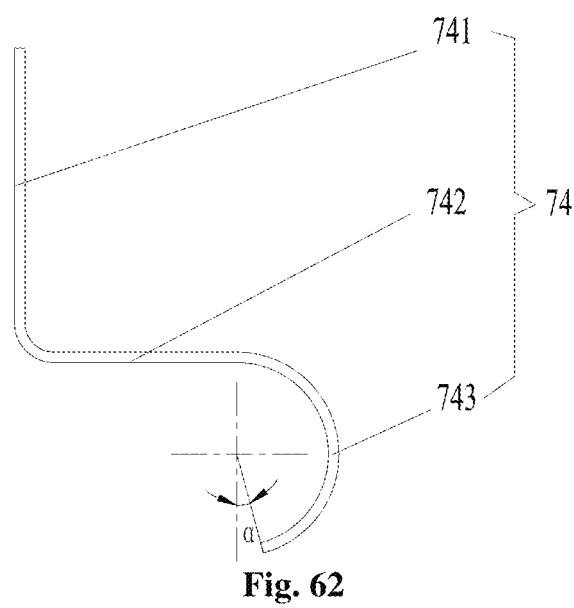
FIG. 62 is a section view in direction D-D of FIG. 61.

As shown in FIG. 61 and FIG. 62, the reinforcing body includes a first reinforcing plate 741 and a second reinforcing plate 742. The first reinforcing plate 741 is connected to the side wall assembly 70. The first end of the second reinforcing plate 742 is connected to the first reinforcing plate 741, the second end of the second reinforcing plate 742 is connected to the turned edge 743, and an included angle is formed between the second reinforcing plate 742 and the first reinforcing plate 741.

Specifically, the first reinforcing plate 741 and the second reinforcing plate 742 form an L-shaped reinforcing body, the first reinforcing plate 741 is connected to the side wall assembly 70 so as to improve the strength of the side wall assembly 70 in the height direction, and an included angle is formed between the second reinforcing plate 742 and the first reinforcing plate 741 to improve the strength of the side wall assembly 70 in the width direction.

Preferably, the first reinforcing plate 741 in the present application is vertically connected to the second reinforcing plate 742.

Of course, in an alternative embodiment not illustrated in the drawings of the present invention, the included angle between the second reinforcing plate 742 and the first reinforcing plate 741 may be randomly set as long as performing of a subsequent process is not affected.

Preferably, in the embodiment of the present invention, the first reinforcing plate 741 is welded to the side wall assembly 70.

The first reinforcing plate 741 is connected to the side wall assembly 70 in a spot welding manner, and a spot welding sealant is provided between the first reinforcing plate 741 and the side wall assembly 70, thereby ensuring the connecting strength between the first reinforcing plate 741 and the side wall assembly 70. A gap between the first reinforcing plate 741 and the side wall assembly 70 is sealed, so that the first reinforcing plate 741 can be effectively prevented from being separated.

As shown in FIG. 61 and FIG. 62, in the embodiment of the present invention, the turned edge 743 and the first reinforcing plate 741 are located on two sides of the second reinforcing plate 742 respectively.

In the present application, the first reinforcing plate 741, the second reinforcing plate 742 and the turned edge 743 are of an all-in-one structure, one end of the second reinforcing plate 742 is connected to the first reinforcing plate 741, the other end of the second reinforcing plate 742 is connected to the turned edge 743, and the first reinforcing plate 741 and the turned edge 743 are located on two sides of the second reinforcing plate 742 respectively. The above arrangement facilitates the mounting operation of an operator. Compared with the scenario where the first reinforcing plate 741 and the turned edge 743 are disposed on the same side of the second reinforcing plate 742, the arrangement mode of the present application facilitates forming, and it is convenient for the operator to mount the reinforcing structure 74 on the side wall assembly 70. The tail end of the turned edge 743 faces the side wall assembly 70, thereby avoiding from scratching the operator during mounting.

Preferably, the reinforcing structure 74 in the present application is integrally made from a steel plate that is 1mm thick.

As shown in FIG. 61 and FIG. 62, in the embodiment of the present invention, the section of the turned edge 743 is circular arc-shaped.

The section mentioned here is the section made along the width direction of the vehicle, that is, an A-A sectional direction in FIG. 59. The circular arc-shaped turned edge 743 makes the tail end of the reinforcing structure 74 face the side wall assembly 70. Compared with the L-shaped reinforcing structure in the conventional art, the tail end of the reinforcing structure 74 of the present application is bent, so that it is unlikely for the operator to touch the sharp end of the reinforcing structure 74, thereby avoiding scratching.

Further, as shown in FIG. 62, in the embodiment of the present invention, an included angle α is provided between a connecting line of the tail end of a circular arc and the center of the circular arc and a plane where the first reinforcing plate 741 is located, where the included angle α is greater than or equal to 15° and smaller than or equal to 25°.

Preferably, the included angle α in the present application is 15°. The setting of the included angle α ensures that the turned edge 743 has a certain radian, which not only can meet the own structure requirement of the turned edge 743, but also can achieve a hooking effect on a cold-proof material when the cold-proof material is filled in the side wall assembly 70. The influence on filling of the cold-proof material due to the fact that the turned edge 743 is too small is avoided, or scratching of the operator due to the fact that the turned edge 743 is too large is avoided.

As shown in FIG. 59, in the embodiment of the present invention, the side wall assembly 70 includes an upper side wall and a lower side wall connected to the upper side wall, and the reinforcing structure 74 is disposed on the upper side wall.

Specifically, the upper side wall of the present application is made of common sheet steel, the lower side wall is made of a corrugated plate, and the strength of the corrugated plate is much higher than the strength of the common sheet steel. Therefore, in order to improve the strength of the upper side wall, the reinforcing structure 74 is disposed on the upper side wall, so as to meet the strength requirement of the side wall assembly 70.

Preferably, the side wall structure of the present application includes multiple reinforcing structures 74, the upper side wall is provided with a window 73, and the multiple reinforcing structures 74 are spaced on at least one side of the window 73 to form a reinforcing area.

As shown in FIG. 59, the upper side wall is provided with a window 73, and multiple reinforcing structures 74 are spaced on at least one side of the window 73 to form a reinforcing area, so as to improve the strength of the side wall assembly 70 surrounding the window 73, as shown in an area B in FIG. 59.

Of course, in an alternative embodiment not illustrated in the drawings, multiple reinforcing structures 74 may be spaced on two sides of the window 73 according to practical situations.

Preferably, the side wall structure of the present application includes multiple reinforcing structures 74, the side wall assembly 70 is provided with a door frame 76, and the multiple reinforcing structures 74 are spaced on at least one side of the door frame 76 to form a reinforcing area.

As shown in FIG. 59, the side wall assembly 70 is provided with a vehicle door, and multiple reinforcing structures 74 are disposed on upper side wall parts on two sides of the door frame 76 of the vehicle door to form a reinforcing area, so as to improve the strength of the side wall assembly 70 surrounding the door frame 76, as shown in areas B and C in FIG. 59, thereby meeting the strength requirement of the side wall assembly 70.

Further, the upper side wall assembly 70 is also provided with a vent hole (such as a circular vent hole in an area C in FIG. 59), and the above reinforcing structures 74 are also disposed around the vent hole, so that the strength of the hole position of the side wall assembly 70 can be ensured.

In the technical solution of the present application, multiple reinforcing structures 74 are disposed around the hole position on the upper side wall, and the reinforcing structures 74 may be disposed horizontally or longitudinally as required to form a reinforcing area, so as to improve the strength of the upper side wall, thereby avoiding from affecting the appearance of the side wall caused by the bending deformation of the upper side wall.

In the conventional art, in order to reduce the weight of the vehicle body, the stainless steel side wall assembly 70 should be as thin as possible on the premise of meeting the strength requirement. However, the sheet is prone to buckling deformation without supporting, so as to cause the bad appearance of the side wall assembly 70.

The present invention provides the section of a novel reinforcing structure 74. During production, reinforcing structures 74 with different lengths can be made as required. By reasonably arranging the reinforcing structures 74 along the longitudinal and horizontal directions of the side wall assembly 70, a buckling reinforcement area on the side wall assembly 70 (in particular, the upper side wall) is formed, so that the problem in the conventional art of buckling of the stainless steel side wall assembly 70 due to insufficient rigidity is solved.

Figure 51:
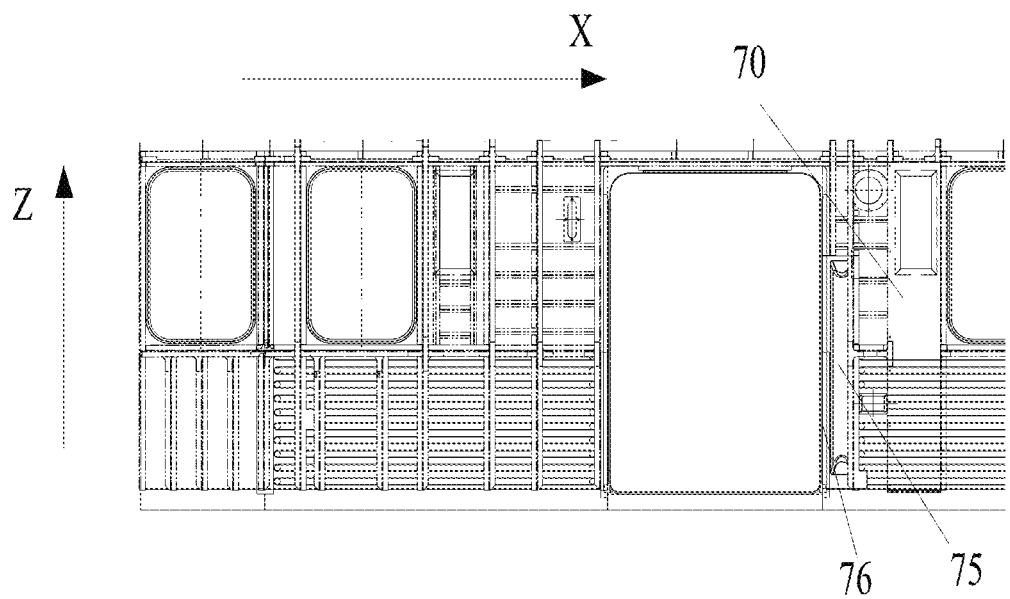
FIG. 51 is a second structure diagram of the embodiment of the side wall assembly of the rail vehicle according to the present invention.

The length direction and height direction of the rail vehicle in the present application are as shown in FIG. 51, an X direction is the length direction of the vehicle, and a Z direction is the height direction.

As shown in FIG. 51, the embodiment of the present invention provides a side wall assembly 70 of a rail vehicle. The side wall assembly 70 of the present embodiment includes a side wall assembly 70 and a handrail mounting seat 75. The handrail mounting seat 75 is disposed on the side wall assembly 70, the handrail mounting seat 75 is provided with a handrail mounting groove 758, the handrail mounting groove 758 is used for mounting a handrail bar 750, and the handrail mounting groove 758 is depressed toward the internal direction of the vehicle.

In the present application, since the mounting groove 758 is depressed into the vehicle, the handrail bar 750 is not protruded from the external profile of the vehicle after being mounted in the mounting groove 758, thereby ensuring the good overall appearance of the rail vehicle, avoiding from rubbing against or colliding with the external environment during running, and also avoiding air resistance caused by the protrusion of the handrail bar 750 from the side wall assembly 70. Therefore, the above arrangement ensures the appearance attractiveness of the vehicle, and makes the integrity of the vehicle good.

Figure 52:
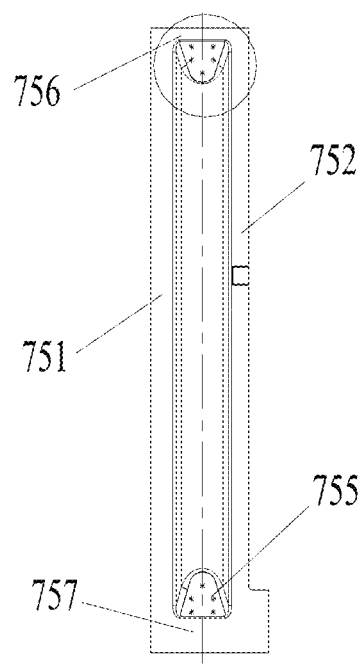
FIG. 52 is a section view of the side wall assembly in direction A-A in FIG. 51.
Figure 53:
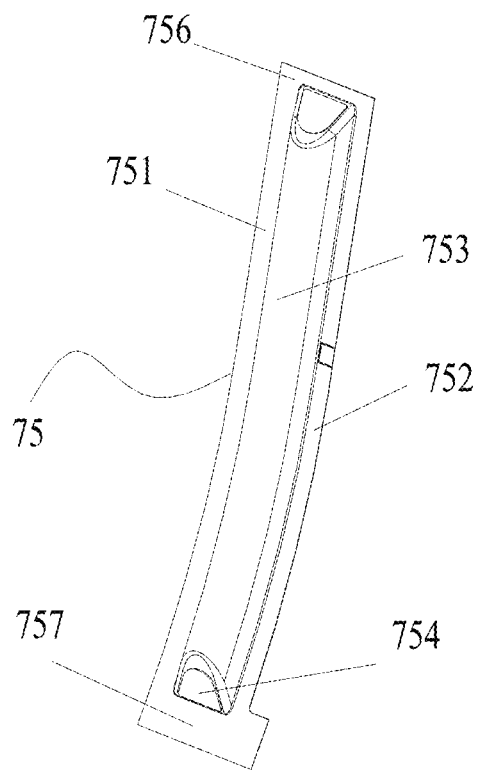
FIG. 53 is a partial enlargement diagram of the side wall assembly in FIG. 52.

As shown in FIG. 51 to FIG. 53, in the embodiment of the present invention, the handrail mounting seat 75 includes a first mounting plate 751 and a second mounting plate 752 connected to the first mounting plate 751, and a mounting groove for mounting a handrail bar is formed between the first mounting plate 751 and the second mounting plate 752, wherein the first mounting plate 751 is connected to an L-shaped door frame 76 of the vehicle, and the second mounting plate 752 is connected to the side wall assembly 70 of the vehicle.

In the present application, the handrail mounting seat 75 is used for mounting the handrail bar 750. The handrail mounting seat 75 is mounted on the vehicle through the first mounting plate 751 and the second mounting plate 752, so that the handrail mounting seat 75 can be fixedly mounted on the vehicle. Moreover, the first mounting plate 751 of the handrail mounting seat 75 is connected to the L-shaped door frame 76 of the vehicle along the length direction of the vehicle, and the second mounting plate 752 of the handrail mounting seat 75 is connected to the side wall assembly 70 of the vehicle, so that the connecting strength between the handrail mounting seat 75 and the vehicle body is ensured, space between the door frame 76 and the side wall assembly 70 is fully utilized, a passenger can conveniently hold the handrail bar 750, and the problem that the passenger cannot conveniently hold the handrail bar 750 due to the fact that two mounting plates of the handrail mounting seat 75 are connected to the side wall assembly 70 and the handrail mounting seat 75 is away from the door frame 76 is avoided.

Therefore, by means of the above arrangement, the connecting strength between the handrail mounting seat 75 and the vehicle body is good, space is fully utilized in the length direction of the vehicle body, and it is ensured that the passenger can conveniently hold the handrail bar 750 after it is mounted on the handrail mounting seat 75.

Figure 58:
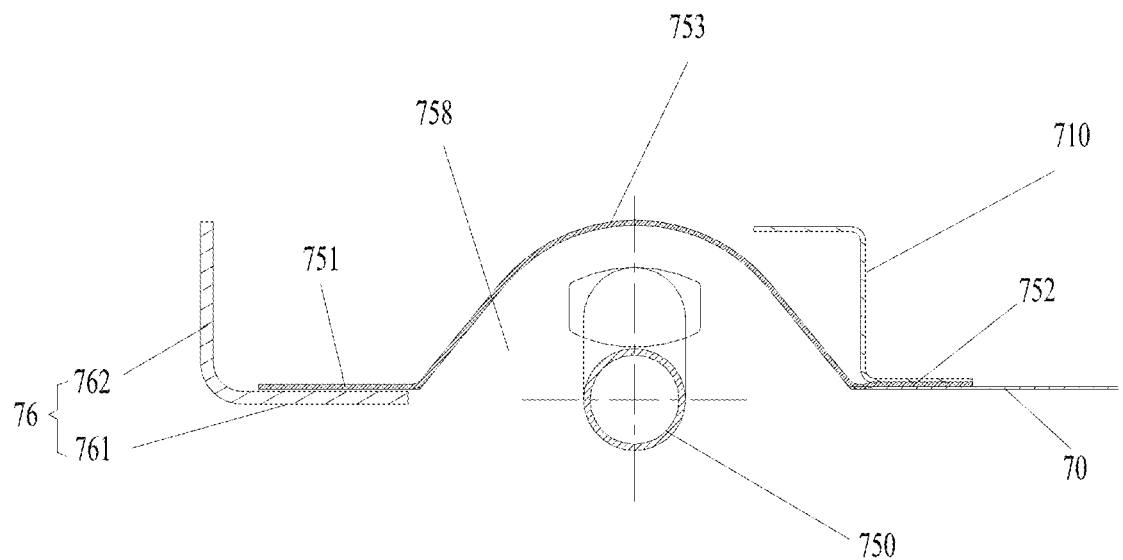
FIG. 58 is a partial enlargement diagram of FIG. 56.

As shown in FIG. 58, in the embodiment of the present invention, the side wall assembly 70 includes a side wall body and a side wall upright 710 connected to the side wall body, and the second mounting plate 752 is located between the side wall body and the side wall upright 710.

Specifically, the side wall assembly 70 in the present application includes a side wall body and a side wall upright 710 connected to the side wall body, and the handrail mounting seat 75 is disposed between the side wall upright 710 and the door frame 76 along the length direction of the vehicle. The second mounting plate 752 is embedded between the side wall body and the side wall upright 710, so that the handrail mounting seat 75 is not protruded from the outer surface of the side wall assembly 70, thereby ensuring the attractiveness of the vehicle body.

Preferably, in the embodiment of the present invention, the side wall upright 710 is a Z-shaped side wall upright, the side wall upright 710 includes a first upright, a second upright and a third upright connected in sequence, and the first upright is connected to the second mounting plate 752.

The side wall upright 710 in the present application is a Z-shaped side wall upright, the structure is simple, and the connecting strength is high. The second mounting plate 752 is connected to the first upright of the Z-shaped side wall upright, so that the second mounting plate 752 is embedded between the first upright and the side wall body, thereby ensuring that the handrail mounting seat 75 is not protruded from the outer surface of the side wall assembly 70. Moreover, the second mounting plate 752 is in surface-to-surface connection with the first upright, thereby ensuring the connecting strength of the handrail mounting seat 75.

Preferably, in the embodiment of the present invention, the second mounting plate 752 is welded to the first upright, and a sealant is provided between the second mounting plate 752 and the first upright.

Specifically, the second mounting plate 752 is connected to the first upright in a spot welding manner, thereby ensuring the connecting strength between the second mounting plate 752 and the first upright to further ensure the mounting strength of the handrail mounting seat 75 connected to the side wall assembly 70. Further, a spot welding sealant is provided at the welding joint to seal a gap between the second mounting plate 752 and the first upright, thereby improving the connecting strength.

Preferably, in the embodiment of the present invention, the first mounting plate 751 is welded to the L-shaped door frame 76, and a sealant is provided between the first mounting plate 751 and the L-shaped door frame 76.

Specifically, the first mounting plate 751 is connected to the L-shaped door frame 76 in a spot welding manner, thereby ensuring the connecting strength between the first mounting plate 751 and the L-shaped door frame to further ensure the mounting strength of the handrail mounting seat 75 connected to the L-shaped door frame. Further, a spot welding sealant is provided at the welding joint to seal a gap between the first mounting plate 751 and the L-shaped door frame, thereby improving the connecting strength.

Figure 55:
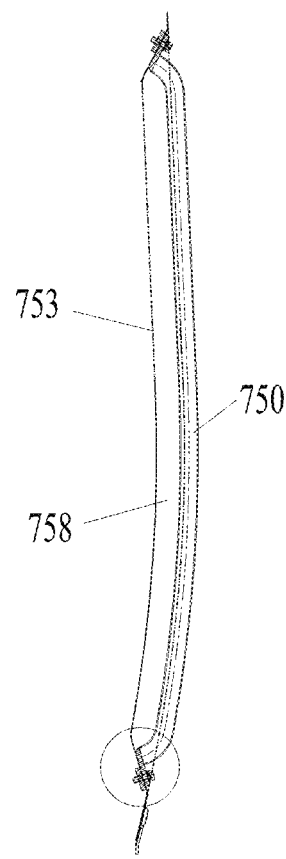
FIG. 55 is a structure diagram after an handrail mounting seat of the side wall assembly of the rail vehicle is assembled with the vehicle according to the present invention.

As shown in FIG. 55 and FIG. 58, in the embodiment of the present invention, the handrail mounting seat 75 further includes an arc-shaped plate 753 disposed between the first mounting plate 751 and the second mounting plate 752, a mounting groove is provided on the arc-shaped plate 753, and after the handrail bar 750 is mounted in the mounting groove, the handrail bar 750 is flush with the outer surface of the side wall assembly 70.

Specifically, the handrail bar 750 is mounted in the mounting groove on the arc-shaped plate 753, and the arc-shaped plate 753 is depressed from the outside of the vehicle body to the inside of the vehicle body to make the mounting groove embedded into the side wall assembly 70, so that after the handrail bar 750 is mounted in the mounting groove, the handrail bar 750 is not protruded from the outer surface of the side wall assembly 70, thereby ensuring the attractiveness of the vehicle body.

Further, the handrail mounting seat 75 of the present application is mounted outside the vehicle body and disposed on one side of the door frame 76, for being held by the passenger when getting on. The mounting groove of the handrail mounting seat 75 of the present application is depressed inward, so that the handrail bar 750 is flush with the outer surface of the side wall assembly 70, thereby avoiding from rubbing against or colliding with the external environment during running, and also avoiding air resistance caused by the protrusion of the handrail bar 750 from the side wall assembly 70.

Of course, in an alternative embodiment not illustrated in the drawings of the present invention, the shape of the arc-shaped plate 753 is not limited to the circular arc shape, or may be other shapes, as long as it is ensured that the arc-shaped plate 753 is provided with a mounting groove for mounting the handrail bar 750 and the handrail bar 750 is not protruded from the outer surface of the side wall assembly 70 after the handrail bar 750 is mounted in the mounting groove.

Preferably, in the embodiment of the present invention, the first mounting plate 751, the arc-shaped plate 753 and the second mounting plate 752 are of an all-in-one structure.

The arrangement ensures the overall strength of the handrail mounting seat 75, so that after the handrail mounting seat 75 is fixedly connected to the vehicle body through the first mounting plate 751 and the second mounting plate 752, the arc-shaped plate 753 is mounted on the vehicle body accordingly, so that the integrity is good, and the mounting procedure is simplified.

Further, in the embodiment of the present invention, the handrail mounting seat 75 is formed by a punching process.

The arrangement ensures the overall strength of the handrail mounting seat 75.

Figure 54:
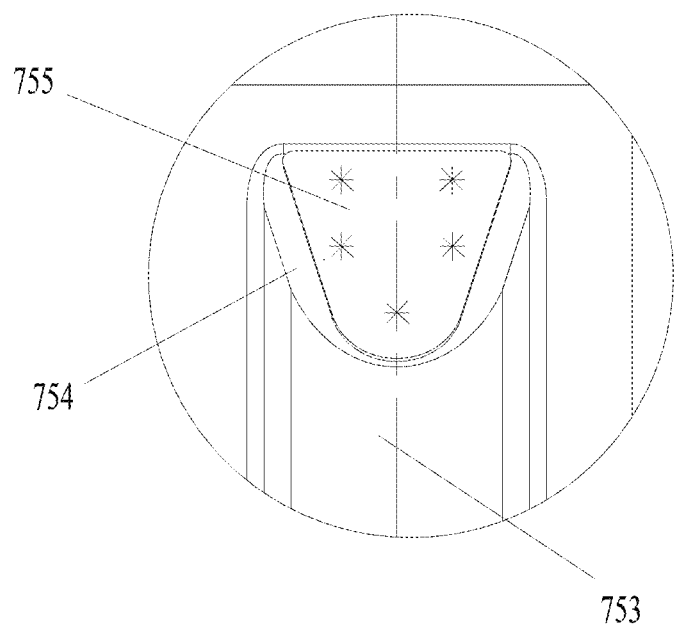
FIG. 54 is a structure diagram of a reinforcing structure of the side wall assembly in FIG. 53.
Figure 56:
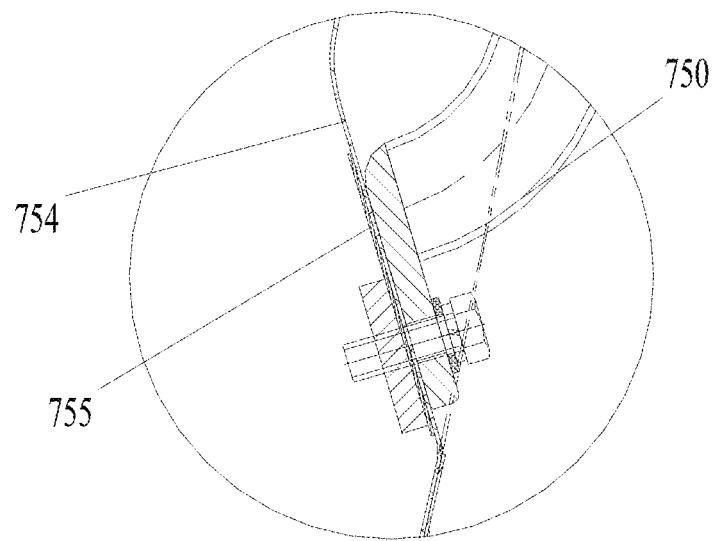
FIG. 56 is a front view of the handrail mounting seat in FIG. 55.
Figure 57:
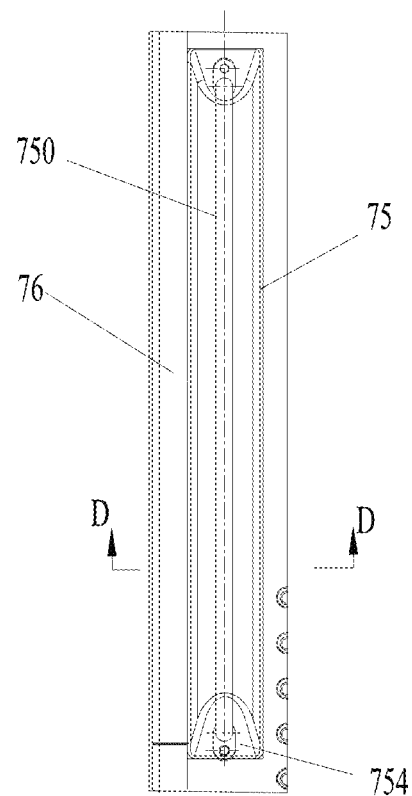
FIG. 57 is a schematic diagram of three-dimensional structure of the handrail mounting seat in FIG. 56.

As shown in FIG. 54, FIG. 56 and FIG. 57, in the embodiment of the present invention, the handrail mounting seat 75 further includes connecting plates 754, two opposite ends of the arc-shaped plate 753 are correspondingly provided with the connecting plates 754, and the handrail bar 750 is fixedly connected to the connecting plates 754 through fasteners.

In the present application, the connecting plates 754 are disposed at two ends of the arc-shaped plate 753, two ends of the handrail bar 750 are provided with mounting portions, and the mounting portions at two ends of the handrail bar 750 are mounted on the connecting plates 754 through fasteners, so as to achieve a function of mounting the handrail bar 750 on the handrail mounting seat 75.

As shown in FIG. 59 and FIG. 58, in the embodiment of the present invention, a reinforcing plate 755 is disposed on a side, away from the handrail bar 750, of the connecting plate 754.

Specifically, the reinforcing plate 755 and the handrail bar 750 are disposed on two sides of the connecting plate 754. Further, the reinforcing plate 755 is connected to the connecting plate 754 in a spot welding manner, and a spot welding sealant is provided between the reinforcing plate 755 and the connecting plate 754.

The arrangement improves the strength of the connecting plate 754, and ensures the stability of connection between the handrail bar 750 and the connecting plate 754.

As shown in FIG. 52 and FIG. 53, in the embodiment of the present invention, the handrail mounting seat 75 further includes a third mounting plate 756 and a fourth mounting plate 757 disposed oppositely along the height direction of the vehicle, the third mounting plate 756 and the fourth mounting plate 757 being used for connecting the first mounting plate 751 and the second mounting plate 752 respectively.

Preferably, in the present application, the third mounting plate 756 is connected to the first mounting plate 751 and the second mounting plate 752 respectively, the fourth mounting plate 757 is connected to the first mounting plate 751 and the second mounting plate 752 respectively, the first mounting plate 751 and the second mounting plate 752 are used for mounting the left and right sides of the handrail mounting seat 75 on the vehicle body, and the third mounting plate 756 and the fourth mounting plate 757 are used for mounting the upper and lower sides of the handrail mounting seat 75 on the vehicle body, so as to achieve a function of fixedly mounting the entire handrail mounting seat 75 on the vehicle body.

By means of the arrangement, the circumference of the handrail mounting seat 75 is fixedly connected to the vehicle body, thereby ensuring the overall mounting strength of the handrail mounting seat 75.

Specifically, the side wall assembly 70 includes a side wall body, and both the third mounting plate 756 and the fourth mounting plate 757 are fixedly connected to the side wall body.

In the present application, both the third mounting plate 756 and the fourth mounting plate 757 extend into the side wall body, and are welded to the side wall body. The arrangement further ensures embedding of the handrail mounting seat 75 into the vehicle body.

As shown in FIG. 58, in the embodiment of the present invention, the L-shaped door frame 76 includes a first door frame 761 and a second door frame 762 connected to the first door frame 761, the first mounting plate 751 is located inside the first door frame 761, and the first mounting plate 751 is connected to the first door frame 761.

In the present application, the door frame 76 is L-shaped, the first door frame 761 of the door frame 76 is parallel to the side wall assembly 70, the second door frame 762 is vertical to the side wall assembly 70, the first mounting plate 751 is connected to the first door frame 761, and the first mounting plate 751 is located inside the first door frame 761. Further, the first door frame 761 is connected to the first mounting plate 751 in a spot welding manner, and a sealant is provided between the first door frame 761 and the first mounting plate 751.

The arrangement ensures that the handrail mounting seat 75 is embedded into the vehicle body, the connecting strength between the first door frame 761 and the first mounting plate 751 is high, and the service life of the handrail mounting seat 75 is prolonged.

Figure 64:
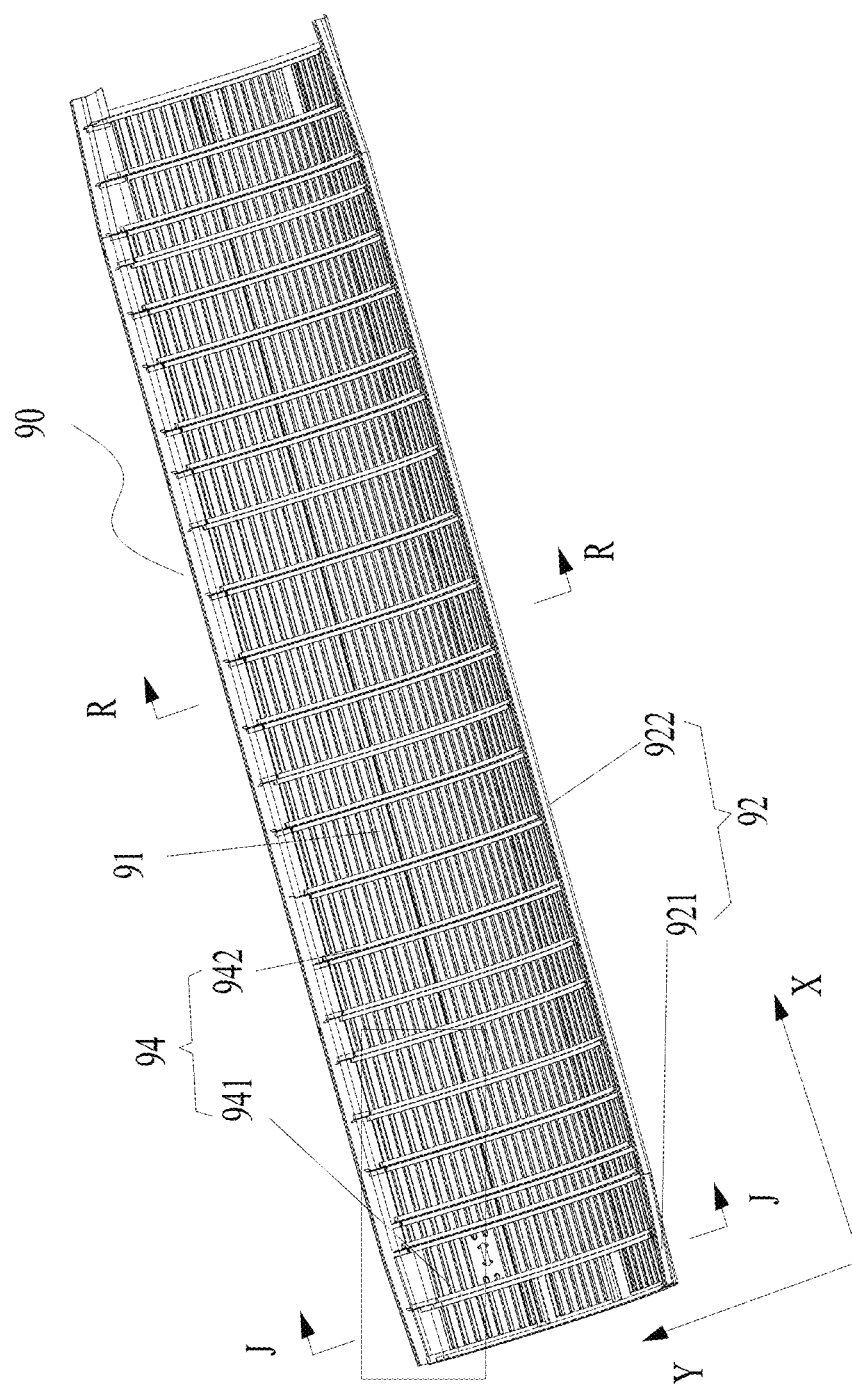
FIG. 64 is a structure diagram of an embodiment of a vehicle roof assembly of the rail vehicle according to the present invention.

The length direction and width direction of a roof component in the present application are as shown in FIG. 64, an X direction is the length direction of the roof component, and a Y direction is the width direction of the roof component.

Figure 65:
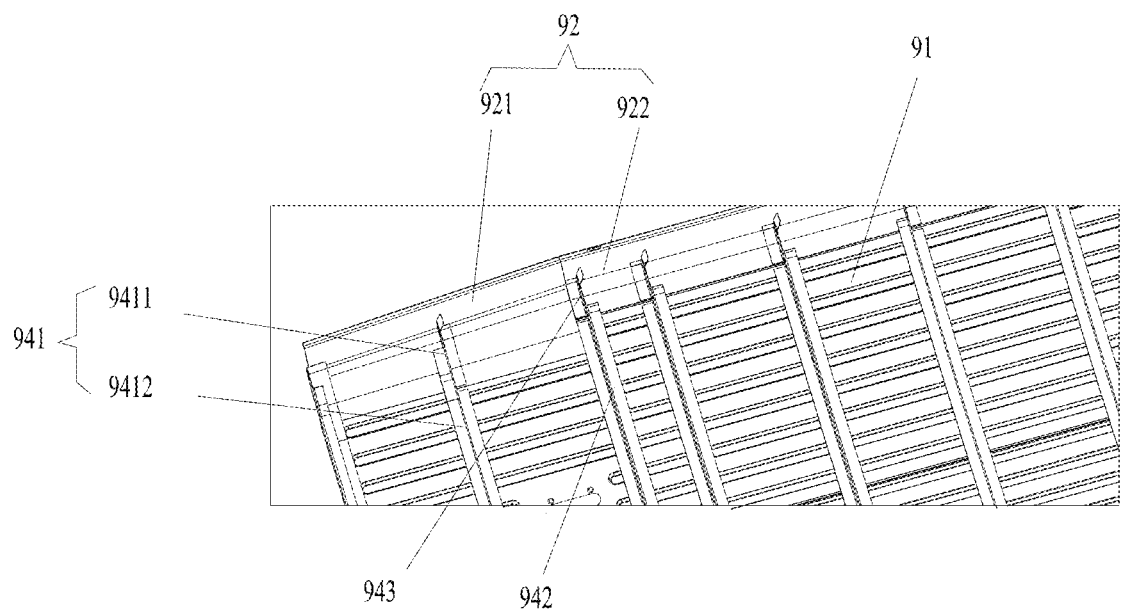
FIG. 65 is a partial enlargement diagram of the vehicle roof assembly in FIG. 64.

As shown in FIG. 64 and FIG. 65, the embodiments of the present invention provide a vehicle roof assembly of the rail vehicle. The vehicle roof assembly of the embodiment includes two upper edge beams 92 which are set at interval, a bending cross beam component 94, and a transition structure. The bending cross beam component 94 is between the two upper edge beams 92. The transition structure is set on the bending cross beam component 94, and is connected with at least one of the upper edge beams 92.

In the application, because the transition structure is set on the bending cross beam component 94, it is convenient to connect the bending cross beam component 94 with the upper edge beam 92, thereby ensuring the general strength of the vehicle roof assembly 90. Compared with setting the transition structure on the upper edge beam 92 in the conventional art, the transition structure is set on the bending cross beam component 94; because a width dimension of the vehicle roof assembly 90 is far smaller than a length dimension of the vehicle roof assembly 90, it is convenient to process the transition structure, and it is easy to control the processing size and precision, thereby solving the problem of inconvenience of molding the transition structure caused by the large overall length dimension of the upper edge beam 92. By means of the above setting, it is convenient to connect the bending cross beam component 94 with the upper edge beam 92, and the problem in the conventional art of inconvenience of connecting bending cross beam component 94 with the upper edge beam 92 is solved. Moreover, it is convenient to process and mold the transition structure set on the bending cross beam component 94.

As shown in FIG. 64 and FIG. 65, in the embodiments of the present invention, the upper edge beam 92 includes two first upper edge beam segments 921 and a second upper edge beam segment 922 which connects the two first upper edge beam segments 921. The bending cross beam component 94 includes a center bending beam 942 and an end bending beam 941. The center bending beam 942 is connected with the second upper edge beam segment 922. The end bending beam 941 is connected with the first upper edge beam segment 921. The end bending beam 941 and the center bending beam 942 are set at interval along the length direction of the upper edge beam 92, and the transition structure is set on the center bending beam 942.

Specifically, all the upper edge beams 92 in the application include two first upper edge beam segments 921 and the second upper edge beam segment 922 which connects the two first upper edge beam segments 921. The second upper edge beam segment 922 is a flat structure, that is, the distances between the two second upper edge beam segments 922 are the same along the length direction of the vehicle body. In the application, the center bending beam 942 is connected with the second upper edge beam segment 922, and the transition structure is set on the center bending beam 942.

In the application, the bending cross beam component 94 includes a plurality of center bending beams 942 which are set at intervals along the length direction of the upper edge beam 92. Because the distance between the two second upper edge beam segments 922 are the same, it is possible to set the same transition structure on each center bending beam 942, that is, the connection between each center bending beam 942 and the second upper edge beam segment 922 may be realized. Besides, in the embodiments of the application, the number of the middle bending beams 942 is far larger than the number of the end bending beams 941. Therefore, by setting the transition structure on the center bending beam 942, it is convenient to connect the bending cross beam component 94 with the upper edge beam 92, and mass production of the transition structure is realized, which is convenient to process.

Preferably, the transition structure is a transition beam 943 set at one end of the center bending beam 942.

Furthermore, the transition beam 943 and the center bending beam 942 are an integrated structure.

In the application, the transition beam is set at one end of the center bending beam 942, so as to facilitate the connection between the bending cross beam component 94 and the upper edge beam 92. The transition beam 943 and the center bending beam 942 are an integrated structure, which ensures the connection strength between the transition beam 943 and the center bending beam 942, thereby ensuring the connection strength between the bending cross beam component 94 and the upper edge beam 92. Moreover, from the above, it is convenient to mold and process the transition beam 943.

Figure 66:
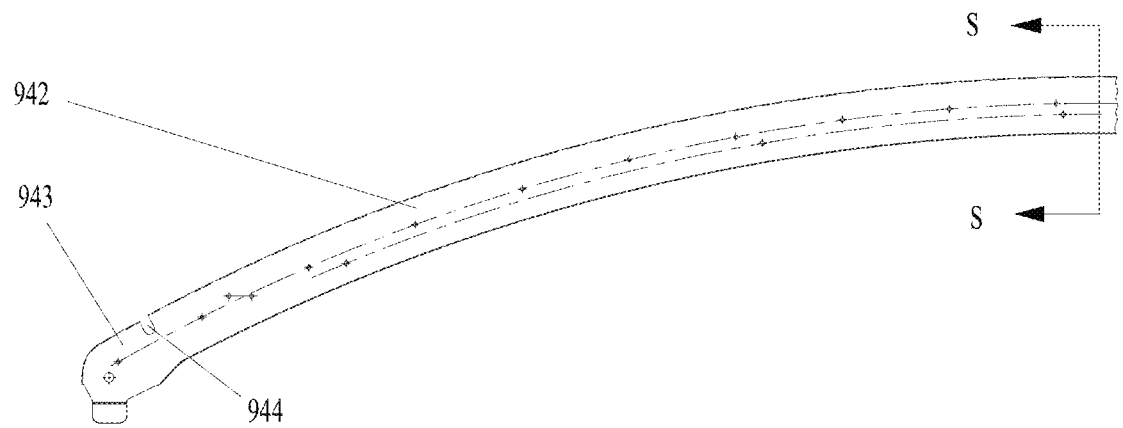
FIG. 66 is a structure diagram of a center bending beam of the vehicle roof assembly in FIG. 64.

As shown in FIG. 66, in the embodiments of the present invention, the bending cross beam component 94 further includes an inserting part 944. The first end of the second upper edge beam segment 922 is inserted in the inserting part 944. The inserting part 944 is set between the center bending beam 942 and the transition beam 943.

In the application, one end of the second upper edge beam 922 is inserted in the inserting part 944. After being inserted to coordinate the inserting part 944, the second upper edge beam 922 and the transition beam 943 are connected by welding. The above setting ensures the connection strength between the second upper edge beam segment 922 and the transition beam 943.

Of course, in an alternative embodiment not shown in the accompanying drawings of the present invention, the inserting part 944 may also be set on the transition beam 943 or the center bending beam 942, as long as the insertion coordination between the transition beam 943 and the second upper edge beam segment 922 may be ensured.

Figure 68:
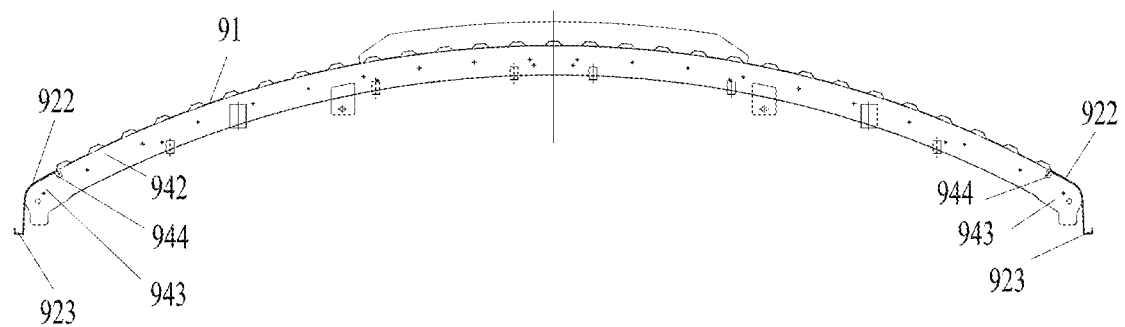
FIG. 68 is a section view of the vehicle roof assembly in direction R-R in FIG. 64.

As shown in FIG. 68, in the embodiments of the present invention, the second end of the second upper edge beam 922 is set with a water chute 923.

The above setting may guide water flow on the vehicle roof assembly 90, thereby facilitating drainage of the vehicle, and preventing water flow from flowing, along the vehicle roof assembly 90, to the vehicle body of the rail vehicle to influence observation vision of the window on the vehicle body.

Figure 69:
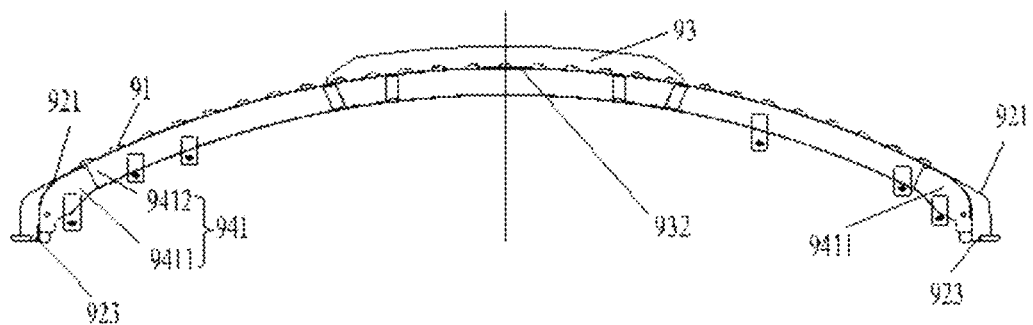
FIG. 69 is a section view of the vehicle roof assembly in direction J-J in FIG. 64.

Preferably, as shown in FIG. 69, the position, corresponding to the second end of the second upper edge beam segment 922, on the first upper edge beam segment 921 is also set with the water chute 923.

Figure 67:
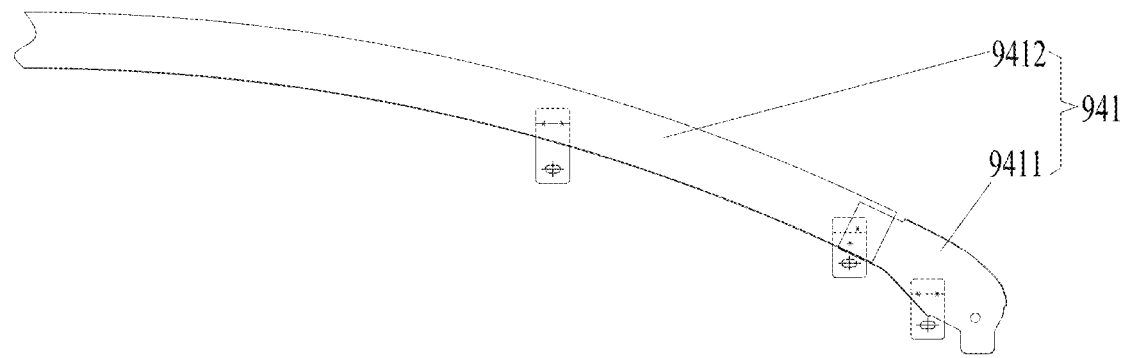
FIG. 67 is a structure diagram of an end bending beam of the vehicle roof assembly in FIG. 64.

As shown in FIG. 67, in the embodiments of the present invention, the end bending beam 941 includes two first end bending beam segments 9411 and one second end bending beam segment 9412. The two first end bending beam segments 9411 and the two first upper edge beam segments 921 are connected correspondingly. The second end bending beam segment 9412 is between the two first end bending beam segments 9411. The first end bending beam segment 9411 and the second end bending beam segment 9412 are connected fixedly.

Specifically, the width of the first upper edge beam segment 921 increases gradually along the extension direction from the end to the central part of the rail vehicle, that is, the structure of the first upper edge beam segment 921 in the application has a gradually changing section.

In the application, the first end bending beam segment 9411 and the first upper edge beam segment 921 are connected correspondingly, so as to realize the connection between the end bending beam 941 and the first upper edge beam segment 921.

As shown in FIG. 69, in the embodiments of the present invention, at least one first upper edge beam segment 921 is fixedly connected with one of the two first end bending beam segments 9411.

Preferably, in the application, the two first end bending beam segments 9411 are set at two ends of the second end bending beam segments 9412, and the first end bending beam segment 9411 and the second end bending beam segment 9412 are connected by welding. The first end bending beam segment 9411 and the first upper edge beam segment 921 is connected by welding.

The above setting ensures the connection strength between the end bending beam 941 and the first upper edge beam segment 921, and the connection strength between the transition beam 943 and the second upper edge beam segment 922 is high. Therefore, in the application, the connection strength between the bending cross beam component 94 and the upper edge beam 92 is high, the connection is convenient, and the overall structure strength of the vehicle roof assembly is ensured.

Figure 70:
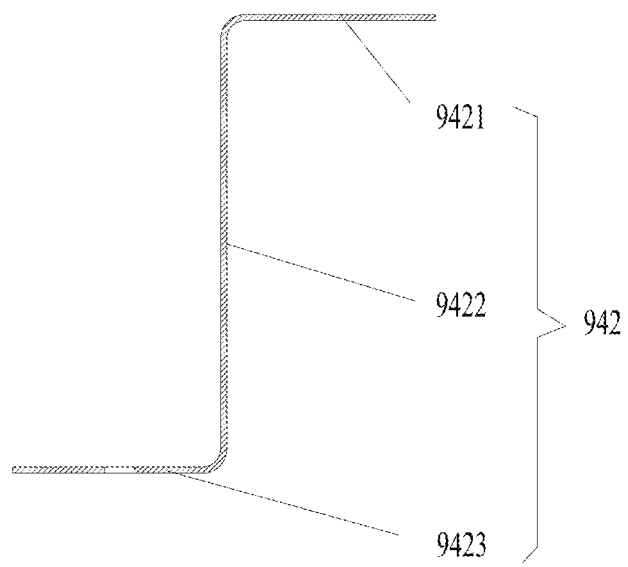
FIG. 70 is a section view of the center bending beam in direction S-S in FIG. 66.

As shown in FIG. 70, in the embodiments of the present invention, the cross sections of the center bending beam 942 and the end bending beam 941 are Z-shaped along the width direction of the vehicle roof assembly.

Specifically, both the cross sections of the center bending beam 942 and the end bending beam 941 are Z-shaped.

As shown in FIG. 69, the rail vehicle further includes: a water baffle 93, which is set at the end of the vehicle roof body 91 of the vehicle roof assembly 90, so as to stop at least part of liquid on the top of the vehicle roof body 91 from flowing down from the end door. The water baffle 93 is stripe-shaped, and its extension direction is vertical to the extension direction of the vehicle roof component 91. By setting the water baffle 93 on the top of the vehicle roof body 91, it is convenient to use the vehicle roof component 91 to stop at least part of liquid on the top of the end door from flowing down from the end door, thereby preventing rainwater from flowing in the front of observer's field of vision to influence the observer's field of vision, ensuring the observer's sight not to be blocked by rainwater. In this way, the problem in the conventional art that the sight of an observer in a driver's cab of the rail vehicle is easy to be blocked by rainwater is solved.

The water baffle 93 is set at the end of the end bending beam 941. In this way, it is more convenient to implement the setting of the water baffle 93, and it is beneficial to enhancing a water baffling effect. Preferably, the water baffle 93 is welded on the end bending beam 941. A hanging side of the end bending beam 941 is cambered. The water baffle 93 has a junction surface 932 which is a curved surface coordinating with the hanging side of the end bending beam 941, so as to connect the water baffle 93 with the hanging side of the end bending beam 941 through the junction surface 932.

Specifically, there are two water baffles 93 which are correspondingly set at opposite ends of the vehicle roof body 91. One end of the vehicle body of the rail vehicle is the driver's cab, and the other end is an end wall. There are end doors set on both the driver's cab and the end wall, so as to make each water baffle 93 stop the liquid above the corresponding end door.

The above is only the preferred embodiments of the present invention and not intended to limit the present invention; for those skilled in the art, the present invention may have various modifications and changes. Any modifications, equivalent replacements, improvements and the like within the spirit and principle of the present invention should fall within the protection scope of the claims of the present invention.

It is to be noted that terms used herein only aim to describe specific implementation manners, and are not intended to limit exemplar implementations of this application. Unless otherwise directed by the context, singular forms of terms used herein are intended to include plural forms. Besides, it will be also appreciated that when terms "contain" and/or "include" are used in the description, it is indicated that features, steps, operations, devices, assemblies and/or a combination thereof exist.

Unless otherwise specified, relative arrangements of components and steps elaborated in these embodiments, numeric expressions and numeric values do not limit the scope of the present invention. Furthermore, it should be understood that for ease of descriptions, the size of each part shown in the drawings is not drawn in accordance with an actual proportional relation. Technologies, methods and devices known by those skilled in the related art may not be discussed in detail. However, where appropriate, the technologies, the methods and the devices shall be regarded as part of the authorized description. In all examples shown and discussed herein, any specific values shall be interpreted as only exemplar values instead of limited values. As a result, other examples of the exemplar embodiments may have different values. It is to be noted that similar marks and letters represent similar items in the following drawings. As a result, once a certain item is defined in one drawing, it is unnecessary to further discus the certain item in the subsequent drawings.

In the descriptions of the present invention, it will be appreciated that locative or positional relations indicated by "front, back, up, down, left, and right", "horizontal, vertical, perpendicular, and horizontal", "top and bottom" and other terms are locative or positional relations shown on the basis of the drawings, which are only intended to make it convenient to describe the present invention and to simplify the descriptions without indicating or impliedly indicating that the referring device or element must have a specific location and must be constructed and operated with the specific location, and accordingly it cannot be understood as limitations to the present invention. The nouns of locality "inner and outer" refer to the inner and outer contours of each component.

For ease of description, spatial relative terms such as "over", "above", "on an upper surface" and "upper" may be used herein for describing a spatial position relation between a device or feature and other devices or features shown in the drawings. It will be appreciated that the spatial relative terms aim to contain different orientations in usage or operation besides the orientations of the devices described in the drawings. For example, if the devices in the drawings are inverted, devices described as "above other devices or structures" or "over other devices or structures" will be located as "below other devices or structures" or "under other devices or structures". Thus, an exemplar term "above" may include two orientations namely "above" and "below". The device may be located in other different modes (rotated by 90 degrees or located in other orientations), and spatial relative descriptions used herein are correspondingly explained.

In addition, it is to be noted those terms such as "first" and "second" are used to limit parts, so as only to distinguish the corresponding parts. Unless otherwise stated, the above terms do not have special meanings, and therefore it cannot be interpreted as limitation to the scope of protection of the present invention.

What is claimed is:
1. A rail vehicle, comprising:
an underframe assembly, which comprises a primary energy absorption structure (51) and an underframe edge beam (20); the primary energy absorption structure (51) is connected with the underframe edge beam (20) of the rail vehicle; the primary energy absorption structure (51) has at least two energy absorbing cavities that are set at interval;
a side wall assembly (70), whose lower end is connected with the underframe assembly;
a vehicle roof assembly (90); the upper end of the side wall assembly (70) is connected with the vehicle roof assembly (90); and
a vehicle end assembly (60), which comprises an end energy absorption structure; the lower end of the end energy absorption structure is connected with the primary energy absorption structure (51), and the upper end of the end energy absorption structure is connected with the vehicle roof assembly (90), the primary energy absorption structure (51) comprises an end beam (54), two ends of the end beam (54) are connected to an edge beam of underframe (20) of the vehicle respectively, the end beam (54) has an end beam bottom plate (541) and an end beam vertical plate (542) connected to the end beam bottom plate (541), and the end beam vertical plate (542) is vertically disposed and defines the energy absorption cavity on the end beam bottom plate (541), the end energy absorption structure comprises a first energy absorption column (61), the middle of the end beam bottom plate (541) is provided with a first column mounting hole (541a), and the first energy absorption column (61) penetrates into the first column mounting hole (541a) and is welded to the end beam bottom plate (541).

2. The rail vehicle as claimed in claim 1, wherein the end energy absorption structure further comprises a second energy absorption column (62), having a first end welded to the vehicle roof assembly (90) and a second end welded to the primary energy absorption structure (51), wherein there are two second energy absorption columns (62), the two second energy absorption columns (62) being spaced; and there are two first energy absorption columns (61), the two first energy absorption columns (61) being spaced, and the two first energy absorption columns (61) being located between the two second energy absorption columns (62).

3. The rail vehicle as claimed in claim 1, further comprising:
a secondary energy absorption structure (52), the secondary energy absorption structure (52) being connected to the primary energy absorption structure (51), the secondary energy absorption structure (52) comprising at least two spaced energy absorption tubes (55), and the primary energy absorption structure (51) being connected to a first end of the energy absorption tube (55), wherein the energy absorption tube (55) is a hollow structure, the energy absorption tube (55) is provided with a first induction portion (553), the first induction portion (553) comprises an induction hole (551), and the induction hole (551) is a through hole.

4. The rail vehicle as claimed in claim 3, wherein the cross section of the energy absorption tube (55) is rectangular, the first induction portion (553) comprises at least one group of induction holes (551), and the induction holes (551) of each group is spaced in the circumferential direction of the energy absorption tube (55) along a plane vertical to the axis of the energy absorption tube (55), wherein the energy absorption tube (55) comprises at least two adjacent side walls, the two adjacent side walls are connected to form a bending portion, and the first induction portion (553) is disposed on at least one bending portion of the energy absorption tube (55).

5. The rail vehicle as claimed in claim 1, wherein the underframe assembly comprises two spaced lower boundary beams (29) and a sleeper beam (10) disposed between the two lower boundary beams (29), the sleeper beam (10) comprising:
  a web structure (14);
  a center pin (11), connected to a bogie of the rail vehicle; and
  a mounting frame, connected to the web structure (14), the center pin (11) being disposed on the mounting frame, the mounting frame comprising a plurality of vertical plates (12), and the plurality of vertical plates (12) being spaced along an outer wall surface of the center pin (11).

6. The rail vehicle as claimed in claim 1, wherein a sleeper beam (10) comprises a plurality of rib plates (13) and two web structures (14), a mounting frame being located between the two web structures (14), the web structure (14) comprises two spaced webs (141), the plurality of rib plates (13) is spaced between the two webs (141).

7. The rail vehicle as claimed in claim 6, wherein the sleeper beam (10) further comprises:
  an upper cover plate (15), covering the web (141), the upper cover plate (15) being provided with a plurality of through holes (151), the rib plate (13) being provided with a protrusion (131), and the protrusion (131) matching the corresponding through hole (151); and
  a lower cover plate (16), disposed at the lower part of the web (141), the lower cover plate (16) being fixedly connected to each rib plate (13).

8. The rail vehicle as claimed in claim 5, wherein the underframe assembly further comprising: a plurality of cross beam components (40) disposed between the two lower boundary beams (29), the plurality of cross beam components (40) being spaced along a length direction of the lower boundary beam (29), at least one of the lower boundary beams (29) being provided with a connecting base (21), and at least one end of the cross beam component (40) being connected to the lower boundary beam (29) through the connecting base (21).

9. The rail vehicle as claimed in claim 8, wherein the lower boundary beam (29) comprises a first flat plate (201), a vertical plate (202) and a second flat plate (203) connected in sequence, the width size L1 of the first flat plate (201) is greater than the width size L2 of the second flat plate (203), and the connecting base (21) comprises:
  a first connecting plate (211), connected to the vertical plate (202);
  a second connecting plate (212), forming an included angle with the first connecting plate (211), the second connecting plate (212) being connected to the cross beam component (40); and
  a third connecting plate (213), forming an included angle with the first connecting plate (211) and the second connecting plate (212) respectively, the third connecting plate (213) being connected to the first flat plate (201) or the second flat plate (203).

10. The rail vehicle as claimed in claim 9, wherein at least one cross beam component (40) of the plurality of cross beam components (40) comprises:
  a first cross beam (41), two opposite ends of the first cross beam (41) being correspondingly connected to the two lower boundary beams (29), respectively; and
  a second cross beam (42), the second cross beam (42) and the first cross beam (41) being correspondingly disposed in a height direction of the lower boundary beam (29), wherein the first cross beam (41) and the second cross beam (42) form a mounting cavity, and a portion of a floor (43) of the rail vehicle penetrates in the mounting cavity.

11. The rail vehicle as claimed in claim 8, wherein the underframe assembly further comprising:
  a middle beam (30), disposed between the two lower boundary beams (29), the middle beam (30) extending along the length direction of the lower boundary beam (29), and the cross section of the middle beam (30) being Z-shaped in a width direction of the rail vehicle.

12. The rail vehicle as claimed in claim 5, wherein the underframe assembly further comprising:
  a pipe passage structure (22), a side, facing a vehicle body of the rail vehicle, of at least one lower boundary beam (29) being provided with the pipe passage structure (22), wherein the pipe passage structure is a pipe passage channel disposed on the lower boundary beam (29).

13. The rail vehicle as claimed in claim 1, wherein the side wall assembly (70) further comprising:
  a side wall body (701); and
  a plurality of side wall uprights (710), connected to the side wall body (701) respectively, the plurality of side wall uprights (710) being spaced along a length direction of the side wall body (701);
  wherein an auxiliary air duct of the rail vehicle is formed between at least two side wall uprights (710) and the side wall body (701) in the length direction of the side wall body (701).

14. The rail vehicle as claimed in claim 13, wherein the side wall assembly (70) further comprising:
  a side wall corner post (704), disposed inside the side wall body (701); and
  a connecting structure (705), the first end of the connecting structure (705) being connected to an end wall corner post of the rail vehicle, and the second end of the connecting structure (705) being connected to the side wall corner post (704).

15. The rail vehicle as claimed in claim 13, wherein the side wall assembly (70) further comprising a reinforcing structure (74), wherein the reinforcing structure (74) comprises a reinforcing body and a turned edge (743) connected to the reinforcing body, the reinforcing body is fixedly connected to the side wall body (701), and the turned edge (743) and the side wall body (701) are spaced.

16. The rail vehicle as claimed in claim 13, wherein the side wall assembly (70) further comprising:
  a handrail mounting seat (75), disposed on the side wall body (701), the handrail mounting seat (75) being provided with a handrail mounting groove (758), the handrail mounting groove (758) being used for mounting a handrail bar (750), and the handrail mounting groove (758) being depressed toward the internal direction of the vehicle.

17. The rail vehicle as claimed in claim 1, wherein the vehicle roof assembly (90) comprises:
  two upper edge beams (92) which are set at interval;
  a bending cross beam component (94), which is provided between the two upper edge beams (92); and
  a transition structure, which is set on the bending cross beam component (94), and is connected with at least one of the upper edge beams (92).

18. The rail vehicle as claimed in claim 1, further comprising:
  a water baffle (93), which is set on the top of the vehicle roof assembly (90), at the end of the vehicle roof assembly (90), and at the upper side of an end door of the rail vehicle, so as to stop at least part of liquid on the top of the vehicle roof assembly (90) from flowing down from the end door;

wherein, the water baffle (93) has an extension direction along the extension direction of the vehicle roof assembly (90).

\* \* \* \* \*